US012689569B1

(12) United States Patent
Chor et al.

(10) Patent No.: US 12,689,569 B1
(45) Date of Patent: Jul. 21, 2026

(54) SYSTEM AND METHOD FOR SENSOR DATA DEVICE REGISTRATION

(71) Applicant: Cisco Technology, Inc., San Jose, CA (US)

(72) Inventors: Jesse Chor, Saratoga, CA (US); Casing Chu, San Mateo, CA (US); Tishan Mills, Toronto (CA); Anthony Ng, Toronto (CA); Rodrigo Paulo Quaresma, Burlington (CA); Jonathan Yeung, Mississauga (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/798,350

(22) Filed: Aug. 8, 2024

Related U.S. Application Data

(63) Continuation of application No. 17/161,656, filed on Jan. 28, 2021, now Pat. No. 12,081,418.

(60) Provisional application No. 63/059,064, filed on Jul. 30, 2020, provisional application No. 62/968,942, filed on Jan. 31, 2020.

(51) Int. Cl.
| | |
|---|---|
| *H04L 43/04* | (2022.01) |
| *G06F 11/34* | (2006.01) |
| *H04L 41/0803* | (2022.01) |
| *H04L 43/045* | (2022.01) |

(52) U.S. Cl.
CPC .......... *H04L 43/04* (2013.01); *G06F 11/3476* (2013.01); *H04L 41/0803* (2013.01); *H04L 43/045* (2013.01)

(58) Field of Classification Search
None
See application file for complete search history.

(56) References Cited

U.S. PATENT DOCUMENTS

| | | | | |
|---|---|---|---|---|
| 6,108,713 | A | * | 8/2000 | Sambamurthy ......... H04L 49/90 709/250 |
| 6,477,611 | B1 | * | 11/2002 | Chang ................... G06F 13/385 710/313 |

(Continued)

FOREIGN PATENT DOCUMENTS

| | | | | |
|---|---|---|---|---|
| EP | 3 276 887 A1 | | 1/2018 | |
| WO | WO-2020146036 A1 | * | 7/2020 | .......... G05B 19/042 |
| WO | WO-2021231326 A1 | * | 11/2021 | .............. H04W 4/38 |

OTHER PUBLICATIONS

Splunk Enterprise 8.0.0 Overview, available online, retrieved on May 20, 2020 from docs.splunk.com, 17 pages.

(Continued)

*Primary Examiner* — Lance Leonard Barry
(74) *Attorney, Agent, or Firm* — Kilpatrick Townsend & Stockton LLP

(57) ABSTRACT

Described herein is a system and method for sensor data device registration. A server receives from a client device, a device identifier associated with a sensor data device. Responsive to determining that the sensor data device is not linked to a respective dashboard, the server transmits to the client device, an indication that the sensor data device is unregistered. The server receives from the client device an indication of a dashboard to which to assign the sensor data device, and thereafter links the sensor device data to the indicated dashboard so that sensor data received from the sensor data device is presented in a user interface corresponding to the indicated dashboard.

20 Claims, 54 Drawing Sheets

(56) References Cited

U.S. PATENT DOCUMENTS

| | | | |
|---|---|---|---|
| 7,937,344 | B2 | 5/2011 | Baum et al. |
| 8,112,425 | B2 | 2/2012 | Baum et al. |
| 8,412,696 | B2 | 4/2013 | Zhang et al. |
| 8,589,375 | B2 | 11/2013 | Zhang et al. |
| 8,589,403 | B2 | 11/2013 | Marquardt et al. |
| 8,589,432 | B2 | 11/2013 | Zhang et al. |
| 8,738,581 | B1 | 5/2014 | Choube et al. |
| 8,738,629 | B1 | 5/2014 | Bitincka et al. |
| 8,751,529 | B2 | 6/2014 | Zhang et al. |
| 8,788,525 | B2 | 7/2014 | Neels et al. |
| 8,788,526 | B2 | 7/2014 | Neels et al. |
| 8,826,434 | B2 | 9/2014 | Merza |
| 8,862,925 | B2 | 10/2014 | DeMarco |
| 8,983,994 | B2 | 3/2015 | Neels et al. |
| 9,128,980 | B2 | 9/2015 | Neels et al. |
| 9,128,985 | B2 | 9/2015 | Marquardt et al. |
| 9,130,971 | B2 | 9/2015 | Vasan et al. |
| 9,173,801 | B2 | 11/2015 | Merza |
| 9,185,007 | B2 | 11/2015 | Fletcher et al. |
| 9,215,240 | B2 | 12/2015 | Merza et al. |
| 9,248,068 | B2 | 2/2016 | Merza |
| 9,286,413 | B1 | 3/2016 | Coates et al. |
| 9,426,045 | B2 | 8/2016 | Fletcher et al. |
| 9,426,172 | B2 | 8/2016 | Merza |
| 9,432,396 | B2 | 8/2016 | Merza |
| 9,432,437 | B1* | 8/2016 | Leonard ................. H04L 67/02 |
| 9,514,189 | B2 | 12/2016 | Bitincka et al. |
| 9,589,012 | B2 | 3/2017 | Neels et al. |
| 9,838,292 | B2 | 12/2017 | Polychronis |
| 10,049,160 | B2 | 8/2018 | Bitincka et al. |
| 10,127,258 | B2 | 11/2018 | Lamas et al. |
| 10,419,243 | B2* | 9/2019 | Schubert ............. H04L 12/2816 |
| 10,476,743 | B2* | 11/2019 | Pignataro ............ H04L 41/0894 |
| 11,042,135 | B1* | 6/2021 | Rolston .................. G05B 15/02 |
| 2005/0060567 | A1* | 3/2005 | Shannon ............. G06F 11/0709 |
| | | | 714/E11.205 |
| 2010/0146168 | A1* | 6/2010 | Shin ...................... G06F 13/102 |
| | | | 710/104 |
| 2012/0089708 | A1* | 4/2012 | Kim ........................ H04L 67/34 |
| | | | 709/223 |
| 2013/0318236 | A1 | 11/2013 | Coates et al. |
| 2014/0156478 | A1* | 6/2014 | Owens ................... G06Q 30/04 |
| | | | 705/34 |
| 2014/0236890 | A1 | 8/2014 | Vasan et al. |
| 2014/0324862 | A1 | 10/2014 | Bingham et al. |
| 2015/0019537 | A1 | 1/2015 | Neels et al. |
| 2016/0004750 | A1 | 1/2016 | Marquardt et al. |
| 2017/0264689 | A1* | 9/2017 | Berrendonner ........ G01C 19/00 |
| 2018/0026942 | A1* | 1/2018 | De Ligt .................. H04L 67/12 |
| | | | 709/245 |
| 2018/0110462 | A1* | 4/2018 | Asvadi ................. A61B 5/0205 |
| 2019/0098106 | A1 | 3/2019 | Mungel et al. |
| 2019/0146462 | A1* | 5/2019 | Tan .................... G05B 19/4183 |
| | | | 700/257 |
| 2020/0076680 | A1* | 3/2020 | Pruitt ...................... H04L 41/20 |
| 2020/0204443 | A1* | 6/2020 | Bar Oz ............... G06F 11/3051 |
| 2020/0273268 | A1* | 8/2020 | Bhattacharyya ............................ G06Q 10/06315 |
| 2021/0067369 | A1* | 3/2021 | Wiesenberg ...... H04L 12/40032 |
| 2021/0194960 | A1* | 6/2021 | Ventimiglia ......... G07C 5/0841 |
| 2021/0223763 | A1* | 7/2021 | Wilkinson .......... G05B 19/406 |
| 2021/0241926 | A1 | 8/2021 | Chor et al. |

OTHER PUBLICATIONS

Splunk Cloud 8.0.2004 User Manual, available online, retrieved on May 20, 2020 from docs.splunk.com, 66 pages.

Splunk Quick Reference Guide, updated 2019, available online at https://www.splunk.com/pdfs/solution-guides/splunk-quick-reference-guide.pdf, retrieved on May 20, 2020, 6 pages.

Carraso, David, "Exploring Splunk," published by CITO Research, New York, NY, Apr. 2012, 156 pages.

Bitincka et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, 9 pages.

* cited by examiner

RECEIVE DATA  202

GENERATE EVENTS  204

GROUP EVENTS  206

STORE EVENTS  208

100

HOST DEVICE 104 / DATA SOURCE

DATA INTAKE AND QUERY SYSTEM 102

INTAKE 110

INDEXING 112

QUERY 114

STORAGE 116

CLIENT COMPUTING DEVICE 106

Figure 3A:
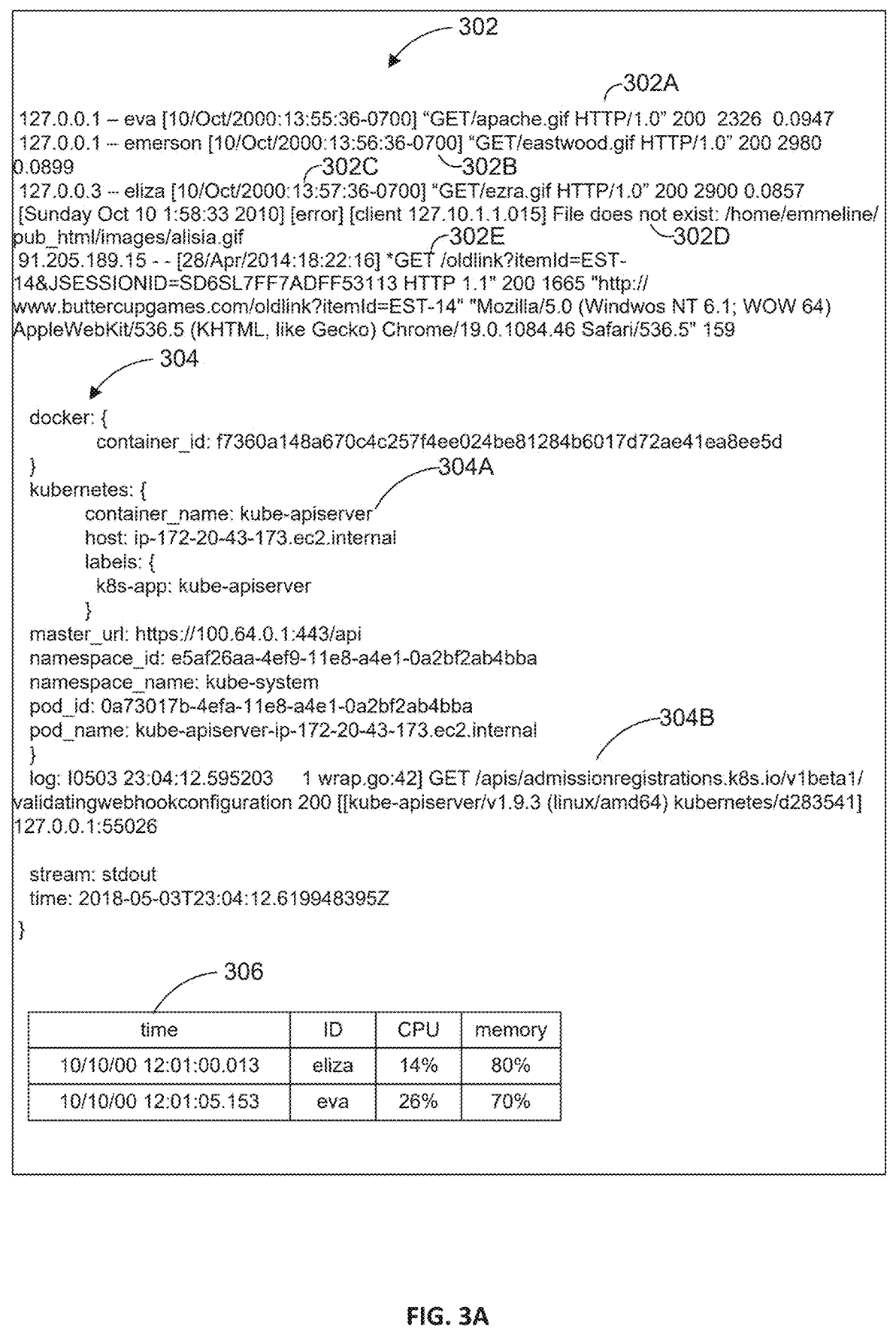

302

302A 127.0.0.1 – eva [10/Oct/2000:13:55:36-0700] "GET/apache.gif HTTP/1.0" 200  2326  0.0947
127.0.0.1 – emerson [10/Oct/2000:13:56:36-0700] "GET/eastwood.gif HTTP/1.0" 200 2980
0.0899               302C          302B
127.0.0.3 – eliza [10/Oct/2000:13:57:36-0700] "GET/ezra.gif HTTP/1.0" 200 2900 0.0857
[Sunday Oct 10 1:58:33 2010] [error] [client 127.10.1.1.015] File does not exist: /home/emmeline/
pub_html/images/alisia.gif              302E                    302D
91.205.189.15 - - [28/Apr/2014:18:22:16] *GET /oldlink?itemId=EST-
14&JSESSIONID=SD6SL7FF7ADFF53113 HTTP 1.1" 200 1665 "http://
www.buttercupgames.com/oldlink?itemId=EST-14" "Mozilla/5.0 (Windwos NT 6.1; WOW 64)
AppleWebKit/536.5 (KHTML, like Gecko) Chrome/19.0.1084.46 Safari/536.5" 159

304 docker: {
        container_id: f7360a148a670c4c257f4ee024be81284b6017d72ae41ea8ee5d
}
kubernetes: {                                304A
        container_name: kube-apiserver
        host: ip-172-20-43-173.ec2.internal
        labels: {
          k8s-app: kube-apiserver
        }
master_url: https://100.64.0.1:443/api
namespace_id: e5af26aa-4ef9-11e8-a4e1-0a2bf2ab4bba
namespace_name: kube-system
pod_id: 0a73017b-4efa-11e8-a4e1-0a2bf2ab4bba
pod_name: kube-apiserver-ip-172-20-43-173.ec2.internal        304B
}
log: I0503 23:04:12.595203     1 wrap.go:42] GET /apis/admissionregistrations.k8s.io/v1beta1/
validatingwebhookconfiguration 200 [[kube-apiserver/v1.9.3 (linux/amd64) kubernetes/d283541]
127.0.0.1:55026 stream: stdout
time: 2018-05-03T23:04:12.619948395Z
}

306

| time | ID | CPU | memory |
|---|---|---|---|
| 10/10/00 12:01:00.013 | eliza | 14% | 80% |
| 10/10/00 12:01:05.153 | eva | 26% | 70% |

Figure 16:
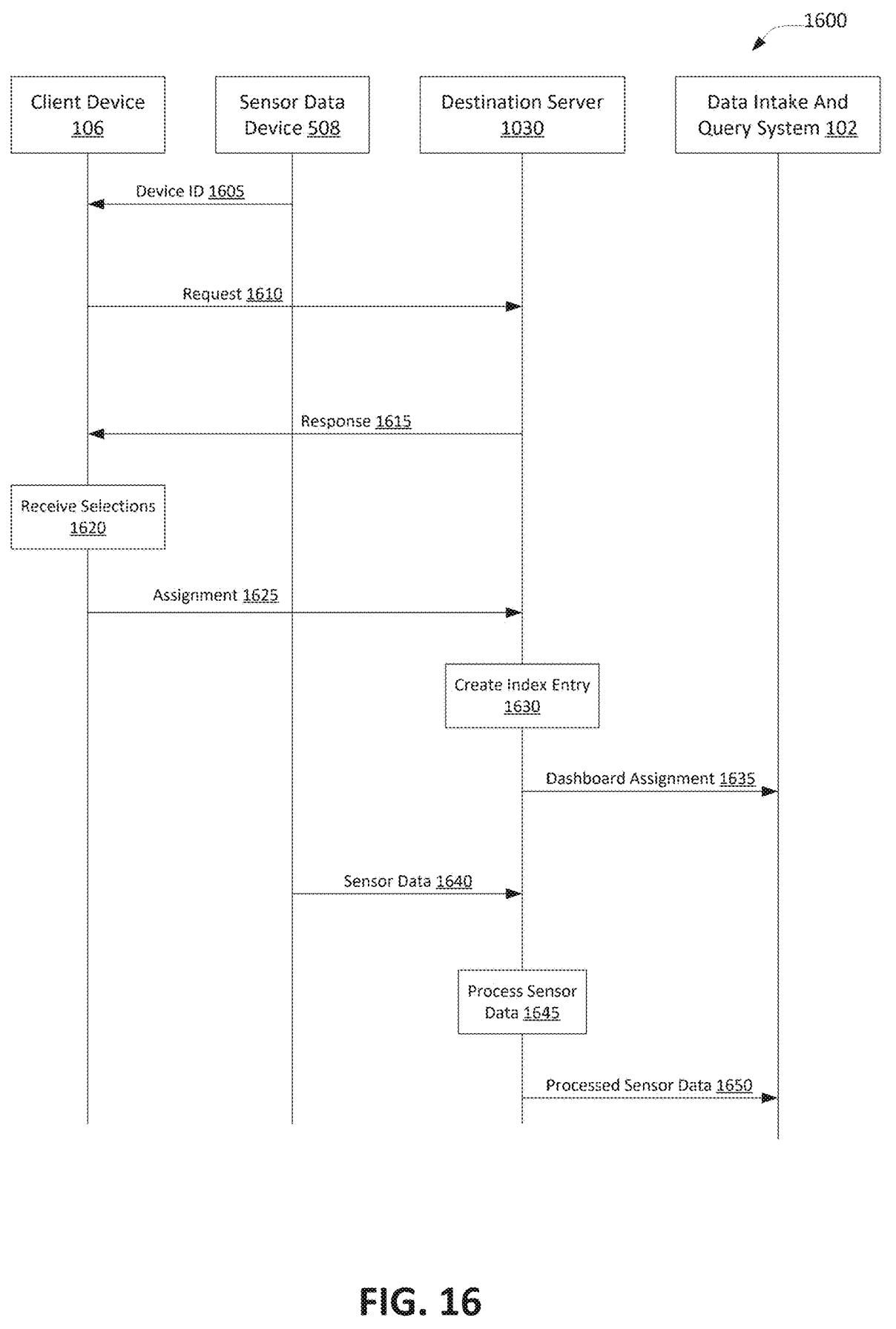

| Client Device 106 | Sensor Data Device 508 | Destination Server 1030 | Data Intake And Query System 102 |

Device ID 1605

Request 1610

Response 1615

Receive Selections 1620

Assignment 1625

Create Index Entry 1630

Dashboard Assignment 1635

Sensor Data 1640

Process Sensor Data 1645

Processed Sensor Data 1650

Connected to your Puck

It's time to connect to your Puck and sending
data to Splunk

1900

1902

1904

2280

2282 Humidity

2283 Enable

2284 Anomaly Dection

2285 Send Data to Splunk every    01    MIN    HRS

2286

2400

Receive data from sensor device(s) —————2401

Process received data —————2403

Input received data into onboard message bus(es) —————2405

Cause onboard message bus to transmit data to subscribers —————2407

SYSTEM AND METHOD FOR SENSOR DATA DEVICE REGISTRATION

CROSS-REFERENCE TO RELATED APPLICATIONS

This application is a continuation of U.S. application Ser. No. 17/161,656, filed on Jan. 28, 2021, (now patented, U.S. Pat. No. 12,081,418), which claims the priority benefit of United States provisional patent application filed on Jan. 31, 2020, and having Ser. No. 62/968,942, and also claims the priority benefit of United States provisional patent application filed Jul. 30, 2020, and having Ser. No. 63/059,064. The subject matter of this related application is hereby incorporated herein by reference.

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures:

FIG. 3A is a block diagram illustrating an embodiment of machine data received by the data intake and query system.

FIG. 16 illustrates a call flow diagram showing interactions between various components of the example data processing environment of FIG. 10 when registering a sensor data device, in accordance with example implementations.

DETAILED DESCRIPTION

Figure 2:
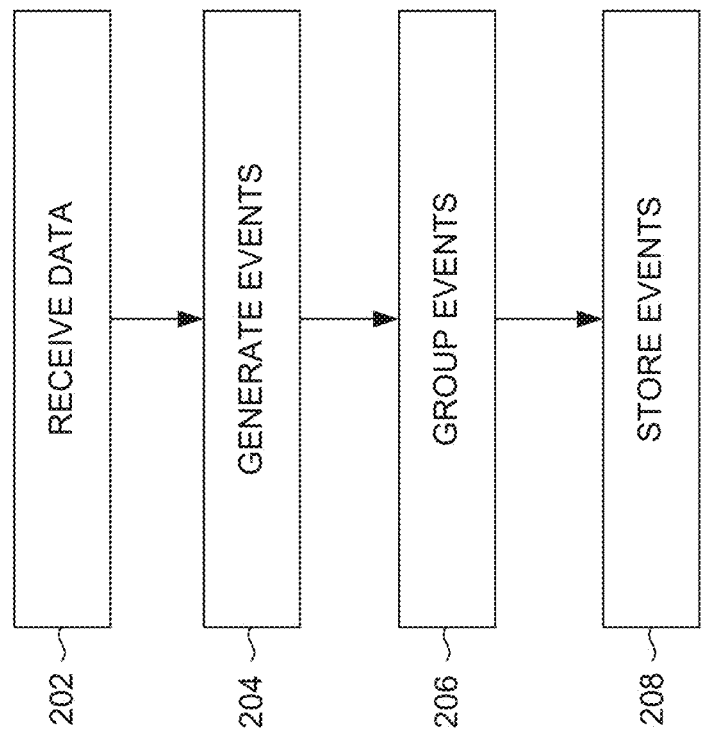
FIG. 2 is a flow diagram illustrating an embodiment of a routine implemented by the data intake and query system to process, index, and store data.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that concurrently report these types of information.

These challenges can be addressed by using an event-based data intake and query system, such as the SPLUNK® ENTERPRISE, SPLUNK® CLOUD, or SPLUNK® CLOUD SERVICE system developed by Splunk Inc. of San Francisco, California. These systems represent the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, metrics data, tracing data, and other data input sources.

In the data intake and query system, machine data is collected and stored as "events." An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp. The time stamp may be derived from the portion of machine data in the event, determined through interpolation between temporally proximate events having known timestamps, and/or may be determined based on other configurable rules for associating timestamps with events.

In some instances, machine data can have a predefined structure, where data items with specific data formats are stored at predefined locations in the data. For example, the machine data may include data associated with fields in a database table. In other instances, machine data may not have a predefined structure (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system can use flexible schema to specify how to extract information from events. A flexible schema may be developed and redefined as needed. The flexible schema can be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp, and stores the events. The system enables users to run queries against the stored events to, for example, retrieve events that meet filter criteria specified in a query, such as criteria indicating certain keywords or having specific values in defined fields. Additional query terms can further process the event data, such as, by transforming the data, etc.

As used herein, the term "field" can refer to a location in the machine data of an event containing one or more values for a specific data item. A field may be referenced by a field name associated with the field. As will be described in more detail herein, in some cases, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file can include one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source-type. When events are to be searched based on a particular field name specified in a search, the system can use one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system can utilize a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from machine data or events. In some cases, an extraction rule comprises a regular expression, where a sequence of characters form a search pattern. An extraction rule comprising a regular expression is referred to herein as a regex rule. The system applies a regex rule to machine data or an event to extract values for a field associated with the regex rule, where the values are extracted by searching the machine data/event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

In some embodiments, the configuration files and/or extraction rules described above can be stored in a catalog, such as a metadata catalog. In certain embodiments, the content of the extraction rules can be stored as rules or actions in the metadata catalog. For example, the identification of the data to which the extraction rule applies can be referred to a rule and the processing of the data can be referred to as an action.

1.0. Operating Environment

Figure 1:
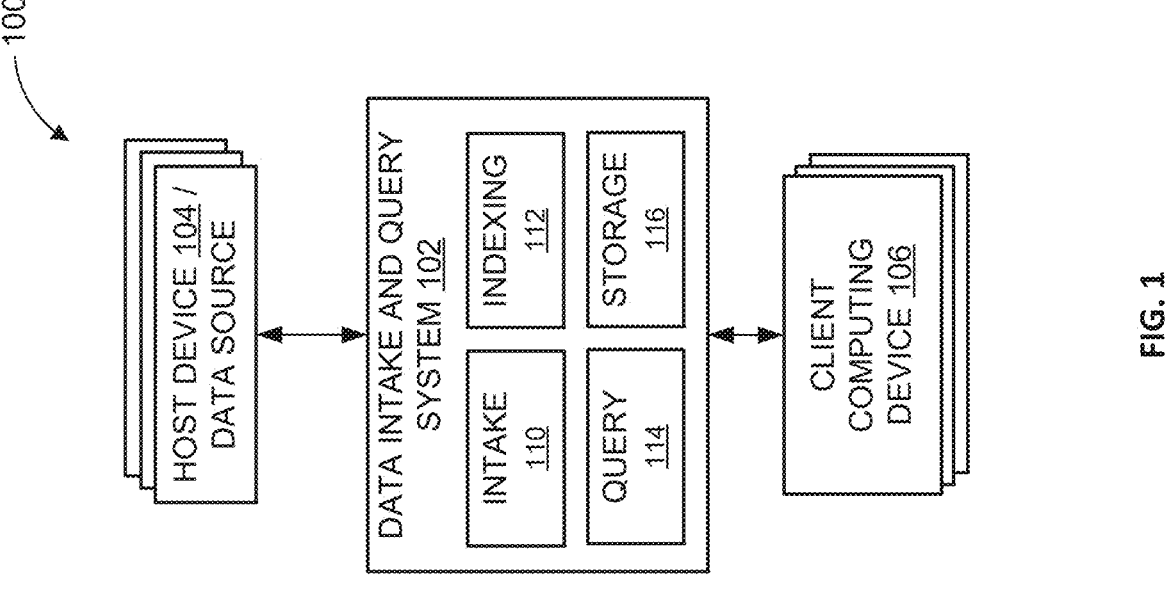
FIG. 1 is a block diagram of an embodiment of a data processing environment.

FIG. 1 is a block diagram of an embodiment of a data processing environment 100. In the illustrated embodiment, the environment 100 includes a data intake and query system 102, one or more host devices 104, and one or more client computing devices 106 (generically referred to as client device(s) 106).

The data intake and query system 102, host devices 104, and client devices 106 can communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a client computing device 106 can communicate with a host device 104 via one or more networks. For example, if the host device 104 is configured as a web server and the client computing device 106 is a laptop, the laptop can communicate with the web server to view a website.

A client device 106 can correspond to a distinct computing device that can configure, manage, or sends queries to the system 102. Examples of client devices 106 may include, without limitation, smart phones, tablet computers, handheld computers, wearable devices, laptop computers, desktop computers, servers, portable media players, gaming devices, or other device that includes computer hardware (e.g., processors, non-transitory, computer-readable media, etc.) and so forth. In certain cases, a client device 106 can include a hosted, virtualized, or containerized device, such as an isolated execution environment, that shares computing resources (e.g., processor, memory, etc.) of a particular machine with other isolated execution environments.

The client devices 106 can interact with the system 102 (or a host device 104) in a variety of ways. For example, the client devices 106 can communicate with the system 102 (or a host device 104) over an Internet (Web) protocol, via a gateway, via a command line interface, via a software developer kit (SDK), a standalone application, etc. As another example, the client devices 106 can use one or more executable applications or programs to interface with the system 102.

A host device 104 can correspond to a distinct computing device or system that includes or has access to data that can be ingested, indexed, and/or searched by the system 102.

Accordingly, in some cases, a client device 106 may also be a host device 104 (e.g., it can include data that is ingested by the system 102 and it can submit queries to the system 102). The host devices 104 can include, but are not limited to, servers, sensors, routers, personal computers, mobile devices, internet of things (IOT) devices, or hosting devices, such as computing devices in a shared computing resource environment on which multiple isolated execution environment (e.g., virtual machines, containers, etc.) can be instantiated, or other computing devices in an IT environment (e.g., device that includes computer hardware, e.g., processors, non-transitory, computer-readable media, etc.). In certain cases, a host device 104 can include a hosted, virtualized, or containerized device, such as an isolated execution environment, that shares computing resources (e.g., processor, memory, etc.) of a particular machine (e.g., a hosting device or hosting machine) with other isolated execution environments.

As mentioned host devices 104 can include or have access to data sources for the system 102. The data sources can include machine data found in log files, data files, distributed file systems, streaming data, publication-subscribe (pub/sub) buffers, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol (AMQP)), cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization technique or isolated execution environments.

In some cases, one or more applications executing on a host device may generate various types of machine data during operation. For example, a web server application executing on a host device 104 may generate one or more web server logs detailing interactions between the web server and any number of client devices 106 or other devices. As another example, a host device 104 implemented as a router may generate one or more router logs that record information related to network traffic managed by the router. As yet another example, a database server application executing on a host device 104 may generate one or more logs that record information related to requests sent from other devices (e.g., web servers, application servers, client devices, etc.) for data managed by the database server. Similarly, a host device 104 may generate and/or store computing resource utilization metrics, such as, but not limited to, CPU utilization, memory utilization, number of processes being executed, etc. Any one or any combination of the files or data generated in such cases can be used as a data source for the system 102.

In some embodiments, an application may include a monitoring component that facilitates generating performance data related to host device's operating state, including monitoring network traffic sent and received from the host device and collecting other device and/or application-specific information. A monitoring component may be an integrated component of the application, a plug-in, an extension, or any other type of add-on component, or a stand-alone process.

Such monitored information may include, but is not limited to, network performance data (e.g., a URL requested, a connection type (e.g., HTTP, HTTPS, etc.), a connection start time, a connection end time, an HTTP status code, request length, response length, request headers, response headers, connection status (e.g., completion, response time(s), failure, etc.)) or device performance information (e.g., current wireless signal strength of the device, a current connection type and network carrier, current memory performance information, processor utilization, memory utilization, a geographic location of the device, a device orientation, and any other information related to the operational state of the host device, etc.), device profile information (e.g., a type of client device, a manufacturer, and model of the device, versions of various software applications installed on the device, etc.) In some cases, the monitoring component can collect device performance information by monitoring one or more host device operations, or by making calls to an operating system and/or one or more other applications executing on a host device for performance information. The monitored information may be stored in one or more files and/or streamed to the system 102.

In general, a monitoring component may be configured to generate performance data in response to a monitor trigger in the code of a client application or other triggering application event, as described above, and to store the performance data in one or more data records. Each data record, for example, may include a collection of field-value pairs, each field-value pair storing a particular item of performance data in association with a field for the item. For example, a data record generated by a monitoring component may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

In some embodiments, such as in a shared computing resource environment (or hosted environment), a host device 104 may include logs or machine data generated by an application executing within an isolated execution environment (e.g., web server log file if the isolated execution environment is configured as a web server or database server log files if the isolated execution environment is configured as database server, etc.), machine data associated with the computing resources assigned to the isolated execution environment (e.g., CPU utilization of the portion of the CPU allocated to the isolated execution environment, memory utilization of the portion of the memory allocated to the isolated execution environment, etc.), logs or machine data generated by an application that enables the isolated execution environment to share resources with other isolated execution environments (e.g., logs generated by a Docker manager or Kubernetes manager executing on the host device 104), and/or machine data generated by monitoring the computing resources of the host device 104 (e.g., CPU utilization, memory utilization, etc.) that are shared between the isolated execution environments. Given the separation (and isolation) between isolated execution environments executing on a common computing device, in certain embodiments, each isolated execution environment may be treated as a separate host device 104 even if they are, in fact, executing on the same computing device or hosting device.

Accordingly, as used herein, obtaining data from a data source may refer to communicating with a host device 104 to obtain data from the host device 104 (e.g., from one or more data source files, data streams, directories on the host device 104, etc.). For example, obtaining data from a data source may refer to requesting data from a host device 104 and/or receiving data from a host device 104. In some such cases, the host device 104 can retrieve and return the requested data from a particular data source and/or the system 102 can retrieve the data from a particular data source of the host device 104 (e.g., from a particular file stored on a host device 104).

The data intake and query system 102 can ingest, index, and/or store data from heterogeneous data sources and/or host devices 104. For example, the system 102 can ingest, index, and/or store any type of machine data, regardless of the form of the machine data or whether the machine data matches or is similar to other machine data ingested, indexed, and/or stored by the system 102. In some cases, the system 102 can generate events from the received data, group the events, and store the events in buckets. The system 102 can also search heterogeneous data that it has stored or search data stored by other systems (e.g., other system 102 systems or other non-system 102 systems). For example, in response to received queries, the system 102 can assign one or more components to search events stored in the storage system or search data stored elsewhere.

As will be described herein in greater detail below, the system 102 can use one or more components to ingest, index, store, and/or search data. In some embodiments, the system 102 is implemented as a distributed system that uses multiple components to perform its various functions. For example, the system 102 can include any one or any combination of an intake system 110 (including one or more components) to ingest data, an indexing system 112 (including one or more components) to index the data, a storage system 116 (including one or more components) to store the data, and/or a query system 114 (including one or more components) to search the data, etc.

In the illustrated embodiment, the system 102 is shown having four subsystems 110, 112, 114, 116. However, it will be understood that the system 102 may include any one or any combination of the intake system 110, indexing system 112, query system 114, or storage system 116. Further, in certain embodiments, one or more of the intake system 110, indexing system 112, query system 114, or storage system 116 may be used alone or apart from the system 102. For example, the intake system 110 may be used alone to glean information from streaming data that is not indexed or stored by the system 102, or the query system 114 may be used to search data that is unaffiliated with the system 102.

In certain embodiments, the components of the different systems may be distinct from each other or there may be some overlap. For example, one component of the system 102 may include some indexing functionality and some searching functionality and thus be used as part of the indexing system 112 and query system 114, while another computing device of the system 102 may only have ingesting or search functionality and only be used as part of those respective systems. Similarly, the components of the storage system 116 may include data stores of individual components of the indexing system and/or may be a separate shared data storage system, like Amazon S3, that is accessible to distinct components of the intake system 110, indexing system 112, and query system 114.

In some cases, the components of the system 102 are implemented as distinct computing devices having their own computer hardware (e.g., processors, non-transitory, computer-readable media, etc.) and/or as distinct hosted devices (e.g., isolated execution environments) that share computing resources or hardware in a shared computing resource environment.

For simplicity, references made herein to the intake system 110, indexing system 112, storage system 116, and query system 114 can refer to those components used for ingesting, indexing, storing, and searching, respectively. However, it will be understood that although reference is made to two separate systems, the same underlying component may be performing the functions for the two different systems. For example, reference to the indexing system indexing data and storing the data in the storage system 116 or the query system searching the data may refer to the same component (e.g., same computing device or hosted device) indexing the data, storing the data, and then searching the data that it stored.

As will be described in greater detail herein, the intake system 110 can receive data from the host devices 104 or data sources, perform one or more preliminary processing operations on the data, and communicate the data to the indexing system 112, query system 114, storage system 116, or to other systems (which may include, for example, data processing systems, telemetry systems, real-time analytics systems, data stores, databases, etc., any of which may be operated by an operator of the system 102 or a third party). Given the amount of data that can be ingested by the intake system 110, in some embodiments, the intake system can include multiple distributed computing devices or components working concurrently to ingest the data.

The intake system 110 can receive data from the host devices 104 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image and video data, etc.

The preliminary processing operations performed by the intake system 110 can include, but is not limited to, associating metadata with the data received from a host device 104, extracting a timestamp from the data, identifying individual events within the data, extracting a subset of machine data for transmittal to the indexing system 112, enriching the data, etc. As part of communicating the data to the indexing system, the intake system 110 can route the data to a particular component of the intake system 110 or dynamically route the data based on load-balancing, etc. In certain cases, one or more components of the intake system 110 can be installed on a host device 104.

1.1 Indexing System Overview

As will be described in greater detail herein, the indexing system 112 can include one or more components (e.g., indexing nodes) to process the data and store it, for example, in the storage system 116. As part of processing the data, the indexing system can identify distinct events within the data, timestamps associated with the data, organize the data into buckets or time series buckets, convert editable buckets to non-editable buckets, store copies of the buckets in the storage system 116, merge buckets, generate indexes of the data, etc. In addition, the indexing system 112 can update various catalogs or databases with information related to the buckets (pre-merged or merged) or data that is stored in the storage system 116, and can communicate with the intake system 110 about the status of the data storage.

As will be described in greater detail herein, the query system 114 can include one or more components to receive, process, and execute queries. In some cases, the query system 114 can use the same component to process and execute the query or use one or more components to receive and process the query (e.g., a search head) and use one or more other components to execute at least a portion of the query (e.g., search nodes). In some cases, a search node and an indexing node may refer to the same computing device or hosted device performing different functions. In certain cases, a search node can be a separate computing device or hosted device from an indexing node.

Queries received by the query system 114 can be relatively complex and identify a set of data to be processed and a manner of processing the set of data from one or more client devices 106. In certain cases, the query can be implemented using a pipelined command language or other query language. As described herein, in some cases, the query system 114 can execute parts of the query in a distributed fashion (e.g., one or more mapping phases or parts associated with identifying and gathering the set of data identified in the query) and execute other parts of the query on a single component (e.g., one or more reduction phases). However, it will be understood that in some cases multiple components can be used in the map and/or reduce functions of the query execution.

In some cases, as part of executing the query, the query system 114 can use one or more catalogs or databases to identify the set of data to be processed or its location in the storage system 116 and/or can retrieve data from the storage system 116. In addition, in some embodiments, the query system 114 can store some or all of the query results in the storage system 116.

In some cases, the storage system 116 may include one or more data stores associated with or coupled to the components of the indexing system 112 that are accessible via a system bus or local area network. In certain embodiments, the storage system 116 may be a shared storage system 116, like Amazon S3 or Google Cloud Storage, that are accessible via a wide area network.

As mentioned and as will be described in greater detail below, the storage system 116 can be made up of one or more data stores storing data that has been processed by the indexing system 112. In some cases, the storage system includes data stores of the components of the indexing system 112 and/or query system 114. In certain embodiments, the storage system 116 can be implemented as a shared storage system 116. The shared storage system 116 can be configured to provide high availability, highly resilient, low loss data storage. In some cases, to provide the high availability, highly resilient, low loss data storage, the shared storage system 116 can store multiple copies of the data in the same and different geographic locations and across different types of data stores (e.g., solid state, hard drive, tape, etc.). Further, as data is received at the shared storage system 116 it can be automatically replicated multiple times according to a replication factor to different data stores across the same and/or different geographic locations. In some embodiments, the shared storage system 116 can correspond to cloud storage, such as Amazon Simple Storage Service (S3) or Elastic Block Storage (EBS), Google Cloud Storage, Microsoft Azure Storage, etc.

In some embodiments, indexing system 112 can read to and write from the shared storage system 116. For example, the indexing system 112 can copy buckets of data from its local or shared data stores to the shared storage system 116. In certain embodiments, the query system 114 can read from, but cannot write to, the shared storage system 116. For example, the query system 114 can read the buckets of data stored in shared storage system 116 by the indexing system 112, but may not be able to copy buckets or other data to the shared storage system 116. In some embodiments, the intake system 110 does not have access to the shared storage system 116. However, in some embodiments, one or more components of the intake system 110 can write data to the shared storage system 116 that can be read by the indexing system 112.

As described herein, in some embodiments, data in the system 102 (e.g., in the data stores of the components of the indexing system 112, shared storage system 116, or search nodes of the query system 114) can be stored in one or more time series buckets. Each bucket can include raw machine data associated with a timestamp and additional information about the data or bucket, such as, but not limited to, one or more filters, indexes (e.g., TSIDX, inverted indexes, keyword indexes, etc.), bucket summaries, etc. In some embodiments, the bucket data and information about the bucket data is stored in one or more files. For example, the raw machine data, filters, indexes, bucket summaries, etc. can be stored in respective files in or associated with a bucket. In certain cases, the group of files can be associated together to form the bucket.

The system 102 can include additional components that interact with any one or any combination of the intake system 110, indexing system 112, query system 114, and/or storage system 116. Such components may include, but are not limited to an authentication system, orchestration system, one or more catalogs or databases, a gateway, etc.

An authentication system can include one or more components to authenticate users to access, use, and/or configure the system 102. Similarly, the authentication system can be used to restrict what a particular user can do on the system 102 and/or what components or data a user can access, etc.

An orchestration system can include one or more components to manage and/or monitor the various components of the system 102. In some embodiments, the orchestration system can monitor the components of the system 102 to detect when one or more components has failed or is unavailable and enable the system 102 to recover from the failure (e.g., by adding additional components, fixing the failed component, or having other components complete the tasks assigned to the failed component). In certain cases, the orchestration system can determine when to add components to or remove components from a particular system 110, 112, 114, 116 (e.g., based on usage, user/tenant requests, etc.). In embodiments where the system 102 is implemented in a shared computing resource environment, the orchestration system can facilitate the creation and/or destruction of isolated execution environments or instances of the components of the system 102, etc.

In certain embodiments, the system 102 can include various components that enable it to provide stateless services or enable it to recover from an unavailable or unresponsive component without data loss in a time efficient manner. For example, the system 102 can store contextual information about its various components in a distributed way such that if one of the components becomes unresponsive or unavailable, the system 102 can replace the unavailable component with a different component and provide the replacement component with the contextual information. In this way, the system 102 can quickly recover from an unresponsive or unavailable component while reducing or eliminating the loss of data that was being processed by the unavailable component.

In some embodiments, the system 102 can store the contextual information in a catalog, as described herein. In certain embodiments, the contextual information can correspond to information that the system 102 has determined or learned based on use. In some cases, the contextual information can be stored as annotations (manual annotations and/or system annotations), as described herein.

In certain embodiments, the system 102 can include an additional catalog that monitors the location and storage of data in the storage system 116 to facilitate efficient access of the data during search time. In certain embodiments, such a catalog may form part of the storage system 116.

In some embodiments, the system 102 can include a gateway or other mechanism to interact with external devices or to facilitate communications between components of the system 102. In some embodiments, the gateway can be implemented using an application programming interface (API). In certain embodiments, the gateway can be implemented using a representational state transfer API (REST API).

In some environments, a user of a system 102 may install and configure, on computing devices owned and operated by the user, one or more software applications that implement some or all of the components of the system 102. For example, with reference to FIG. 1, a user may install a software application on server computers owned by the user and configure each server to operate as one or more components of the intake system 110, indexing system 112, query system 114, shared storage system 116, or other components of the system 102. This arrangement generally may be referred to as an "on-premises" solution. That is, the system 102 is installed and operates on computing devices directly controlled by the user of the system 102. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 102 operate.

In certain embodiments, one or more of the components of the system 102 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a system 102 by managing computing resources configured to implement various aspects of the system (e.g., intake system 110, indexing system 112, query system 114, shared storage system 116, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the system 102 execute can be shared by multiple customers or tenants as part of the shared computing resource environment. In addition, when implemented in a shared computing resource environment as a cloud-based service, various components of the system 102 can be implemented using containerization or operating-system-level virtualization, or other virtualization technique. For example, one or more components of the intake system 110, indexing system 112, or query system 114 can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the system 102 in a shared computing resource environment can provide a number of benefits. In some cases, implementing the system 102 in a shared computing resource environment can make it easier to install, maintain, and update the components of the system 102. For example, rather than accessing designated hardware at a particular location to install or provide a component of the system 102, a component can be remotely instantiated or updated as desired. Similarly, implementing the system 102 in a shared computing resource environment or as a cloud-based service can make it easier to meet dynamic demand. For example, if the system 102 experiences significant load at indexing or search, additional compute resources can be deployed to process the additional data or queries. In an "on-premises" environment, this type of flexibility and scalability may not be possible or feasible.

In addition, by implementing the system 102 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the system 102 and/or to other systems unrelated to the system 102.

As mentioned, in an on-premises environment, data from one instance of a system 102 is logically and physically separated from the data of another instance of a system 102 by virtue of each instance having its own designated hardware. As such, data from different customers of the system 102 is logically and physically separated from each other. In a shared computing resource environment, components of a system 102 can be configured to process the data from one customer or tenant or from multiple customers or tenants. Even in cases where a separate component of a system 102 is used for each customer, the underlying hardware on which the components of the system 102 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the system 102 can maintain logical separation between tenant data. For example, the system 102 can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer's A hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the system 102 can maintain the mutual exclusivity and/or independence between tenant data even as the tenant data is being processed, stored, and searched by the same underlying hardware. In certain cases, to maintain the mutual exclusivity and/or independence between the data of different tenants, the system 102 can use tenant identifiers to uniquely identify data associated with different tenants.

In a shared computing resource environment, some components of the system 102 can be instantiated and designated for individual tenants and other components can be shared by multiple tenants. In certain embodiments, a separate intake system 110, indexing system 112, and query system 114 can be instantiated for each tenant, whereas the shared storage system 116 or other components (e.g., data store, metadata catalog, and/or acceleration data store, described below) can be shared by multiple tenants. In some such embodiments where components are shared by multiple tenants, the components can maintain separate directories for the different tenants to ensure their mutual exclusivity and/or independence from each other. Similarly, in some such embodiments, the system 102 can use different hosting computing systems or different isolated execution environments to process the data from the different tenants as part of the intake system 110, indexing system 112, and/or query system 114.

In some embodiments, individual components of the intake system 110, indexing system 112, and/or query system 114 may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants.

In certain embodiments, an indexing system 112 (or certain components thereof) can be instantiated and designated for a particular tenant or shared by multiple tenants. In some embodiments where a separate indexing system 112 is instantiated and designated for each tenant, different resources can be reserved for different tenants. For example, Tenant A can be consistently allocated a minimum of four indexing nodes and Tenant B can be consistently allocated a minimum of two indexing nodes. In some such embodiments, the four indexing nodes can be reserved for Tenant A and the two indexing nodes can be reserved for Tenant B, even if Tenant A and Tenant B are not using the reserved indexing nodes.

In embodiments where an indexing system 112 is shared by multiple tenants, components of the indexing system 112 can be dynamically assigned to different tenants. For example, if Tenant A has greater indexing demands, additional indexing nodes can be instantiated or assigned to Tenant A's data. However, as the demand decreases, the indexing nodes can be reassigned to a different tenant, or terminated. Further, in some embodiments, a component of the indexing system 112 can concurrently process data from the different tenants.

In some embodiments, one instance of query system 114 may be shared by multiple tenants. In some such cases, the same search head can be used to process/execute queries for different tenants and/or the same search nodes can be used to execute query for different tenants. Further, in some such cases, different tenants can be allocated different amounts of compute resources. For example, Tenant A may be assigned more search heads or search nodes based on demand or based on a service level arrangement than another tenant. However, once a search is completed the search head and/or nodes assigned to Tenant A may be assigned to Tenant B, deactivated, or their resource may be re-allocated to other components of the system 102, etc.

In some cases, by sharing more components with different tenants, the functioning of the system 102 can be improved. For example, by sharing components across tenants, the system 102 can improve resource utilization thereby reducing the amount of resources allocated as a whole. For example, if four indexing nodes, two search heads, and four search nodes are reserved for each tenant then those compute resources are unavailable for use by other processes or tenants, even if they go unused. In contrast, by sharing the indexing nodes, search heads, and search nodes with different tenants and instantiating additional compute resources, the system 102 can use fewer resources overall while providing improved processing time for the tenants that are using the compute resources. For example, if tenant A is not using any search nodes 506 and tenant B has many searches running, the system 102 can use search nodes that would have been reserved for tenant A to service tenant B. In this way, the system 102 can decrease the number of compute resources used/reserved, while improving the search time for tenant B and improving compute resource utilization.

2.0. Data Ingestion, Indexing, and Storage

FIG. 2 is a flow diagram illustrating an embodiment of a routine implemented by the system 102 to process, index, and store data received from host devices 104. The data flow illustrated in FIG. 2 is provided for illustrative purposes only. It will be understood that one or more of the steps of the processes illustrated in FIG. 2 may be removed or that the ordering of the steps may be changed. Furthermore, for the purposes of illustrating a clear example, one or more particular system components are described in the context of performing various operations during each of the data flow stages. For example, the intake system 110 is described as receiving machine data and the indexing system 112 is described as generating events, grouping events, and storing events. However, other system arrangements and distributions of the processing steps across system components may be used. For example, in some cases, the intake system 110 may generate events.

At block 202, the intake system 110 receives data from a host device 104. The intake system 110 initially may receive the data as a raw data stream generated by the host device 104. For example, the intake system 110 may receive a data stream from a log file generated by an application server, from a stream of network data from a network device, or from any other source of data. Non-limiting examples of machine data that can be received by the intake system 110 is described herein with reference to FIG. 3A.

In some embodiments, the intake system 110 receives the raw data and may segment the data stream into messages, possibly of a uniform data size, to facilitate subsequent processing steps. The intake system 110 may thereafter process the messages in accordance with one or more rules to conduct preliminary processing of the data. In one embodiment, the processing conducted by the intake system 110 may be used to indicate one or more metadata fields applicable to each message. For example, the intake system 110 may include metadata fields within the messages, or publish the messages to topics indicative of a metadata field. These metadata fields may, for example, provide information related to a message as a whole and may apply to each event that is subsequently derived from the data in the message. For example, the metadata fields may include separate fields specifying each of a host, a source, and a sourcetype related to the message. A host field may contain a value identifying a host name or IP address of a device that generated the data. A source field may contain a value identifying a source of the data, such as a pathname of a file or a protocol and port related to received network data. A sourcetype field may contain a value specifying a particular sourcetype label for the data. Additional metadata fields may also be included, such as a character encoding of the data, if known, and possibly other values that provide information relevant to later processing steps. In certain embodiments, the intake system 110 may perform additional operations, such as, but not limited to, identifying individual events within the data, determining timestamps for the data, further enriching the data, etc.

At block 204, the indexing system 112 generates events from the data. In some cases, as part of generating the events, the indexing system 112 can parse the data of the message. In some embodiments, the indexing system 112 can determine a sourcetype associated with each message (e.g., by extracting a sourcetype label from the metadata fields associated with the message, etc.) and refer to a sourcetype configuration corresponding to the identified sourcetype to parse the data of the message. The sourcetype definition may include one or more properties that indicate to the indexing system 112 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a sourcetype for the data is unknown to the indexing system 112, the indexing system 112 may infer a sourcetype for the data by examining the structure of the data. Then, the indexing system 112 can apply an inferred sourcetype definition to the data to create the events.

In addition, as part of generating events from the data, the indexing system 112 can determine a timestamp for each event. Similar to the process for parsing machine data, the indexing system 112 may again refer to a sourcetype definition associated with the data to locate one or more properties that indicate instructions for determining a timestamp for each event. The properties may, for example, instruct the indexing system 112 to extract a time value from a portion of data for the event (e.g., using a regex rule), to interpolate time values based on timestamps associated with temporally proximate events, to create a timestamp based on a time the portion of machine data was received or generated, to use the timestamp of a previous event, or use any other rules for determining timestamps, etc.

The indexing system 112 can also associate events with one or more metadata fields. In some embodiments, a timestamp may be included in the metadata fields. These metadata fields may include any number of "default fields" that are associated with all events, and may also include one more custom fields as defined by a user. In certain embodiments, the default metadata fields associated with each event may include a host, source, and sourcetype field including or in addition to a field storing the timestamp.

In certain embodiments, the indexing system 112 can also apply one or more transformations to event data that is to be included in an event. For example, such transformations can include removing a portion of the event data (e.g., a portion used to define event boundaries, extraneous characters from the event, other extraneous text, etc.), masking a portion of event data (e.g., masking a credit card number), removing redundant portions of event data, etc. The transformations applied to event data may, for example, be specified in one or more configuration files and referenced by one or more sourcetype definitions.

At block 206, the indexing system 112 can group events. In some embodiments, the indexing system 112 can group events based on time. For example, events generated within a particular time period or events that have a time stamp within a particular time period can be grouped together to form a bucket. A non-limiting example of a bucket is described herein with reference to FIG. 3B.

In certain embodiments, multiple components of the indexing system, such as an indexing node, can concurrently generate events and buckets. Furthermore, each indexing node that generates and groups events can concurrently generate multiple buckets. For example, multiple processors of an indexing node can concurrently process data, generate events, and generate buckets. Further, multiple indexing nodes can concurrently generate events and buckets. As such, ingested data can be processed in a highly distributed manner.

In some embodiments, as part of grouping events together, the indexing system 112 can generate one or more inverted indexes for a particular group of events. A non-limiting example of an inverted index is described herein with reference to FIG. 3C. In certain embodiments, the inverted indexes can include location information for events of a bucket. For example, the events of a bucket may be compressed into one or more files to reduce their size. The inverted index can include location information indicating the particular file and/or location within a particular file of a particular event.

In certain embodiments, the inverted indexes may include keyword entries or entries for field values or field name-value pairs found in events. In some cases, a field name-value pair can include a pair of words connected by a symbol, such as an equals sign or colon. The entries can also include location information for events that include the keyword, field value, or field value pair. In this way, relevant events can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2." In certain embodiments, the indexing system can populate entries in the inverted index with field name-value pairs by parsing events using one or more regex rules to determine a field value associated with a field defined by the regex rule. For example, the regex rule may indicate how to find a field value for a userID field in certain events. In some cases, the indexing system 112 can use the sourcetype of the event to determine which regex to use for identifying field values.

Figure 3B:
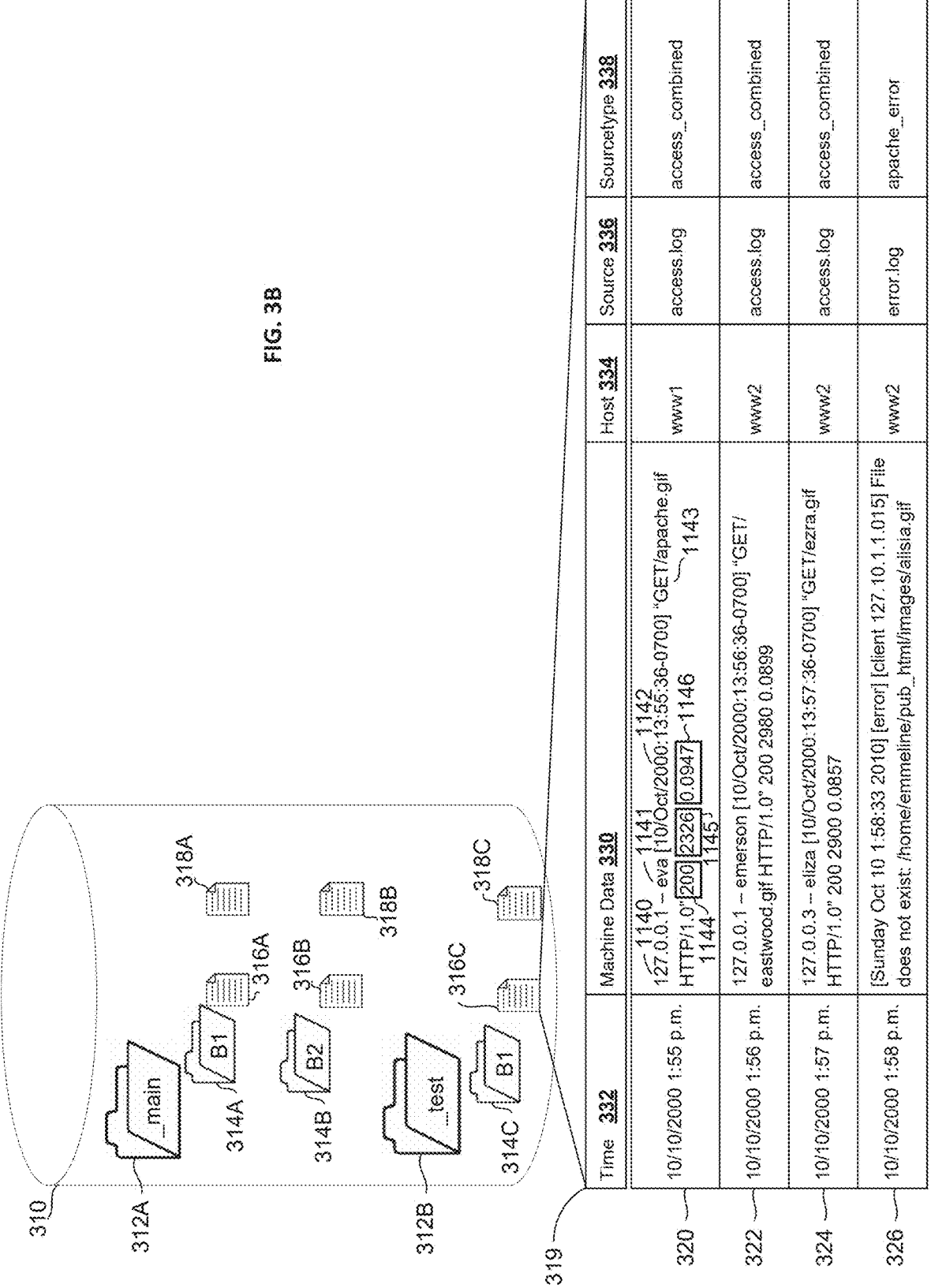
FIGS. 3B and 3C are block diagrams illustrating embodiments of various data structures for storing data processed by the data intake and query system.
Figure 3C:
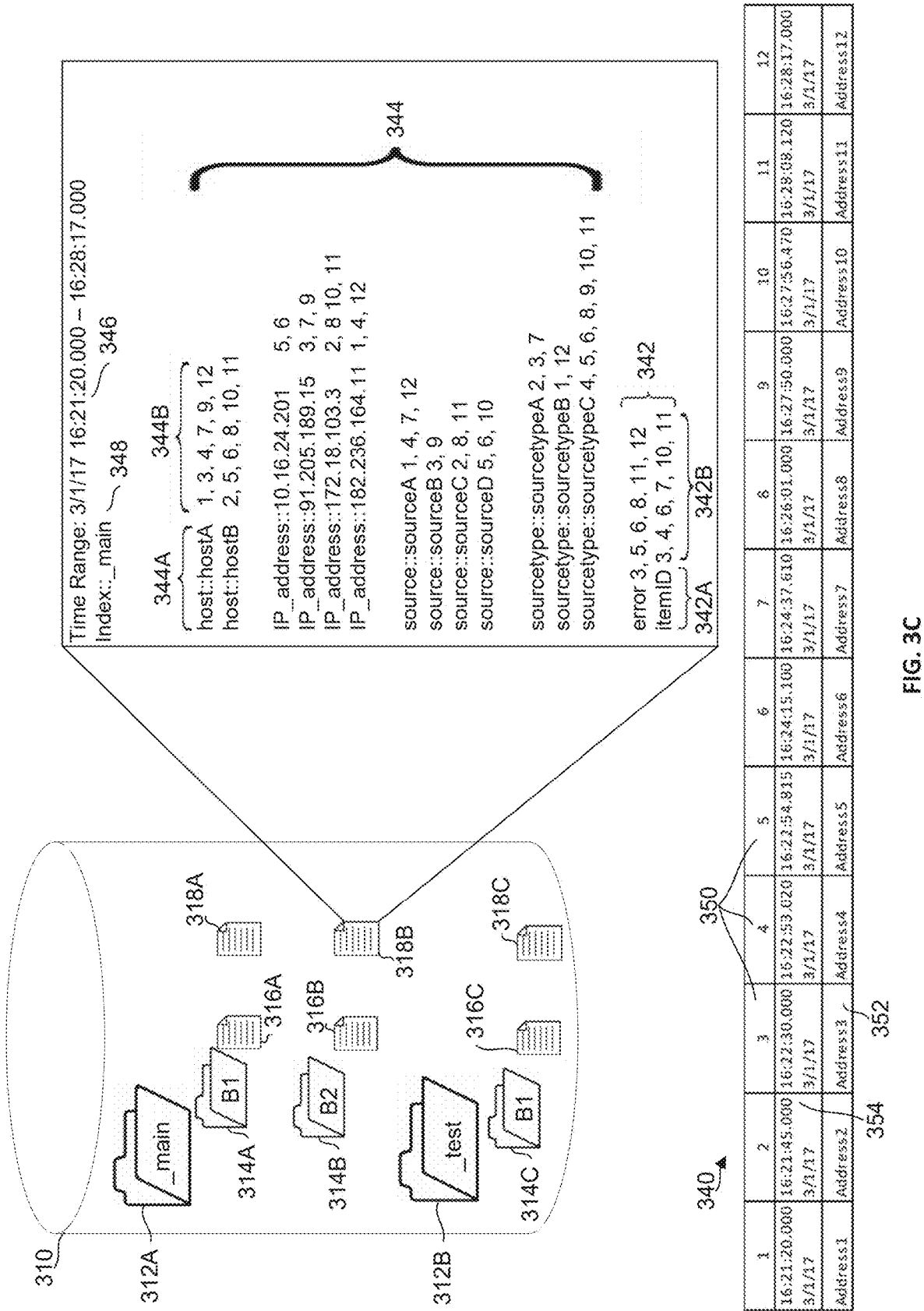

At block 208, the indexing system 112 stores the events with an associated timestamp in the storage system 116, which may be in a local data store and/or in a shared storage system. Timestamps enable a user to search for events based on a time range. In some embodiments, the stored events are organized into "buckets," where each bucket stores events associated with a specific time range based on the time-stamps associated with each event. As mentioned, FIGS. 3B and 3C illustrate an example of a bucket. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

The indexing system 112 may be responsible for storing the events in the storage system 116. As mentioned, the events or buckets can be stored locally on a component of the indexing system 112 or in a shared storage system 116. In certain embodiments, the component that generates the events and/or stores the events (indexing node) can also be assigned to search the events. In some embodiments separate components can be used for generating and storing events (indexing node) and for searching the events (search node).

By storing events in a distributed manner (either by storing the events at different components or in a shared storage system 116), the query system 114 can analyze events for a query in parallel. For example, using map-reduce techniques, multiple components of the query system (e.g., indexing or search nodes) can concurrently search and provide partial responses for a subset of events to another component (e.g., search head) that combines the results to produce an answer for the query. By storing events in buckets for specific time ranges, the indexing system 112 may further optimize the data retrieval process by the query system 114 to search buckets corresponding to time ranges that are relevant to a query. In some embodiments, each bucket may be associated with an identifier, a time range, and a size constraint. In certain embodiments, a bucket can correspond to a file system directory and the machine data, or events, of a bucket can be stored in one or more files of the file system directory. The file system directory can include additional files, such as one or more inverted indexes, high performance indexes, permissions files, configuration files, etc.

In embodiments where components of the indexing system 112 store buckets locally, the components can include a home directory and a cold directory. The home directory can store hot buckets and warm buckets, and the cold directory stores cold buckets. A hot bucket can refer to a bucket that is capable of receiving and storing additional events. A warm bucket can refer to a bucket that can no longer receive events for storage, but has not yet been moved to the cold directory. A cold bucket can refer to a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, components of the indexing system 112 may also have a quarantine bucket that contains events having potentially inaccurate information, such as an incorrect timestamp associated with the event or a timestamp that appears to be an unreasonable timestamp for the corresponding event. The quarantine bucket may have events from any time range; as such, the quarantine bucket may always be searched at search time. Additionally, components of the indexing system may store old, archived data in a frozen bucket that is not capable of being searched at search time. In some embodiments, a frozen bucket may be stored in slower and/or larger memory, such as a hard disk, and may be stored in offline and/or remote storage.

In some embodiments, components of the indexing system 112 may not include a cold directory and/or cold or frozen buckets. For example, in embodiments where buckets are copied to a shared storage system 116 and searched by separate components of the query system 114, buckets can be deleted from components of the indexing system as they are stored to the storage system 116. In certain embodiments, the shared storage system 116 may include a home directory that includes warm buckets copied from the indexing system 112 and a cold directory of cold or frozen buckets as described above.

FIG. 3A is a block diagram illustrating an embodiment of machine data received by the system 102. The machine data can correspond to data from one or more host devices 104 or data sources. As mentioned, the data source can correspond to a log file, data stream or other data structure that is accessible by a host device 104. In the illustrated embodiment of FIG. 3A, the machine data has different forms. For example, the machine data 302 may be log data that is unstructured or that does not have any clear structure or fields, and include different portions 302A-302E that correspond to different entries of the log and that separated by boundaries. Such data may also be referred to as raw machine data.

The machine data 304 may be referred to as structured or semi-structured machine data as it does include some data in a Java Script Object Notification (JSON) structure defining certain field and field values (e.g., machine data 304A showing field name: field values container_name: kube-apiserver, host: ip 172 20 43 173.ec2.internal, pod_id: 0a73017b-4efa-11e8-a4e1-0a2bf2ab4bba, etc.), but other parts of the machine data 304 is unstructured or raw machine data (e.g., machine data 304B). The machine data 306 may be referred to as structured data as it includes particular rows and columns of data with field names and field values.

In some embodiments, the machine data 302 can correspond to log data generated by a host device 104 configured as an Apache server, the machine data 304 can correspond to log data generated by a host device 104 in a shared computing resource environment, and the machine data 306 can correspond to metrics data. Given the differences between host devices 104 that generated the log data 302, 304, the form of the log data 302, 304 is different. In addition, as the log data 304 is from a host device 104 in a shared computing resource environment, it can include log data generated by an application being executed within an isolated execution environment (304B, excluding the field name "log:") and log data generated by an application that enables the sharing of computing resources between isolated execution environments (all other data in 304). Although shown together in FIG. 3A, it will be understood that machine data with different hosts, sources, or sourcetypes can be received separately and/or found in different data sources and/or host devices 104.

As described herein, the system 102 can process the machine data based on the form in which it is received. In some cases, the intake system 110 can utilize one or more rules to process the data. In certain embodiments, the intake system 110 can enrich the received data. For example, the intake system may add one or more fields to the data received from the host devices 104, such as fields denoting the host, source, sourcetype, index, or tenant associated with the incoming data. In certain embodiments, the intake system 110 can perform additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

In some cases, the data processed by the intake system 110 can be communicated or made available to the indexing system 112, the query system 114, and/or to other systems. In some embodiments, the intake system 110 communicates or makes available streams of data using one or more shards. For example, the indexing system 112 may read or receive data from one shard and another system may receive data from another shard. As another example, multiple systems may receive data from the same shard.

As used herein, a partition can refer to a logical division of data. In some cases, the logical division of data may refer to a portion of a data stream, such as a shard from the intake system 110. In certain cases, the logical division of data can refer to an index or other portion of data stored in the storage system 116, such as different directories or file structures used to store data or buckets. Accordingly, it will be understood that the logical division of data referenced by the term partition will be understood based on the context of its use.

FIGS. 3B and 3C are block diagrams illustrating embodiments of various data structures for storing data processed by the system 102. FIG. 3B includes an expanded view illustrating an example of machine data stored in a data store 310 of the data storage system 116. It will be understood that the depiction of machine data and associated metadata as rows and columns in the table 319 of FIG. 3B is merely illustrative and is not intended to limit the data format in which the machine data and metadata is stored in various embodiments described herein. In one particular embodiment, machine data can be stored in a compressed or encrypted format. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

In the illustrated embodiment of FIG. 3B the data store 310 includes a directory 312 (individually referred to as 312A, 312B) for each index (or partition) that contains a portion of data stored in the data store 310 and a sub-directory 314 (individually referred to as 314A, 314B, 314C) for one or more buckets of the index. In the illustrated embodiment of FIG. 3B, each sub-directory 314 corresponds to a bucket and includes an event data file 316 (individually referred to as 316A, 316B, 316C) and an inverted index 318 (individually referred to as 318A, 318B, 318C). However, it will be understood that each bucket can be associated with fewer or more files and each sub-directory 314 can store fewer or more files.

In the illustrated embodiment, the data store 310 includes a _main directory 312A associated with an index "_main" and a _test directory 312B associated with an index "_test." However, the data store 310 can include fewer or more directories. In some embodiments, multiple indexes can share a single directory or all indexes can share a common directory. Additionally, although illustrated as a single data store 310, it will be understood that the data store 310 can be implemented as multiple data stores storing different portions of the information shown in FIG. 3C. For example, a single index can span multiple directories or multiple data stores.

Furthermore, although not illustrated in FIG. 3B, it will be understood that, in some embodiments, the data store 310 can include directories for each tenant and sub-directories for each index of each tenant, or vice versa. Accordingly, the directories 312A and 312B can, in certain embodiments, correspond to sub-directories of a tenant or include sub-directories for different tenants.

In the illustrated embodiment of FIG. 3B, two sub-directories 314A, 314B of the _main directory 312A and one sub-directory 312C of the _test directory 312B are shown. The sub-directories 314A, 314B, 314C can correspond to buckets of the indexes associated with the directories 312A, 312B. For example, the sub-directories 314A and 314B can correspond to buckets "B1" and "B2," respectively, of the index "_main" and the sub-directory 314C can correspond to bucket "B1" of the index "_test." Accordingly, even though there are two "B1" buckets shown, as each "B1" bucket is associated with a different index (and corresponding directory 312), the system 102 can uniquely identify them.

Although illustrated as buckets "B1" and "B2," it will be understood that the buckets (and/or corresponding sub-directories 314) can be named in a variety of ways. In certain embodiments, the bucket (or sub-directory) names can include information about the bucket. For example, the bucket name can include the name of the index with which the bucket is associated, a time range of the bucket, etc.

As described herein, each bucket can have one or more files associated with it, including, but not limited to one or more raw machine data files, bucket summary files, filter files, inverted indexes (also referred to herein as high performance indexes or keyword indexes), permissions files, configuration files, etc. In the illustrated embodiment of FIG. 3B, the files associated with a particular bucket can be stored in the sub-directory corresponding to the particular bucket. Accordingly, the files stored in the sub-directory 314A can correspond to or be associated with bucket "B1," of index "_main," the files stored in the sub-directory 314B can correspond to or be associated with bucket "B2" of index "_main," and the files stored in the sub-directory 314C can correspond to or be associated with bucket "B1" of index "_test."

FIG. 3B further illustrates an expanded event data file 316C showing an example of data that can be stored therein. In the illustrated embodiment, four events 320, 322, 324, 326 of the machine data file 316C are shown in four rows. Each event 320-326 includes machine data 330 and a timestamp 332. The machine data 330 can correspond to the machine data received by the system 102. For example, in the illustrated embodiment, the machine data 330 of events 320, 322, 324, 326 corresponds to portions 302A, 302B, 302C, 302D, respectively, of the machine data 302 after it was processed by the indexing system 112.

Metadata 334-338 associated with the events 320-326 is also shown in the table 319. In the illustrated embodiment, the metadata 334-338 includes information about a host 334, source 336, and sourcetype 338 associated with the events 320-326. Any of the metadata can be extracted from the corresponding machine data, or supplied or defined by an entity, such as a user or computer system. The metadata fields 334-338 can become part of, stored with, or otherwise associated with the events 320-326. In certain embodiments, the metadata 334-338 can be stored in a separate file of the sub-directory 314C and associated with the machine data file 316C. In some cases, while the timestamp 332 can be extracted from the raw data of each event, the values for the other metadata fields may be determined by the indexing system 112 based on information it receives pertaining to the host device 104 or data source of the data separate from the machine data.

While certain default or user-defined metadata fields can be extracted from the machine data for indexing purposes, the machine data within an event can be maintained in its original condition. As such, in embodiments in which the portion of machine data included in an event is unprocessed or otherwise unaltered, it is referred to herein as a portion of raw machine data. For example, in the illustrated embodiment, the machine data of events 320-326 is identical to the portions of the machine data 302A-302D, respectively, used to generate a particular event. Similarly, the entirety of the machine data 302 may be found across multiple events. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various fields.

In other embodiments, the portion of machine data in an event can be processed or otherwise altered relative to the machine data used to create the event. With reference to machine data 304, the machine data of a corresponding event (or events) may be modified such that only a portion of the machine data 304 is stored as one or more events. For example, in some cases, only machine data 304B of the machine data 304 may be retained as one or more events or the machine data 304 may be altered to remove duplicate data, confidential information, etc.

In FIG. 3B, the first three rows of the table 319 present events 320, 322, and 324 and are related to a server access log that records requests from multiple clients processed by a server, as indicated by entry of "access.log" in the source column 336. In the example shown in FIG. 3B, each of the events 320-324 is associated with a discrete request made to the server by a client. The raw machine data generated by the server and extracted from a server access log can include the IP address 1140 of the client, the user id 1141 of the person requesting the document, the time 1142 the server finished processing the request, the request line 1143 from the client, the status code 1144 returned by the server to the client, the size of the object 1145 returned to the client (in this case, the gif file requested by the client) and the time spent 1146 to serve the request in microseconds. In the illustrated embodiments of FIGS. 3A, 3B, all the raw machine data retrieved from the server access log is retained and stored as part of the corresponding events 320-324 in the file 316C.

Event 326 is associated with an entry in a server error log, as indicated by "error.log" in the source column 336 that records errors that the server encountered when processing a client request. Similar to the events related to the server access log, all the raw machine data in the error log file pertaining to event 326 can be preserved and stored as part of the event 326.

Saving minimally processed or unprocessed machine data in a data store associated with metadata fields in the manner similar to that shown in FIG. 3B is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

FIG. 3C illustrates an embodiment of another file that can be included in one or more subdirectories 314 or buckets. Specifically, FIG. 3C illustrates an exploded view of an embodiments of an inverted index 318B in the sub-directory 314B, associated with bucket "B2" of the index "_main," as well as an event reference array 340 associated with the inverted index 318B.

In some embodiments, the inverted indexes 318 can correspond to distinct time-series buckets. As such, each inverted index 318 can correspond to a particular range of time for an index. In the illustrated embodiment of FIG. 3C, the inverted indexes 318A, 318B correspond to the buckets "B1" and "B2," respectively, of the index "_main," and the inverted index 318C corresponds to the bucket "B1" of the index "_test." In some embodiments, an inverted index 318 can correspond to multiple time-series buckets (e.g., include information related to multiple buckets) or inverted indexes 318 can correspond to a single time-series bucket.

Each inverted index 318 can include one or more entries, such as keyword (or token) entries 342 or field-value pair entries 344. Furthermore, in certain embodiments, the inverted indexes 318 can include additional information, such as a time range 346 associated with the inverted index or an index identifier 348 identifying the index associated with the inverted index 318. It will be understood that each inverted index 318 can include less or more information than depicted. For example, in some cases, the inverted indexes 318 may omit a time range 346 and/or index identifier 348. In some such embodiments, the index associated with the inverted index 318 can be determined based on the location (e.g., directory 312) of the inverted index 318 and/or the time range of the inverted index 318 can be determined based on the name of the sub-directory 314.

Token entries, such as token entries 342 illustrated in inverted index 318B, can include a token 342A (e.g., "error," "itemID," etc.) and event references 342B indicative of events that include the token. For example, for the token "error," the corresponding token entry includes the token "error" and an event reference, or unique identifier, for each event stored in the corresponding time-series bucket that includes the token "error." In the illustrated embodiment of FIG. 3C, the error token entry includes the identifiers 3, 5, 6, 8, 11, and 12 corresponding to events located in the bucket "B2" of the index "_main."

In some cases, some token entries can be default entries, automatically determined entries, or user specified entries. In some embodiments, the indexing system 112 can identify each word or string in an event as a distinct token and generate a token entry for the identified word or string. In some cases, the indexing system 112 can identify the beginning and ending of tokens based on punctuation, spaces, etc. In certain cases, the indexing system 112 can rely on user input or a configuration file to identify tokens for token entries 342, etc. It will be understood that any combination of token entries can be included as a default, automatically determined, or included based on user-specified criteria.

Similarly, field-value pair entries, such as field-value pair entries 344 shown in inverted index 318B, can include a field-value pair 344A and event references 344B indicative of events that include a field value that corresponds to the field-value pair (or the field-value pair). For example, for a field-value pair sourcetype::sendmail, a field-value pair entry 344 can include the field-value pair "sourcetype:: sendmail" and a unique identifier, or event reference, for each event stored in the corresponding time-series bucket that includes a sourcetype "sendmail."

In some cases, the field-value pair entries 344 can be default entries, automatically determined entries, or user specified entries. As a non-limiting example, the field-value pair entries for the fields "host," "source," and "sourcetype" can be included in the inverted indexes 318 as a default. As such, all of the inverted indexes 318 can include field-value pair entries for the fields "host," "source," and "sourcetype." As yet another non-limiting example, the field-value pair entries for the field "IP_address" can be user specified and may only appear in the inverted index 318B or the inverted indexes 318A, 318B of the index "_main" based on user-specified criteria. As another non-limiting example, as the indexing system 112 indexes the events, it can automatically identify field-value pairs and create field-value pair entries 344. For example, based on the indexing system's 212 review of events, it can identify IP_address as a field in each event and add the IP_address field-value pair entries to the inverted index 318B (e.g., based on punctuation, like two keywords separated by an '=' or ':' etc.). It will be understood that any combination of field-value pair entries can be included as a default, automatically determined, or included based on user-specified criteria.

With reference to the event reference array 340, each unique identifier 350, or event reference, can correspond to a unique event located in the time series bucket or machine data file 316B. The same event reference can be located in multiple entries of an inverted index 318. For example if an event has a sourcetype "splunkd," host "www1" and token "warning," then the unique identifier for the event can appear in the field-value pair entries 344 "sourcetype:: splunkd" and "host::www1," as well as the token entry "warning." With reference to the illustrated embodiment of FIG. 3C and the event that corresponds to the event reference 3, the event reference 3 is found in the field-value pair entries 344 "host::hostA," "source::sourceB," "sourcetype:: sourcetypeA," and "IP_address::91.205.189.15" indicating that the event corresponding to the event references is from hostA, sourceB, of sourcetypeA, and includes "91.205.189.15" in the event data.

For some fields, the unique identifier is located in only one field-value pair entry for a particular field. For example, the inverted index 318 may include four sourcetype field-value pair entries 344 corresponding to four different source-types of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 3C, since the event reference 7 appears in the field-value pair entry "source-type::sourcetypeA," then it does not appear in the other field-value pair entries for the sourcetype field, including "sourcetype::sourcetypeB," "sourcetype::sourcetypeC," and "sourcetype::sourcetypeD."

The event references 350 can be used to locate the events in the corresponding bucket or machine data file 316. For example, the inverted index 318B can include, or be associated with, an event reference array 340. The event reference array 340 can include an array entry 350 for each event reference in the inverted index 318B. Each array entry 350 can include location information 352 of the event corresponding to the unique identifier (non-limiting example: seek address of the event, physical address, slice ID, etc.), a timestamp 354 associated with the event, or additional information regarding the event associated with the event reference, etc.

For each token entry 342 or field-value pair entry 344, the event reference 342B, 344B, respectively, or unique identifiers can be listed in chronological order or the value of the event reference can be assigned based on chronological data, such as a timestamp associated with the event referenced by the event reference. For example, the event reference 1 in the illustrated embodiment of FIG. 3C can correspond to the first-in-time event for the bucket, and the event reference 12 can correspond to the last-in-time event for the bucket. However, the event references can be listed in any order, such as reverse chronological order, ascending order, descending order, or some other order (e.g., based on time received or added to the machine data file), etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 3C, the entries are sorted first by entry type and then alphabetically.

In some cases, inverted indexes 318 can decrease the search time of a query. For example, for a statistical query, by using the inverted index, the system 102 can avoid the computational overhead of parsing individual events in a machine data file 316. Instead, the system 102 can use the inverted index 318 separate from the raw record data store to generate responses to the received queries.

3.0. Query Processing and Execution

Figure 4A:
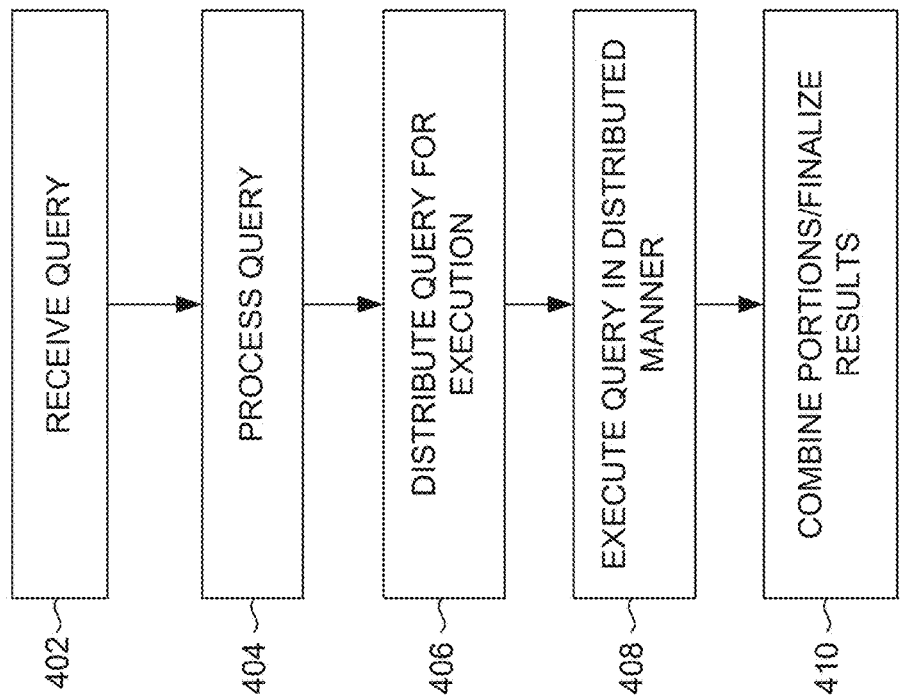
FIG. 4A is a flow diagram illustrating an embodiment of a routine implemented by the query system to execute a query.

FIG. 4A is a flow diagram illustrating an embodiment of a routine implemented by the query system 114 for executing a query. At block 402, the query system 114 receives a search query. As described herein, the query can be in the form of a pipelined command language or other query language and include filter criteria used to identify a set of data and processing criteria used to process the set of data.

At block 404, the query system 114 processes the query. As part of processing the query, the query system 114 can determine whether the query was submitted by an authenticated user and/or review the query to determine that it is in a proper format for the data intake and query system 102, has correct semantics and syntax, etc. In addition, the query system 114 can determine what, if any, configuration files or other configurations to use as part of the query.

In addition as part of processing the query, the query system 114 can determine what portion(s) of the query to execute in a distributed manner (e.g., what to delegate to search nodes) and what portions of the query to execute in a non-distributed manner (e.g., what to execute on the search head). For the parts of the query that are to be executed in a distributed manner, the query system 114 can generate specific commands, for the components that are to execute the query. This may include generating subqueries, partial queries or different phases of the query for execution by different components of the query system 114. In some cases, the query system 114 can use map-reduce techniques to determine how to map the data for the search and then reduce the data. Based on the map-reduce phases, the query system 114 can generate query commands for different components of the query system 114.

As part of processing the query, the query system 114 can determine where to obtain the data. For example, in some cases, the data may reside on one or more indexing nodes or search nodes, as part of the storage system 116 or may reside in a shared storage system or a system external to the system 102. In some cases, the query system 114 can determine what components to use to obtain and process the data. For example, the query system 114 can identify search nodes that are available for the query, etc.

At block 406, the query system 114 distributes the determined portions or phases of the query to the appropriate components (e.g., search nodes). In some cases, the query system 114 can use a catalog to determine which components to use to execute the query (e.g., which components include relevant data and/or are available, etc.).

At block 408, the components assigned to execute the query, execute the query. As mentioned, different components may execute different portions of the query. In some cases, multiple components (e.g., multiple search nodes) may execute respective portions of the query concurrently and communicate results of their portion of the query to another component (e.g., search head). As part of the identifying the set of data or applying the filter criteria, the components of the query system 114 can search for events that match the criteria specified in the query. These criteria can include matching keywords or specific values for certain fields. The searching operations at block 408 may use the late-binding schema to extract values for specified fields from events at the time the query is processed. In some embodiments, one or more rules for extracting field values may be specified as part of a sourcetype definition in a configuration file or in the query itself. In certain embodiments where search nodes are used to obtain the set of data, the search nodes can send the relevant events back to the search head, or use the events to determine a partial result, and send the partial result back to the search head.

At block 410, the query system 114 combines the partial results and/or events to produce a final result for the query.

As mentioned, in some cases, combining the partial results and/or finalizing the results can include further processing the data according to the query. Such processing may entail joining different set of data, transforming the data, and/or performing one or more mathematical operations on the data, preparing the results for display, etc.

In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the query system 114 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring to the search jobs.

The query system 114 can also perform various operations to make the search more efficient. For example, before the query system 114 begins execution of a query, it can determine a time range for the query and a set of common keywords that all matching events include. The query system 114 may then use these parameters to obtain a superset of the eventual results. Then, during a filtering stage, the query system 114 can perform field-extraction operations on the superset to produce a reduced set of search results. This speeds up queries, which may be particularly helpful for queries that are performed on a periodic basis. In some cases, to make the search more efficient, the query system 114 can use information known about certain data sets that are part of the query to filter other data sets. For example, if an early part of the query includes instructions to obtain data with a particular field, but later commands of the query do not rely on the data with that particular field, the query system 114 can omit the superfluous part of the query from execution.

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can include filter criteria used to search or filter for specific data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "l." In such embodiments, a set of data, such as a set of events, can be operated on by a first SPL command in the sequence, and then a subsequent SPL command following a pipe symbol "l" after the first SPL command operates on the results produced by the first SPL command or other set of data, and so on for any additional SPL commands in the sequence. As such, a query formulated using SPL comprises a series of consecutive commands that are delimited by pipe "l" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms or filter criteria at the beginning of the pipeline. Such search terms or filter criteria can include any combination of keywords, phrases, times, dates, Boolean expressions, fieldname-field value pairs, etc. that specify which results should be obtained from different locations. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field criteria. For example, a search command can filter events based on the word "warning" or filter events based on a field value "10.0.1.2" associated with a field "clientip."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns can contain basic information about the data and/or data that has been dynamically extracted at search time.

Figure 4B:
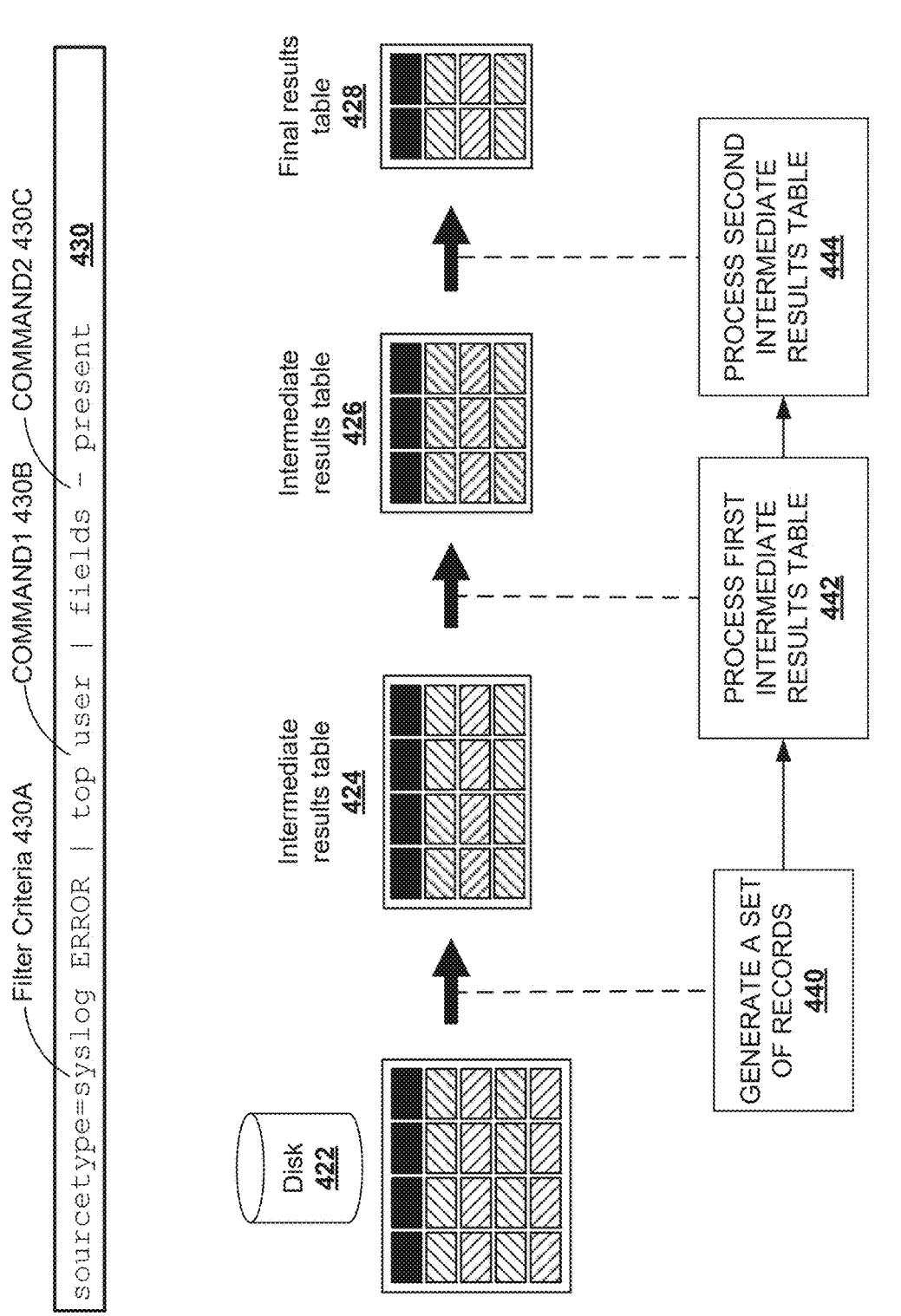
FIG. 4B provides a visual representation of the manner in which a pipelined command language or query can operate.

FIG. 4B provides a visual representation of the manner in which a pipelined command language or query can operate in accordance with the disclosed embodiments. The query 430 can be input by the user and submitted to the query system 114. In the illustrated embodiment, the query 430 comprises filter criteria 430A, followed by two commands 430B, 430C (namely, Command1 and Command2). Disk 422 represents data as it is stored in a data store to be searched. For example, disk 422 can represent a portion of the storage system 116 or some other data store that can be searched by the query system 114. Individual rows of can represent different events and columns can represent different fields for the different events. In some cases, these fields can include raw machine data, host, source, and sourcetype.

At block 440, the query system 114 uses the filter criteria 430A (e.g., "sourcetype=syslog ERROR") to filter events stored on the disk 422 to generate an intermediate results table 424. Given the semantics of the query 430 and order of the commands, the query system 114 can execute the filter criteria 430A portion of the query 430 before executing Command1 or Command2.

Rows in the table 424 may represent individual records, where each record corresponds to an event in the disk 422 that satisfied the filter criteria. Columns in the table 424 may correspond to different fields of an event or record, such as "user," "count," percentage," "timestamp," or the raw machine data of an event, etc. Notably, the fields in the intermediate results table 424 may differ from the fields of the events on the disk 422. In some cases, this may be due to the late binding schema described herein that can be used to extract field values at search time. Thus, some of the fields in table 424 may not have existed in the events on disk 422.

Illustratively, the intermediate results table 424 has fewer rows than what is shown in the disk 422 because only a subset of events retrieved from the disk 422 matched the filter criteria 430A "sourcetype=syslog ERROR." In some embodiments, instead of searching individual events or raw machine data, the set of events in the intermediate results table 424 may be generated by a call to a pre-existing inverted index.

At block 442, the query system 114 processes the events of the first intermediate results table 424 to generate the second intermediate results table 426. With reference to the query 430, the query system 114 processes the events of the first intermediate results table 424 to identify the top users according to Command1. This processing may include determining a field value for the field "user" for each record in the intermediate results table 424, counting the number of unique instances of each "user" field value (e.g., number of users with the name David, John, Julie, etc.) within the intermediate results table 424, ordering the results from largest to smallest based on the count, and then keeping only the top 10 results (e.g., keep an identification of the top 10 most common users). Accordingly, each row of table 426 can represent a record that includes a unique field value for the field "user," and each column can represent a field for that record, such as fields "user," "count," and "percentage."

At block 444, the query system 114 processes the second intermediate results table 426 to generate the final results table 428. With reference to query 430, the query system 114 applies the command "fields-present" to the second intermediate results table 426 to generate the final results table 428. As shown, the command "fields-present" of the query 430 results in one less column, which may represent that a field was removed during processing. For example, the query system 114 may have determined that the field "percentage" was unnecessary for displaying the results based on the Command2. In such a scenario, each record of the final results table 428 would include a field "user," and "count." Further, the records in the table 428 would be ordered from largest count to smallest count based on the query commands.

It will be understood that the final results table 428 can be a third intermediate results table, which can be pipelined to another stage where further filtering or processing of the data can be performed, e.g., preparing the data for display purposes, filtering the data based on a condition, performing a mathematical calculation with the data, etc. In different embodiments, other query languages, such as the Structured Query Language ("SQL"), can be used to create a query.

As described herein, extraction rules can be used to extract field-value pairs or field values from data. An extraction rule can comprise one or more regex rules that specify how to extract values for the field corresponding to the extraction rule. In addition to specifying how to extract field values, the extraction rules may also include instructions for deriving a field value by performing a function on a character string or value retrieved by the extraction rule. For example, an extraction rule may truncate a character string or convert the character string into a different data format. Extraction rules can be used to extract one or more values for a field from events by parsing the portions of machine data in the events and examining the data for one or more patterns of characters, numbers, delimiters, etc., that indicate where the field begins and, optionally, ends. In certain embodiments, extraction rules can be stored in one or more configuration files. In some cases, a query itself can specify one or more extraction rules.

In some cases, extraction rules can be applied at data ingest by the intake system 110 and/or indexing system 112. For example, the intake system 110 and indexing system 112 can apply extraction rules to ingested data and/or events generated from the ingested data and store results in an inverted index.

The system 102 advantageously allows for search time field extraction. In other words, fields can be extracted from the event data at search time using late-binding schema as opposed to at data ingestion time, which was a major limitation of the prior art systems. Accordingly, extraction rules can be applied at search time by the query system 114. The query system can apply extraction rules to events retrieved from the storage system 116 or data received from sources external to the system 102. Extraction rules can be applied to all the events in the storage system 116 or to a subset of the events that have been filtered based on some filter criteria (e.g., event timestamp values, etc.).

Figure 4C:
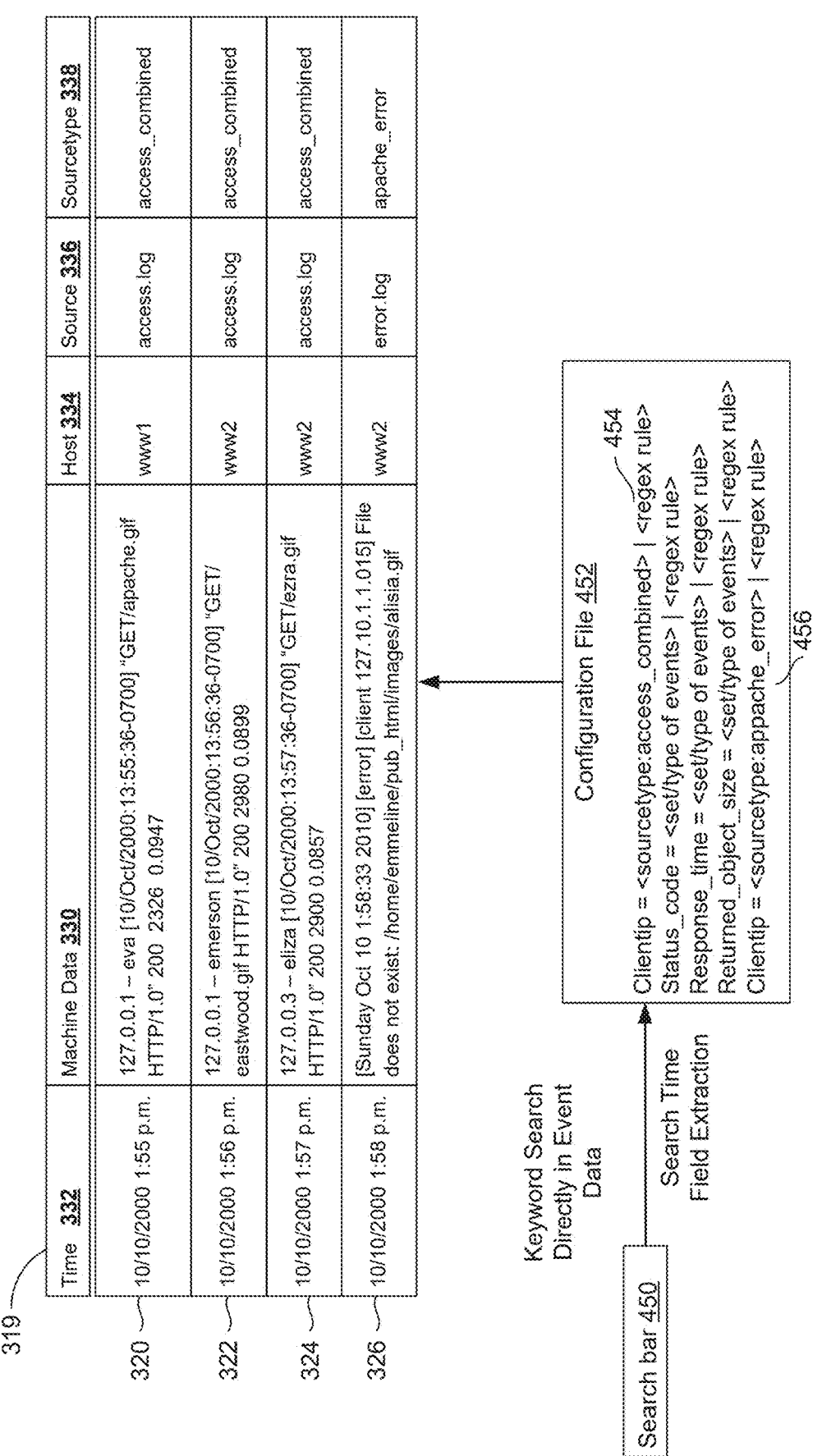
FIG. 4C is a block diagram illustrating an embodiment of a configuration file that includes various extraction rules that can be applied to events.

FIG. 4C is a block diagram illustrating an embodiment of the table 319 showing events 320-326, described previously with reference to FIG. 3B. As described herein, the table 319 is for illustrative purposes, and the events 320-326 may be stored in a variety of formats in an event data file 316 or raw record data store. Further, it will be understood that the event data file 316 or raw record data store can store millions of events. FIG. 4C also illustrates an embodiment of a search bar 450 for entering a query and a configuration file 452 that includes various extraction rules that can be applied to the events 320-326.

As a non-limiting example, if a user inputs a query into search bar 450 that includes only keywords (also known as "tokens"), e.g., the keyword "error" or "warning," the query system 114 can search for those keywords directly in the events 320-326 stored in the raw record data store.

As described herein, the indexing system 112 can optionally generate and use an inverted index with keyword entries to facilitate fast keyword searching for event data. If a user searches for a keyword that is not included in the inverted index, the query system 114 may nevertheless be able to retrieve the events by searching the event data for the keyword in the event data file 316 or raw record data store directly. For example, if a user searches for the keyword "eva," and the name "eva" has not been indexed at search time, the query system 114 can search the events 320-326 directly and return the first event 320. In the case where the keyword has been indexed, the inverted index can include a reference pointer that will allow for a more efficient retrieval of the event data from the data store. If the keyword has not been indexed, the query system 114 can search through the events in the event data file to service the search.

In many cases, a query include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the query, "status=404." This search query finds events with "status" fields that have a value of "404." When the search is run, the query system 114 does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user name=Bob." But in most cases, field values appear in fixed, delimited positions without identifying keys. For example, the data store may contain events where the "user_name" value always appears by itself after the timestamp as illustrated by the following string: "Nov 15 09:33:22 evaemerson."

FIG. 4C illustrates the manner in which configuration files may be used to configure custom fields at search time in accordance with the disclosed embodiments. In response to receiving a query, the query system 114 determines if the query references a "field." For example, a query may request a list of events where the "clientip" field equals "127.0.0.1." If the query itself does not specify an extraction rule and if the field is not an indexed metadata field, e.g., time, host, source, sourcetype, etc., then in order to determine an extraction rule, the query system 114 may, in one or more embodiments, locate configuration file 452 during the execution of the query.

Configuration file 452 may contain extraction rules for various fields, e.g., the "clientip" field. The extraction rules may be inserted into the configuration file 452 in a variety of ways. In some embodiments, the extraction rules can comprise regular expression rules that are manually entered in by the user.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system can then generate a regular expression that extracts those fields from similar events and store the regular expression as an extraction rule for the associated field in the configuration file 452.

In some embodiments, the indexing system 112 can automatically discover certain custom fields at index time and the regular expressions for those fields will be auto-matically generated at index time and stored as part of extraction rules in configuration file 452. For example, fields that appear in the event data as "key=value" pairs may be automatically extracted as part of an automatic field discov-ery process. Note that there may be several other ways of adding field definitions to configuration files in addition to the methods discussed herein.

Events from heterogeneous sources that are stored in the storage system 116 may contain the same fields in different locations due to discrepancies in the format of the data generated by the various sources. For example, event 326 also contains a "clientip" field, however, the "clientip" field is in a different format from events 320, 322, and 324. Furthermore, certain events may not contain a particular field at all. To address the discrepancies in the format and content of the different types of events, the configuration file 452 can specify the set of events to which an extraction rule applies. For example, extraction rule 454 specifies that it is to be used with events having a sourcetype "access_com-bined," and extraction rule 456 specifies that it is to be used with events having a sourcetype "apache_error." Other extraction rules shown in configuration file 452 specify a set or type of events to which they apply. In addition, the extraction rules shown in configuration file 452 include a regular expression for parsing the identified set of events to determine the corresponding field value. Accordingly, each extraction rule may pertain to only a particular type of event. Accordingly, if a particular field, e.g., "clientip" occurs in multiple types of events, each of those types of events can have its own corresponding extraction rule in the configu-ration file 452 and each of the extraction rules would comprise a different regular expression to parse out the associated field value. In some cases, the sets of events are grouped by sourcetype because events generated by a par-ticular source can have the same format.

The field extraction rules stored in configuration file 452 can be used to perform search-time field extractions. For example, for a query that requests a list of events with sourcetype "access_combined" where the "clientip" field equals "127.0.0.1," the query system 114 can locate the configuration file 452 to retrieve extraction rule 454 that allows it to extract values associated with the "clientip" field from the events where the sourcetype is "access_combined" (e.g., events 320-324). After the "clientip" field has been extracted from the events 320, 322, 324, the query system 114 can then apply the field criteria by performing a compare operation to filter out events where the "clientip" field does not equal "127.0.0.1." In the example shown in FIG. 4C, the events 320 and 322 would be returned in response to the user query. In this manner, the query system 114 can service queries with filter criteria containing field criteria and/or keyword criteria.

It should also be noted that any events filtered by per-forming a search-time field extraction using a configuration file 452 can be further processed by directing the results of the filtering step to a processing step using a pipelined search language. Using the prior example, a user can pipeline the results of the compare step to an aggregate function by asking the query system 114 to count the number of events where the "clientip" field equals "127.0.0.1."

By providing the field definitions for the queried fields at search time, the configuration file 452 allows the event data file or raw record data store to be field searchable. In other words, the raw record data store can be searched using keywords as well as fields, wherein the fields are searchable name/value pairings that can distinguish one event from another event and can be defined in configuration file 452 using extraction rules. In comparison to a search containing field names, a keyword search may result in a search of the event data directly without the use of a configuration file.

Further, the ability to add schema to the configuration file 452 at search time results in increased efficiency and flex-ibility. A user can create new fields at search time and simply add field definitions to the configuration file 452. As a user learns more about the data in the events, the user can continue to refine the late-binding schema by adding new fields, deleting fields, or modifying the field extraction rules in the configuration file for use the next time the schema is used by the system 102. Because the system 102 maintains the underlying raw data and uses late-binding schema for searching the raw data, it enables a user to continue inves-tigating and learn valuable insights about the raw data long after data ingestion time. Similarly, multiple field definitions can be added to the configuration file to capture the same field across events generated by different sources or source-types. This allows the system 102 to search and correlate data across heterogeneous sources flexibly and efficiently.

The system 102 can use one or more data models to search and/or better understand data. A data model is a hierarchi-cally structured search-time mapping of semantic knowl-edge about one or more datasets. It encodes the domain knowledge used to build a variety of specialized searches of those datasets. Those searches, in turn, can be used to generate reports.

The above-described system provides significant flexibil-ity by enabling a user to analyze massive quantities of minimally-processed data "on the fly" at search time using a late-binding schema, instead of storing pre-specified por-tions of the data in a database at ingestion time. This flexibility enables a user to see valuable insights, correlate data, and perform subsequent queries to examine interesting aspects of the data that may not have been apparent at ingestion time.

Performing extraction and analysis operations at search time can involve a large amount of data and require a large number of computational operations, which can cause delays in processing the queries. In some embodiments, the system 102 can employ a number of unique acceleration techniques to speed up analysis operations performed at search time. These techniques include: performing search operations in parallel using multiple components of the query system 114, using an inverted index 118, and accel-erating the process of generating reports.

To facilitate faster query processing, a query can be structured such that multiple components of the query system 114 (e.g., search nodes) perform the query in parallel, while aggregation of search results from the multiple components is performed at a particular component (e.g., search head). For example, consider a scenario in which a user enters the query "Search "error" | stats count BY host." The query system 114 can identify two phases for the query, including: (1) subtasks (e.g., data retrieval or simple filtering) that may be performed in parallel by multiple components, such as search nodes, and (2) a search results aggregation operation to be executed by one component, such as the search head, when the results are ultimately collected from the search nodes.

Based on this determination, the query system 114 can generate commands to be executed in parallel by the search nodes, with each search node applying the generated commands to a subset of the data to be searched. In this example, the query system 114 generates and then distributes the following commands to the individual search nodes: "Search "error" | prestats count BY host." In this example, the "prestats" command can indicate that individual search nodes are processing a subset of the data and are responsible for producing partial results and sending them to the search head. After the search nodes return the results to the search head, the search head aggregates the received results to form a single search result set. By executing the query in this manner, the system effectively distributes the computational operations across the search nodes while reducing data transfers. It will be understood that the query system 114 can employ a variety of techniques to use distributed components to execute a query. In some embodiments, the query system 114 can use distributed components for only mapping functions of a query (e.g., gather data, applying filter criteria, etc.). In certain embodiments, the query system 114 can use distributed components for mapping and reducing functions (e.g., joining data, combining data, reducing data, etc.) of a query.

4.0. Example Use Cases

The system 102 provides various schemas, dashboards, and visualizations that simplify developers' tasks to create applications with additional capabilities, including but not limited to security, data center monitoring, IT service monitoring, and client/customer insights.

An embodiment of an enterprise security application is as SPLUNK® ENTERPRISE SECURITY, which performs monitoring and alerting operations and includes analytics to facilitate identifying both known and unknown security threats based on large volumes of data stored by the system 102. The enterprise security application provides the security practitioner with visibility into security-relevant threats found in the enterprise infrastructure by capturing, monitoring, and reporting on data from enterprise security devices, systems, and applications. Through the use of the system 102 searching and reporting capabilities, the enterprise security application provides a top-down and bottom-up view of an organization's security posture.

An embodiment of an IT monitoring application is SPLUNK® IT SERVICE INTELLIGENCE™, which performs monitoring and alerting operations. The IT monitoring application also includes analytics to help an analyst diagnose the root cause of performance problems based on large volumes of data stored by the system 102 as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

As described herein, the system 102 can receive heterogeneous data from disparate systems. In some cases, the data from the disparate systems may be related and correlating the data can result in insights into client or customer interactions with various systems of a vendor. To aid in the correlation of data across different systems, multiple field definitions can be added to one or more configuration files to capture the same field or data across events generated by different sources or sourcetypes. This can enable the system 102 to search and correlate data across heterogeneous sources flexibly and efficiently.

Figure 4D:
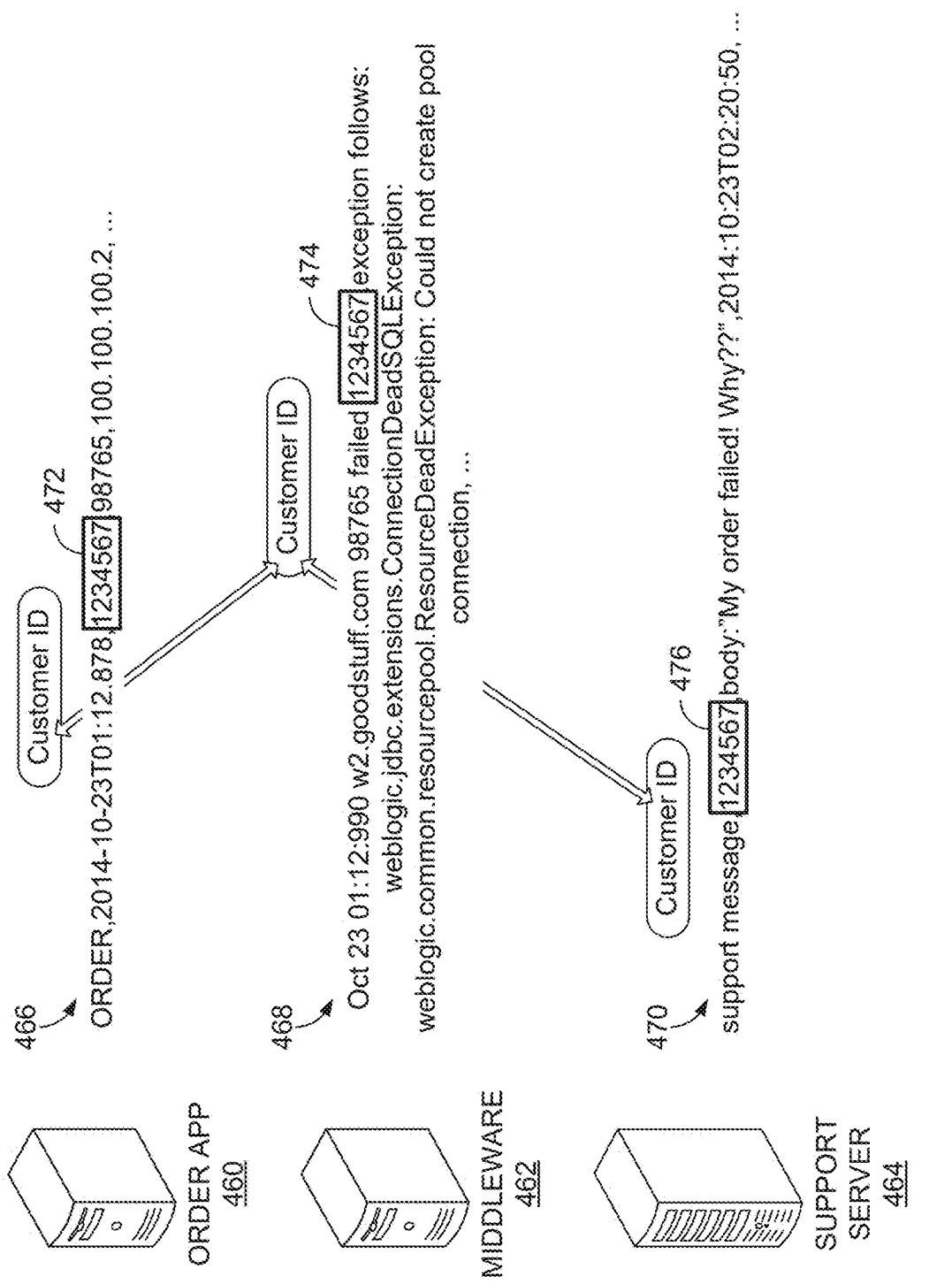
FIG. 4D is a block diagram illustrating an example scenario where a common customer identifier is found among log data received from disparate data sources.

As a non-limiting example and with reference to FIG. 4D, consider a scenario in which a common customer identifier is found among log data received from three disparate data sources. In this example, a user submits an order for merchandise using a vendor's shopping application program 460 running on the user's system. In this example, the order was not delivered to the vendor's server due to a resource exception at the destination server that is detected by the middleware code 462. The user then sends a message to the customer support server 464 to complain about the order failing to complete. The three systems 460, 462, 464 are disparate systems that do not have a common logging format. The shopping application program 460 sends log data 466 to the system 102 in one format, the middleware code 462 sends error log data 468 in a second format, and the support server 464 sends log data 470 in a third format.

Using the log data received at the system 102 from the three systems 460, 462, 464, the vendor can uniquely obtain an insight into user activity, user experience, and system behavior. The system 102 allows the vendor's administrator to search the log data from the three systems 460, 462, 464, thereby obtaining correlated information, such as the order number and corresponding customer ID number of the person placing the order. The system 102 also allows the administrator to see a visualization of related events via a user interface. The administrator can query the system 102 for customer ID field value matches across the log data from the three systems 460, 462, 464 that are stored in the storage system 116. While the customer ID field value exists in the data gathered from the three systems 460, 462, 464, it may be located in different areas of the data given differences in the architecture of the systems. The query system 114 obtains events from the storage system 116 related to the three systems 460, 462, 464. The query system 114 then applies extraction rules to the events in order to extract field values for the field "customer ID" that it can correlate. As described herein, the query system 114 may apply a different extraction rule to each set of events from each system when the event format differs among systems. In this example, a user interface can display to the administrator the events corresponding to the common customer ID field values 472, 474, and 476, thereby providing the administrator with insight into a customer's experience. The system 102 can provide additional user interfaces and reports to aid a user in analyzing the data associated with the customer.

5.0. Device Associated Data Retrieval System

Figure 5:
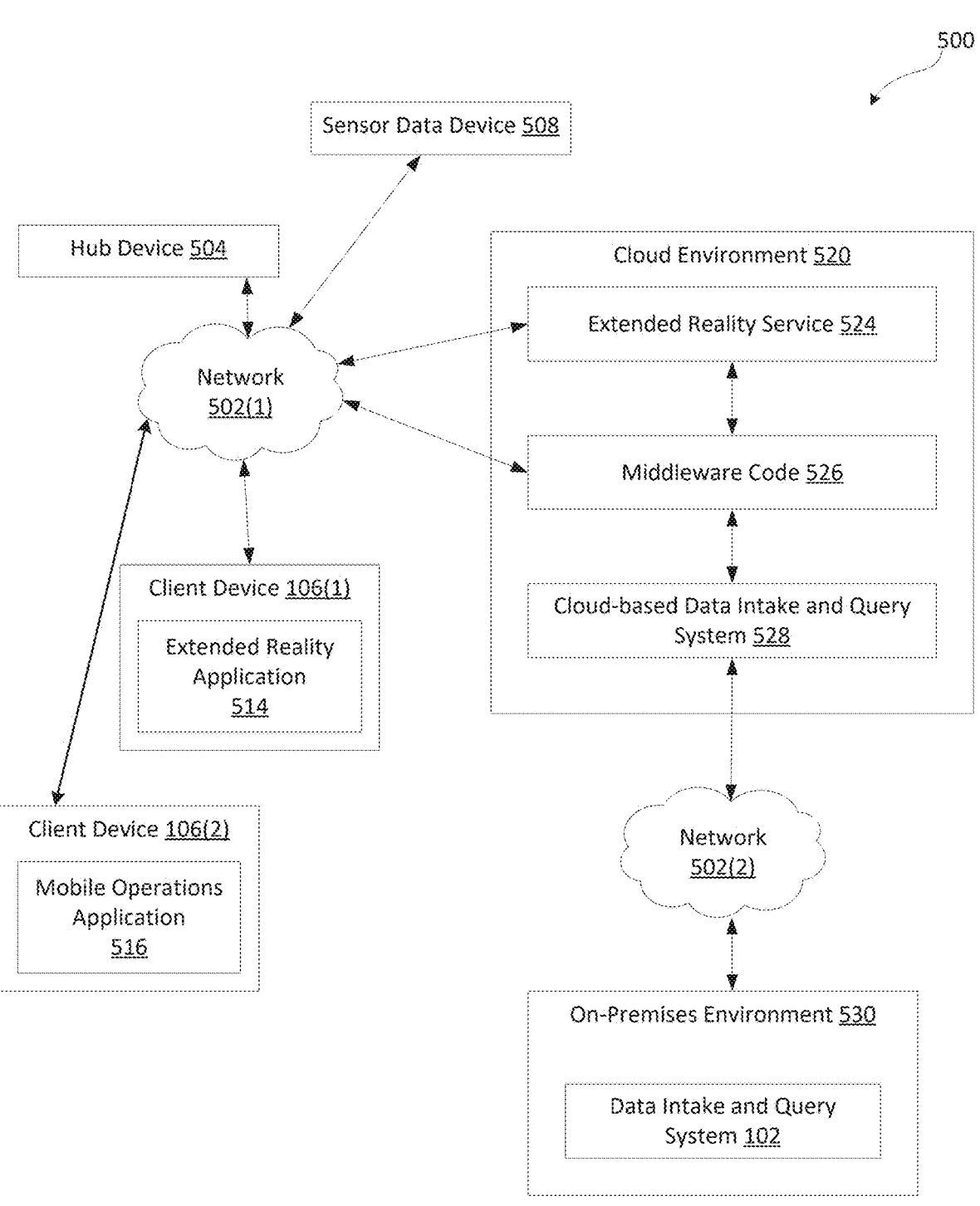
FIG. 5 illustrates a network architecture that enables secure communications via a network between client devices, hub devices, sensor data devices, and an on-premises. environment for the data intake and query system, in accordance with example implementations.

FIG. 5 illustrates a network architecture that enables secure communications via network 502 (e.g., 502(1), 502(2)) between client devices 106 (e.g., 106(1), 106(2), etc.), hub devices 504 (e.g., 504(1), 504(2), etc.), sensor data devices 508 (e.g., 508(1), 508(2), etc.), and an on-premises environment 530 for the data intake and query system 102, in accordance with example implementations.

As described above, a user may install and configure, on computing devices owned and operated by the user, one or more software applications that implement some or all of the data intake and query system 102. For example, a user may install a software application on server computers owned by the user and configure each server to operate as one or more of a forwarder, an indexer, a search head, etc. This arrangement generally may be referred to as an "on-premises" solution. An on-premises solution may provide a greater level of control over the configuration of certain aspects of the system (e.g., security, privacy, standards, controls, etc.).

In various implementations, the cloud-based data intake and query system 528, executing in the cloud environment 520, may serve as a secure bridge between an on-premises environment 1860 and an extended reality application 514 and/or a mobile operations application 516. In other implementations, the on-premises environment 1860 may be omitted and the entire computational process may be carried out in one or more aspects or components of the cloud environment 520. In various implementations, the cloud environment 520 may include a cloud-based data intake and query system 528, which communicates with the data intake and query system 102 via a network 502(2). The cloud environment 520 may further include middleware code 526 and/or a push notification service (not shown), which communicate with the extended reality application 514, the mobile operations application 516, the sensor data device 508, and/or the hub device 504 via a network 502(1). In various implementations, the network 502(1) and the network 502(2) may be portions of the same network or may include one or more shared network components that communicate with both the network 502(1) and the network 502(2). In various implementations, the data intake and query system 102 may communicate with a network interface of a given client device 106 through use of a mobile gateway that facilitates communication between devices behind a firewall, or set of firewalls, without requiring additional port openings.

In various implementations, the client device 106 retrieves data and displays the retrieved data via the extended reality application 514 and/or the mobile operations application 516. For example, the client device 106(1) could send a query to the data intake and query system 102 in order to receive a response that includes a set of field values. These field values, extracted from events, could be associated with data included in the query. In various implementations, the client device 106 and/or the data intake and query system 102 may generate content (e.g., schemas, dashboards, cards, and/or visualizations) based on the extracted field values.

In various implementations, an object (e.g., sensor data device 508) may have a tag that encodes or otherwise includes data. The data in the tag includes a textual and/or numerical string that operates as a unique identifier (UID). The tag is provided by an entity that owns or operates the environment in which the object resides. In such instances, the client device 106 may scan tags associated with the object, decode data included in the tag, determine a unique identifier from the decoded data, and use the unique identifier to receive field values, extracted from events, which are associated with the object. In various implementations, the client device 106 and/or the data intake and query system 102 may generate content (e.g., schemas, dashboards, cards, and/or visualizations) based on the extracted field values.

The extended reality application 514 executing on the client device 106(1) and/or the mobile operations application 516 executing on the client device 106(2) may establish secure, bidirectional communications with the data intake and query system 102. For example, in some implementations, a persistent, always-open, asynchronous socket for bidirectional communications (e.g., a trusted tunnel bridge) through a firewall of the on-premises environment 530 could be established between the data intake and query system 102 and the cloud-based data intake and query system 528. The cloud-based data intake and query system 528 may then communicate with the extended reality application 514 and/or the mobile operations application 516 via the middleware code 526 executing in the cloud environment 520.

Additionally, in some implementations, the cloud-based data intake and query system 528 and/or the middleware code 526 may communicate with the extended reality application 514 and/or the mobile operations application 516 via a push notification service, such as Apple Push Notification service (APNs) or Google Cloud Messaging (GCM). For example, the data intake and query system 102 could output to the one or more client devices 106, based on the unique identifier, content that includes real-time data associated with a particular object. The content could then be displayed by the client device 106. For example, the mobile operations application 516 could display the content in a window provided by the client device 106. In some implementations, the extended reality application 514 may display the content in relation to the real-world object, in conjunction with an augmented reality workspace. Additionally or alternatively, various playbooks, insights, predictions, annotations, and/or runbooks that include set of commands and/or logic trees (e.g., if-then-else) associated with an object and possible actions (e.g., "if the operating temperature is above 100 degrees Celsius, then show options for activating fans") may be implemented and/or displayed to the user.

In some implementations, in order to authenticate an instance of the extended reality application 514 and/or the mobile operations application 516 associated with a particular user and/or client device 106, the extended reality application 514 and/or the mobile operations application 516 may cause a unique identifier associated with the user and/or the client device 106 to be displayed on a display device (e.g., on a display of the client device 106). The user may then register the unique identifier with the cloud-based data intake and query system 528 and/or the data intake and query system 102, such as by entering the unique identifier into a user interface (e.g., a web portal) associated with the cloud-based data intake and query system 528 or the data intake and query system 102. In response, the extended reality application 514 and/or the mobile operations application 516 may receive credentials that can be used to access real-time data outputted by the data intake and query system 102. Additional queries transmitted by the client device 106 to the data intake and query system 102 may then implement the credentials associated with the unique identifier. In this manner, secure, bidirectional communications may be established between the client device 106 and the data intake and query system 102.

Once the communications connection is established, a user may cause the client device 106 to acquire data based on a tag provided by, or otherwise associated with, a given object. For example, the client device 106 could scan a tag provided by sensor data device 508 and may decode the tag to retrieve a unique object identifier (UOID) from the tag that corresponds to the particular sensor data device 508.

Once client device 106 obtains the UOID, the client device 106 transmits queries to the data intake and query system 102, requesting one or more values associated with the object. For example, the client device 106 could send a request for specific field values for the object. The client device 106 could include the UOID in the request that is sent to the data intake and query system 102. In response, the data intake and query system 102 may retrieve events associated with the UOID and may use extraction rules to extract values for fields in the events being searched, where the extracted values include the requested field values. The data intake and query system 102 then transmits the field values associated with the UOID to the client device 106. In various implementations, the data intake and query system 102 may transmit the raw data retrieved from the field values included in the event data. Alternatively, the data intake and query system 102 may filter, aggregate, or otherwise process the raw data prior to transmitting the field values. For example, in some implementations, the data intake and query system 102 may generate a dashboard associated with the unique object ID. The dashboard may include a filtered subset of data values, where the subset of data values is filtered based on additional criteria, such as user role (e.g., a user role identifier value), location, type of device (e.g., whether client device 106-1 is a smart phone, tablet, AR headset, etc.), and/or time.

The extended reality application 514 receives the field values from the data intake and query system 102, where the field values represent the values of one or more metrics associated with the UOID. In an implementation, the field values are extracted from fields that are defined post-ingestion (e.g., at search time), as has been previously described (e.g., with a late-binding schema). The field values transmitted by the data intake and query system 102 may be in any technically-feasible format.

In various implementations, the data intake and query system 102 may generate a dashboard that includes one or more visualizations of the underlying textual and/or numerical information based on the retrieved field values. In various implementations, the mobile operations application 516 may display one or more visualizations that are included in the dashboard received from the data intake and query system 102. Additionally or alternatively, the extended reality application 514 may generate an AR workspace that includes one or more panels, where the one or more panels include the visualizations (included in the dashboard) as a portion of an AR workspace. In some implementations, the dashboard may also include a portion of the field values as a data set. In such instances, the extended reality application 514 and/or the mobile operations application 516 may generate visualizations based on the field values included in the data set.

Figure 6:
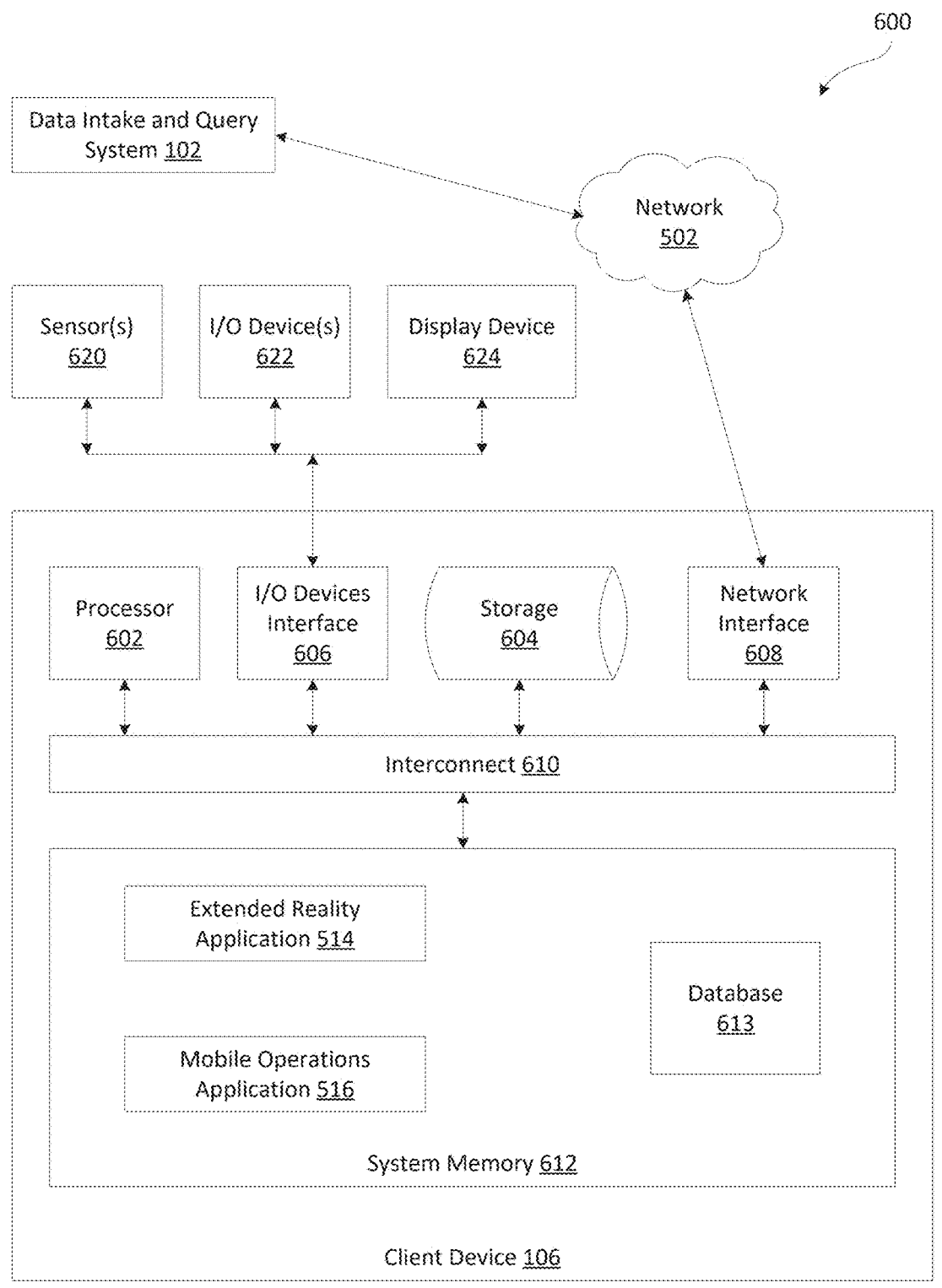
FIG. 6 illustrates a more detailed view of the example data processing environment of FIG. 1, in accordance with example implementations.

FIG. 6 illustrates a more detailed view of the example data processing environment 100 of FIG. 1, in accordance with example implementations. As shown, the data processing environment 600 may include, without limitation, the data intake and query system 102 and the client device 106 communicating with one another over the network 502. The data intake and query system 102 and the client device 106 function substantially the same as described in conjunction with FIGS. 1 and 5, except as further described herein. Examples of the client device 106 may include, without limitation, a mobile device (e.g., a smartphone, a tablet computer, a handheld computer, a wearable device, a portable media player, a virtual reality (VR) console, an augmented reality (AR) console, a laptop computer, a desktop computer, a server, a gaming device, a streaming device (e.g., an Apple TV® device, a Roku® device, etc.), and so forth. The client device 106 may include, without limitation, a processor 602, storage 604, an input/output (I/O) device interface 606, a network interface 608, an interconnect 610, and system memory 612. The system memory 612 includes the extended reality application 514, mobile operations application 516, and database 613.

In general, the processor 602 may retrieve and execute programming instructions stored in the system memory 612. The processor 602 may be any technically-feasible form of processing device configured to process data and execute program code. The processor 602 could be, for example, a central processing unit (CPU), a graphics processing unit (GPU), an application-specific integrated circuit (ASIC), a field-programmable gate array (FPGA), and so forth. The processor 602 stores and retrieves application data residing in the system memory 612. The processor 602 is included to be representative of a single CPU, multiple CPUs, a single CPU having multiple processing cores, and the like. In operation, the processor 602 is the manager processor of the client device 106, controlling and coordinating operations of other system components.

The system memory 612 stores software application programs and data for use by the processor 602. For example, the system memory 612 could include, without limitation, the extended reality application 514, the mobile operations application 516, and/or a database 613. The processor 602 executes software application programs stored within the system memory 612 and, optionally, an operating system. In particular, the processor 602 executes software and then performs one or more of the functions and operations set forth in the present application.

The storage 604 may be a disk drive storage device. Although shown as a single unit, the storage 604 may be a combination of fixed and/or removable storage devices, such as fixed disc drives, floppy disc drives, tape drives, removable memory cards, or optical storage, network attached storage (NAS), or a storage area-network (SAN). The processor 602 communicates to other computing devices and systems via the network interface 608, where the network interface 608 is configured to transmit and receive data via one or more communications networks 502.

The interconnect 610 facilitates transmission, such as of programming instructions and application data, between the processor 602, the input/output (I/O) device interface 606, the storage 604, the network interface 608, and the system memory 612. The I/O device interface 606 is configured to receive input data from user I/O devices. These I/O devices include, without limitation, sensor(s) 620 (e.g., one or more cameras, location sensor(s), etc.), input device(s) 622 (e.g., a keyboard, stylus, microphone, etc.), and/or a display device 624. The display device 624 generally represents any technically-feasible means for generating an image for display. For example, the display device 1924 could be a liquid crystal display (LCD) display, an organic light-emitting diode (OLED) display, or a digital light processing (DLP) display. The sensor 620, such as camera, acquires images via a lens and converts the images into digital form. The images acquired by the camera may be stored in the storage 604 and/or the system memory 612. An acquired image may be displayed on the display device 624, either alone or in conjunction with one or more other acquired images, graphical overlays, and/or other data.

The sensor(s) 620 may include location sensors enable the client device 106 to determine the physical location and/or orientation of the client device 106. In some implementations, the location sensor(s) may include a network-based sensor that communicates with the data intake and query system 102 via the network 502, which may be part of a production-monitoring network. In some implementations, the location sensor(s) may include a network-based sensor that communicates with one or more data intake and query systems 102 via a local area network (LAN) and/or a wide area network (WAN). In various implementations, the production-monitoring environment may include multiple objects (e.g., sensor data devices 508) and/or multiple client devices 106. Each of the client devices 106 may communicate with a data intake and query system 102, and each of the client devices 106 is capable of identifying one or more objects based on identifier tags, geofences, and/or any other object-identification technique disclosed herein.

The I/O devices 622 may include a microphone that acquires audio signals for storage and analysis. Additional examples of user I/O devices 622 (not explicitly shown) may include one or more buttons, a keyboard, and a mouse or other pointing device. The I/O device interface 606 may also include an audio output unit configured to generate an electrical audio output signal, and the additional user I/O devices 622 may further include a speaker configured to generate an acoustic output in response to the electrical audio output signal.

Figure 7:
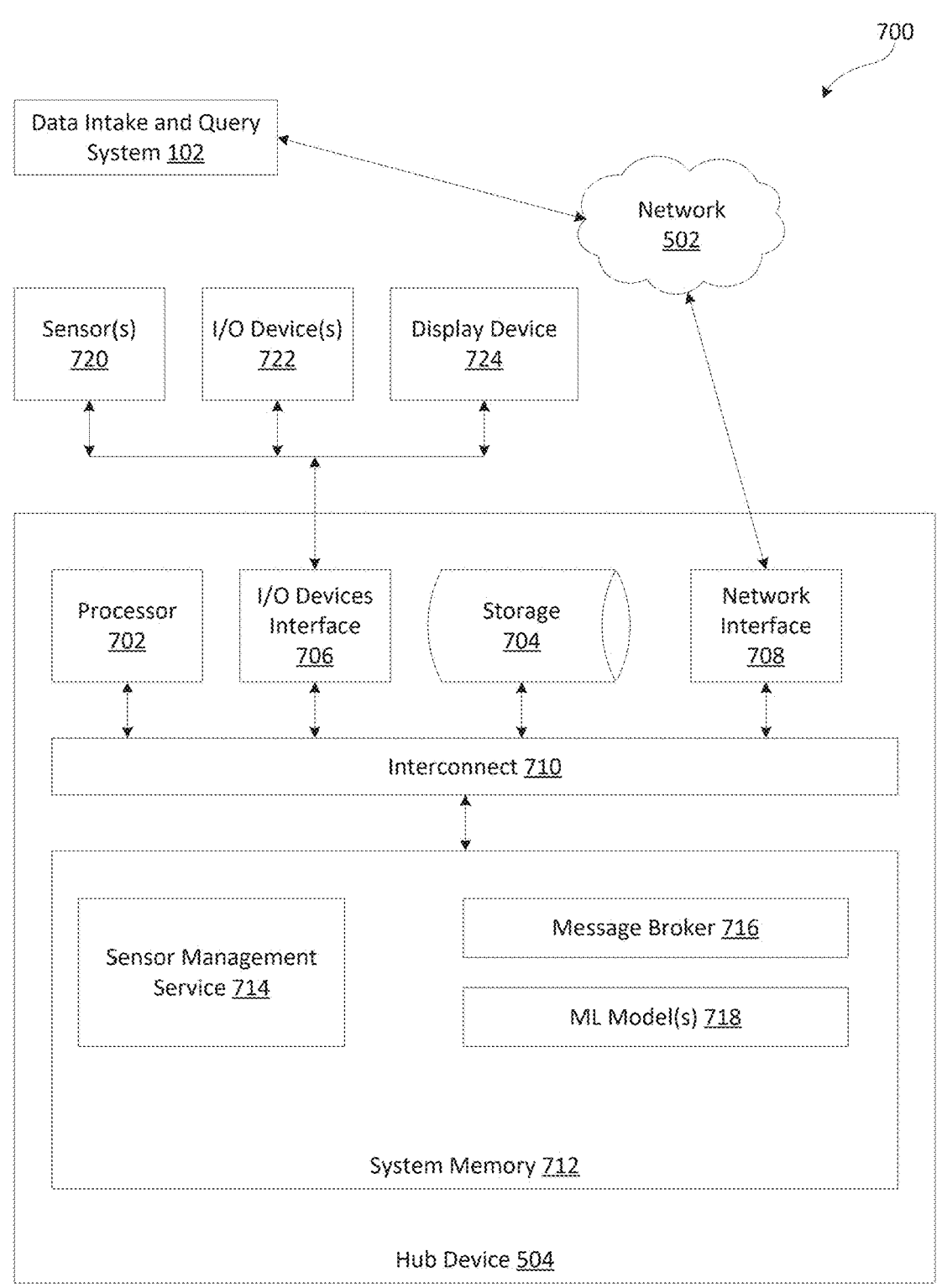
FIG. 7 illustrates a more-detailed view of a hub device included in the example data processing environment of FIG. 5, in accordance with example implementations.

FIG. 7 illustrates a more-detailed view of a hub device 504 included in the example data processing environment 500 of FIG. 5, in accordance with example implementations. As shown, the data processing environment 700 may include, without limitation, a data intake and query system 102 and a hub device 504 communicating with one another over one or more networks 502. The hub device 504 may include, without limitation, a processor 702, storage 704, an input/output (I/O) device interface 706, a network interface 708, an interconnect 710, and system memory 712. The system memory 712 may include a sensor management service 742, a message broker 746, and one or more ML model(s) 718 (e.g., 718(1), 718(2), etc.).

In general, the processor 702 may retrieve and execute programming instructions stored in the system memory 712. The processor 702 may be any technically-feasible form of processing device configured to process data and execute program code. The processor 702 could be, for example, a central processing unit (CPU), a graphics processing unit (GPU), an application-specific integrated circuit (ASIC), a field-programmable gate array (FPGA), and so forth. The processor 702 stores and retrieves application data residing in the system memory 712. The processor 702 is included to be representative of a single CPU, multiple CPUs, a single CPU having multiple processing cores, and the like. In operation, the processor 702 is the manager processor of the hub device 504, controlling and coordinating operations of the other system components.

The system memory 712 stores software application programs and data for use by the processor 702. For example, the system memory 712 could include, without limitation, the sensor management service 714, the message broker 716, and one or more ML models 718. The processor 702 executes software application programs stored within the system memory 712 and optionally, an operating system. In particular, the processor 702 executes software and then performs one or more of the functions and operations set forth in the present application.

The storage 704 may be a disk drive storage device. Although shown as a single unit, the storage 704 may be a combination of fixed and/or removable storage devices, such as fixed disc drives, floppy disc drives, tape drives, removable memory cards, or optical storage, network attached storage (NAS), or a storage area-network (SAN). The processor 702 communicates to other computing devices and systems via the network interface 708, where the network interface 708 is configured to transmit and receive data via one or more the communications network 502.

The interconnect 710 facilitates transmission, such as of programming instructions and application data, between the processor 702, the input/output (I/O) device interface 706, the storage 704, the network interface 708, and the system memory 712. The I/O device interface 706 is configured to receive input data from one or more I/O devices 722. These I/O devices 722 include, without limitation, one or more external and/or internal sensor(s) 730 (e.g., one or more cameras, location sensor(s), etc.), input device(s) 722 (e.g., a keyboard, stylus, microphone, etc.), and/or a display device 724. The display device 724 generally represents any technically-feasible means for generating an image for display. For example, the display device 724 may be a liquid crystal display (LCD) display, organic light-emitting diode (OLED) display, or a digital light processing (DLP) display. The sensor 720, such as camera, acquires images via a lens and converts the images into digital form. The images acquired by the camera may be stored in the storage 604 and/or the system memory 612. An acquired image may be displayed on the display device 624, either alone or in conjunction with one or more other acquired images, graphical overlays, and/or other data.

The sensor(s) 720 may include location sensors that enable the hub device 504 to determine the physical location and/or orientation of the hub device 504. In some implementations, the location sensor(s) may include a network-based sensor that communicates with the data intake and query system 102 via the network 502, which may be part of a production-monitoring network. In some implementations, the location sensor(s) may include a network-based sensor that communicates with one or more data intake and query systems 102 via a local area network (LAN) and/or a wide area network (WAN). In various implementations, the production-monitoring environment may include multiple objects (e.g., sensor data devices 508), multiple hub devices 504, and/or multiple client devices 106. In some embodiments, each of the hub devices 504 may communicate with a data intake and query system 102, and each of the hub devices 504 is capable of identifying one or more objects based on identifier tags, geofences, and/or any other object-identification technique disclosed herein.

The I/O devices 722 may include a microphone that acquires audio signals for storage and analysis. Additional examples of user I/O devices 722 (not explicitly shown) may include one or more buttons, a keyboard, and a mouse or other pointing device. The I/O device interface 606 may also include an audio output unit configured to generate an electrical audio output signal, and the additional user I/O devices 722 may further include a speaker configured to generate an acoustic output in response to the electrical audio output signal.

The hub device 504 executes the sensor management service 742 in order to cause a connected sensor 720 and/or another sensor device (e.g., sensor data device 508) to perform various actions that change the operation of the connected sensor 720 (e.g., increase rate that sensor data is transmitted) and/or the operation of the connected sensor(s) 720 (e.g., turn on a camera and/or a microphone, etc.).

The hub device 504 executes the message broker 716 to communicate with other devices within the data processing environment 700. For example, the message broker 716 could receive sensor data from one or more connected sensors 720 and may send the data to the data intake and query system 102. In various embodiments, the hub device 504 may process the received data. For example, the hub device 504 may retrieve one or more machine-learning (ML) models 718 in order to process incoming data. In some embodiments, the one or more ML models 718 are locally stored and updated at the hub device 504 without receiving updates from another device.

Figure 8:
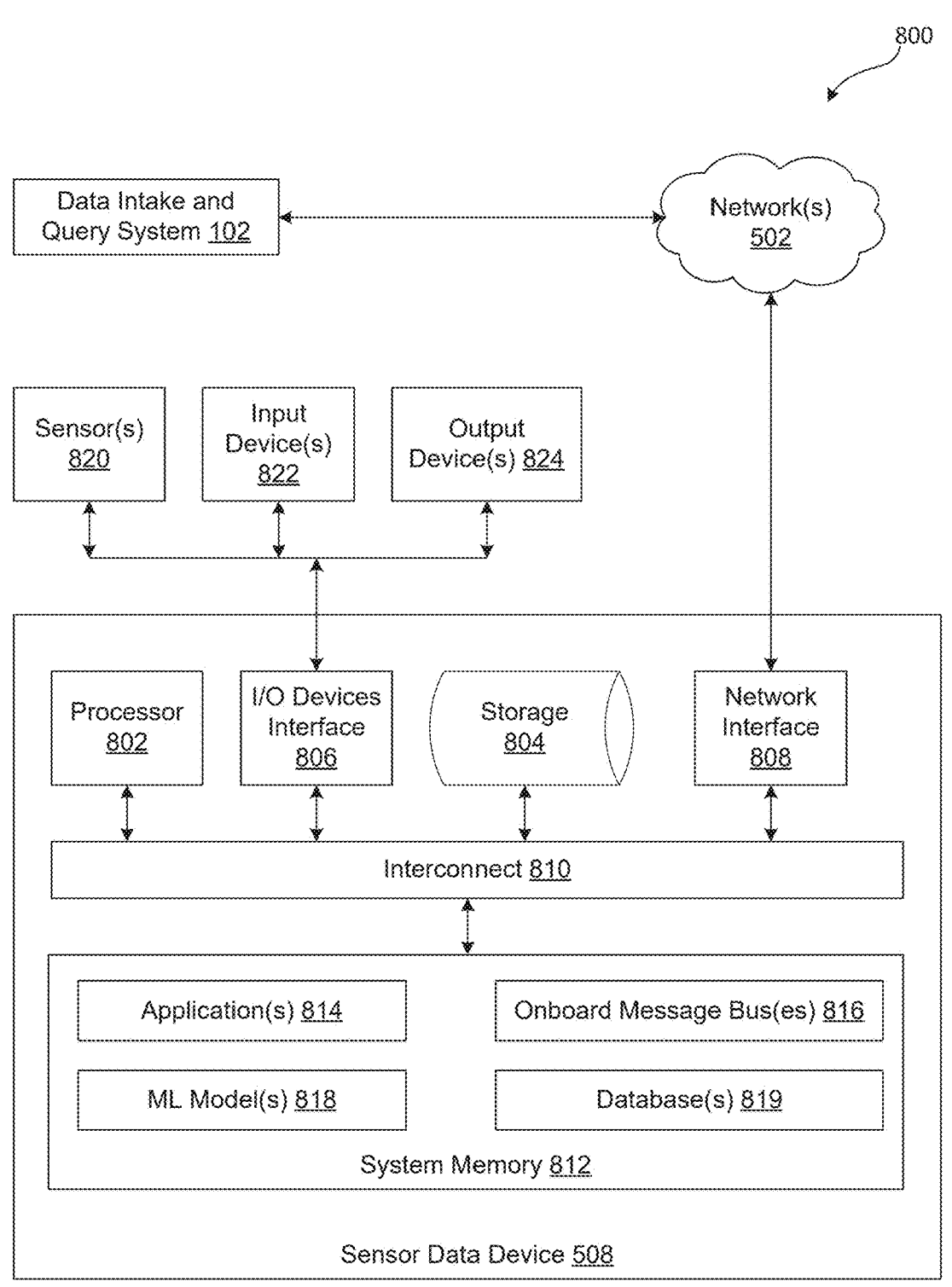
FIG. 8 illustrates a more-detailed view of a sensor data device included in the example data processing environment of FIG. 5, in accordance with example implementations.

FIG. 8 illustrates a more-detailed view of a sensor data device 508 included in the example data processing environment 500 of FIG. 5, in accordance with example implementations. As shown, the data processing environment 800 may include, without limitation, a data intake and query system 102 and a sensor data device 508 communicating with one another over one or more networks 502. In some embodiments, the sensor data device 508 may communicate with the data intake and query system 102 via the hub device 504. The sensor data device 508 may include, without limitation, a processor 802, storage 804, an input/output (I/O) device interface 806, a network interface 808, an interconnect 810, and system memory 812. The system memory 812 may include one or more applications 814 (e.g., 814(1), 814(2), etc.), one or more onboard message buses 816 (e.g., 816(1), 816(2), etc.), a one or more ML model(s) 818 (e.g., 818(1), 818(2), etc.), and/or database 819.

In general, the processor 802 may retrieve and execute programming instructions stored in the system memory 812. The processor 802 may be any technically-feasible form of processing device configured to process data and execute program code. The processor 802 could be, for example, a central processing unit (CPU), a graphics processing unit (GPU), an application-specific integrated circuit (ASIC), a field-programmable gate array (FPGA), and so forth. The processor 802 stores and retrieves application data residing in the system memory 812. The processor 802 is included to be representative of a single CPU, multiple CPUs, a single CPU having multiple processing cores, and the like. In operation, the processor 802 is the manager processor of the sensor data device 508, controlling and coordinating operations of the other system components.

In various embodiments, processor 802 may include one or more artificial intelligence accelerator ASICs used for neural networks, such as a tensor processing unit (TPU). In some embodiments, the sensor data device 508 may include an edge TPU to implement various machine learning techniques and the one or more ML models 818.

The system memory 812 stores software application programs and data for use by the processor 802. For example, the system memory 812 could include, without limitation, the sensor management service 814, the onboard message buses 816, and one or more ML models 818. The processor 802 executes software application programs stored within the system memory 812 and optionally, an operating system. In particular, the processor 802 executes software and then performs one or more of the functions and operations set forth in the present application.

The storage 804 may be a disk drive storage device. Although shown as a single unit, the storage 804 may be a combination of fixed and/or removable storage devices, such as fixed disc drives, floppy disc drives, tape drives, removable memory cards, or optical storage, network attached storage (NAS), or a storage area-network (SAN). The processor 802 communicates to other computing devices and systems via the network interface 808, where the network interface 808 is configured to transmit and receive data via one or more the communications network 502.

The interconnect 810 facilitates transmission, such as of programming instructions and application data, between the processor 802, the input/output (I/O) device interface 806, the storage 804, the network interface 808, and the system memory 812. The I/O device interface 806 is configured to receive input data from one or more I/O devices 822. These I/O devices 822 include, without limitation, one or more external and/or internal sensor(s) 830 (e.g., one or more cameras, location sensor(s), accelerometers, motion sensors, etc.), input device(s) 822 (e.g., a keyboard, stylus, microphone, etc.), and/or a display device 824. The display device 824 generally represents any technically-feasible means for generating an image for display. For example, the display device 724 may be a liquid crystal display (LCD) display, organic light-emitting diode (OLED) display, or a digital light processing (DLP) display. In various embodiments, the display device 824 may include an I/O device 822, such as a touchscreen. The sensor 820, such as camera, acquires images via a lens and converts the images into digital form. The images acquired by the camera may be stored in the storage 804 and/or the system memory 812. An acquired image may be displayed on the display device 824, either alone or in conjunction with one or more other acquired images, graphical overlays, and/or other data.

The sensor(s) 820 may include location sensors that enable the sensor data device 508 to determine the physical location and/or orientation of the sensor data device 508. In some implementations, the location sensor(s) may include a network-based sensor that communicates with the data intake and query system 102 via the network 502, which may be part of a production-monitoring network. In some implementations, the location sensor(s) may include a network-based sensor that communicates with one or more data intake and query systems 102 via a local area network (LAN) and/or a wide area network (WAN). In various implementations, the production-monitoring environment may include multiple sensor data devices 508, multiple hub devices 504, and/or multiple client devices 106. In some embodiments, each of the sensor data devices 508 may communicate with a data intake and query system 102.

The I/O devices 822 may include a microphone that acquires audio signals for storage and analysis. Additional examples of user I/O devices 822 (not explicitly shown) may include one or more buttons, a keyboard, and a mouse or other pointing device. The I/O device interface 806 may also include an audio output unit configured to generate an electrical audio output signal, and the additional user I/O devices 822 may further include a speaker configured to generate an acoustic output in response to the electrical audio output signal.

The sensor data device 508 may perform one or more applications 814 in order to acquire sensor data, process sensor data, and/or publish various data sets via network 502. In some embodiments, the sensor data device 508 may execute one or more applications that cause an internal or external sensor 820 to perform various actions that change the operation of the internal or external sensors 820 and/or the sensor data device 508 (e.g., increase rate that sensor data is acquired and/or transmitted, modifies how acquired sensor data is processed, etc.) and/or the operation of the internal or external sensors 820 (e.g., turn on a camera, a microphone, temperature sensor, anomaly detector, etc.).

In various embodiments, the sensor data device 508 may process the acquired sensor data and publish the sensor data. For example, the sensor data device 508 may retrieve one or more machine-learning (ML) models 818 in order to process acquired sensor data. In some embodiments, the one or more ML models 818 are locally stored and updated at the sensor data device 508 without receiving updates from another device.

The database 819 stores data associated with sensor data device 508 and other data associated with the operator of the sensor data device 508. In various embodiments, the database 806 may include an index that links the sensor data device 508 to specific remote applications, connected applications, and/or dashboards that are accessible via the data intake and query system 102.

6.0. Monitoring Systems Including Sensor Devices

At least one problem with conventional approaches for implementing sensors in a data processing environment is that the processing of data in certain environments is slow or overly complex. For example, many systems include sensors transmit data values to a centralized processing system, and the centralized processing system performs actions to process the values. Depending on the characteristics of the data processing environment, different components would process and transmit data using different protocols, with different sensors transmitting data using differing protocols and thus requiring multiple devices in the central processing system to translate messages from the different protocols before processing. Further, the distributed network may experience latency with respect to responding to events in the environment that the sensors are monitoring.

As a result, many networks forgo inclusion of certain sensors, limiting the data that is ingested by the network, and preventing certain metrics from becoming available to users. The lack of data hinders certain insights about various machines from being made available and impacts the efficient management of the various machines. Further, such techniques require large, complex infrastructures that translate incoming data and store the large volumes of data accumulated by the sensors before the centralized processing systems effectively analyze and respond to the incoming data.

Accordingly, in various implementations disclosed herein, a data processing environment includes one or more sensor data devices that acquire sensor data and publish data by sending sets of sensor data in one or more sensor data streams. A sensor data device is fitted with one or more internal and/or external sensors and may include one or more applications executing on a processor. The sensor device may be physically proximate and/or physically attached or coupled to any machine, device, or other physical object for which monitoring is desired. Via the one or more applications, the sensor data device performs various techniques performed for obtain and operate on sensor data acquired by the one or more sensors. In one technique, the application(s) obtain sensor data that was acquired by the one or more sensors and perform one or more of: processing the acquired sensor data, transmitting the acquired sensor data, or storing the acquired sensor data.

The sensor data device acts as a publisher in a publish-subscribe system implemented at an edge of the data processing environment. The sensor data device publishes one or more data sets to an onboard message bus that is a component of the publish-subscribe network and causes the onboard message bus to transmit the data sets to one or more hub devices of the networked computer environment. In various embodiments, the sensor data device may process the acquired sensor data to perform additional operations based on the processed sensor data. In various implementations, the sensor data device inputs the acquired sensor data into a machine-learning (ML) model stored at the sensor data device. The ML model provides an output data set. In some implementations, the ML model is trained based on the data set that was inputted into the ML model. The sensor data device may store the output data set and/or transmit the output data set to another device, such as an intermediate hub device, or the data intake and query system. In such instances, the other device may further process the output data set and/or store the output data set for subsequent retrieval.

6.1. Sensor Processing Networked Computer Environment

Figure 9:
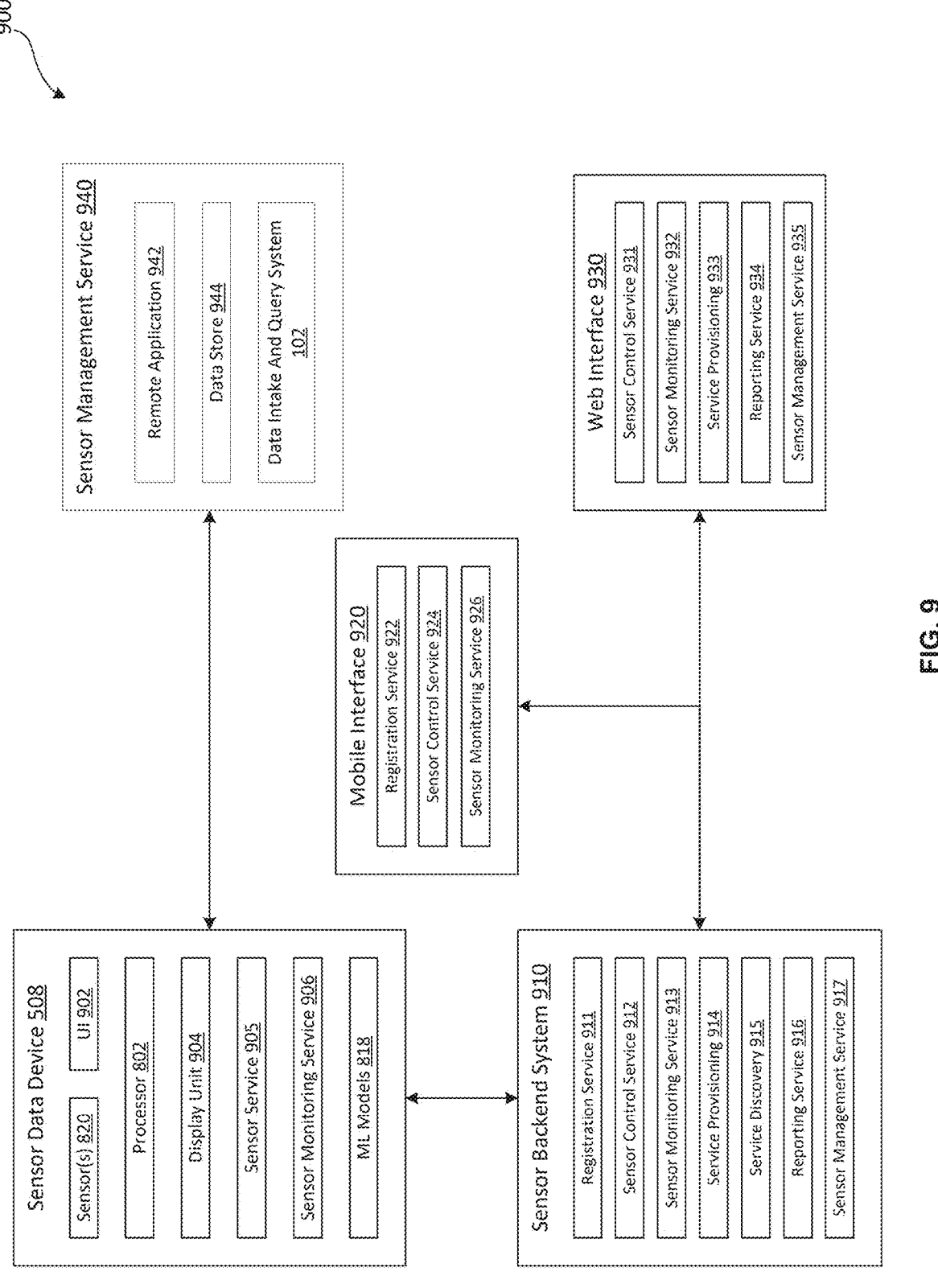
FIG. 9 illustrates another block diagram of an example data processing environment, in accordance with example implementations.

FIG. 9 illustrates another block diagram of an example data processing environment 900, in accordance with example implementations. As shown, the data processing environment 900 may include, without limitation, a sensor data device 508, a sensor management service 940, a sensor backend system 910, a mobile interface 920, and a web interface 930.

In operation, the sensor data device 508 acquires sensor data and publishes the acquired sensor data and/or processed sensor data sets by transmitting the data via one or more onboard message buses (e.g., an onboard message bus 816) to various subscribers, such as a remote application 942 included in sensor management service 940. The remote application 942 ingests and/or processes the sensor data that was sent by the sensor data device 508. The remote application 942 then transmits the ingested and/or processed sensor data to the data intake and query system 102, where the sensor data may be stored in one or more data stores 944. In various embodiments, a user subscribes to the one or more onboard message buses 816 and may monitor and/or control the sensor data device 508 via the mobile interface 920 and/or the web interface 930. In such instances, the mobile interface 920 and/or the web interface 930 may communicate with the sensor data device 508 via the sensor backend system 910. The sensor backend system 910 includes various services to manage the sensor data device 508, including the registration, monitoring, reporting, and control of the sensor data device 508.

The sensor data device 508 includes one or more sensor(s) 820, a user interface (UI) 902, the processor 802, a display unit 904, a sensor service 905, a sensor monitoring service 906, and one or more ML models 818. The sensors 820 may include one or more sensors that acquire sensor data about a physical object. The sensors 820 acquire sensor data associated with a physical device, where the acquired sensor data is not produced by the physical device and/or is not readily obtained from the physical device itself. Examples of such sensors 820 may include cameras, imaging sensors, sound sensors, pressure sensors, vibration sensors, temperature sensors, humidity sensors, gyroscopes, accelerometers, and so forth. In various embodiments, processor 802 included in sensor data device 508 may execute techniques that enable the one or more sensors 820 to acquire sensor data.

In some embodiments, the processor 802 may execute the sensor service 905 in order to collect the sensor data acquired by the sensors 820 and process the acquired sensor data. Additionally or alternatively, the sensor data device 508 may execute one or more ML models 818, where various sensor data is inputted into one or more ML models 818 that analyze the sensor data. For example, sensor data device 508 may input temperature data into a specific temperature anomaly detector in order to identify anomalies and/or other alert conditions associated with a target operating temperature of a physical device or surrounding environment.

In some embodiments, the processor 802 may execute the sensor monitoring service 906 to act as a health monitoring service that monitors the operation of the sensor data device 508 and may transmit data associated with the health and functioning of the sensor data device 508. For example, the sensor monitoring service 906 could provide the data associated with the health of the sensor data device 508 to the UI 902. In such instances, the UI 902 could display the data via the display unit 904 (e.g., a touchscreen) that is included in the sensor data device 508 (e.g., included amongst the output devices 824). In some embodiments, the sensor data device 508 transmits the data relating to the health of the sensor data device 508 to one or more other services included in other devices (e.g., one or more of sensor monitoring services 913, 926, 932).

The sensor backend system 910 includes a registration service 911, a sensor control service 912, a sensor monitoring service 913, a service provisioning module 914, a service discovery module 915, a reporting service 916, and a sensor management service 917. In various embodiments, the sensor backend system 910 may implement one or more of services 911-917 in order to monitor and/or manage sensor data device 508.

In various embodiments, the sensor backend system 910 could execute one or more of the registration service 911, the service discovery module 915, the service provisioning module 914, and/or the sensor management service 917 in order to register the sensor data device 508 with sensor management service 940, remote application 942, and/or data intake and query system 102. Once registered, the sensor data device 508 may published acquired sensor data and/or processed sensor data that is ingested via the sensor management service 940. For example, the sensor backend system 910 could execute the sensor management service 917 to acquire a device identifier for the sensor data device 508 and could then execute the registration service 911 in order to link the sensor data device 508 with the remote application 942.

In some embodiments, the sensor backend system 910 may execute the service provisioning module 914 to the link sensor data device 508 with one or more dashboards associated with the data intake and query system 102. In such instances, the data intake and query system 102 may ingest the sensor data, store the sensor data in data store 944, and link the sensor data to one or more properties (e.g., visualizations, playbooks, run books, logic trees, etc.), of a linked dashboard.

In some embodiments, the sensor backend system 910 may execute one or more of the sensor control service 912, the sensor monitoring service 913, the service discovery module 915, the reporting service 916, and/or the sensor management service 917 in order to acquire data associated with the sensor data device 508. For example, the sensor backend system 910 could execute the service discovery module 915 to acquire the device ID of the sensor data device 508 when the sensor data device 508 is transmitting sensor data. The sensor backend system 910 could then execute the sensor monitoring service 917 in order to check the operation and health of the sensor data device 508. In various examples, the sensor backend system 910 could execute the sensor control service 912 and/or the sensor management service 917 in order to cause the sensor data device 508 to perform various actions to change the operation of the sensor data device 508 (e.g., increase rate that certain sensor data is acquired and/or transmitted), and/or the operation of one or more sensors 820 associated with the sensor data device 508 (e.g., turn on sound sensors, turn off linked cameras, etc.).

The mobile interface 920 includes a registration service 922, a sensor control service 924, and a sensor monitoring service 926. In some embodiments, mobile interface 920 may be included in a mobile user device, such as the client device 106 (e.g., a smartphone, a tablet, etc.). In various embodiments, a user may perform various functions using mobile interface 920, which causes the client device 106 to interact with the sensor data device 508 via the sensor backend system 910. For example, a user could provide an input to the registration service 922, where the input is a selection of the remote application 942. In such instances, the registration service 922 could transmit an indication that the sensor data device 508 is to be linked with the remote application 942 for one or more services. In another example, a user may view the health of the sensor data device 508 via the sensor monitoring service 926 by viewing data associated with the operation of the sensor data device 508. In some embodiments, the sensor control service 924 may alter the functioning of one or more components of the sensor data device 508.

Web interface 930 includes sensor control service 931, sensor monitoring service 932, service provisioning module 933, reporting service 934, and sensor management service 935. In various embodiments, web interface 930 may be included in a user device (e.g., a laptop, a desktop, etc.) that is connected to sensor backend system 910. In various embodiments, a user may perform various functions using web interface 930, which interacts with sensor data device 508 via sensor backend system 910. In various embodiments, service provisioning module 933 may provision one or more sensor data devices 508 with a specific remote application and/or dashboard. For example, service provisioning module 933 could associate a set of sensor data devices 508 such that the set of sensor data devices 508 transmit an aggregated set of sensor data that is stored by intake and query system 102.

In some embodiments, one or more services and/or modules included in the sensor backend system 910 may communicate with services and/or modules included in the mobile interface 920 and/or the web interface 930. For example, a user may interact with the registration service 922 included in the mobile interface 920. The registration service 922 may then communicate with the registration service 911 that is included in the sensor backend system 910 in order to register the sensor data device 508. In another example, the reporting service 916 could receive sensor data that is published by the sensor data device 508. The reporting service 916 could send the received sensor data to the reporting service 934 included in the web interface 930. In such instances, the reporting service 934 could display one or more dashboards that include the received sensor data.

Figure 10:
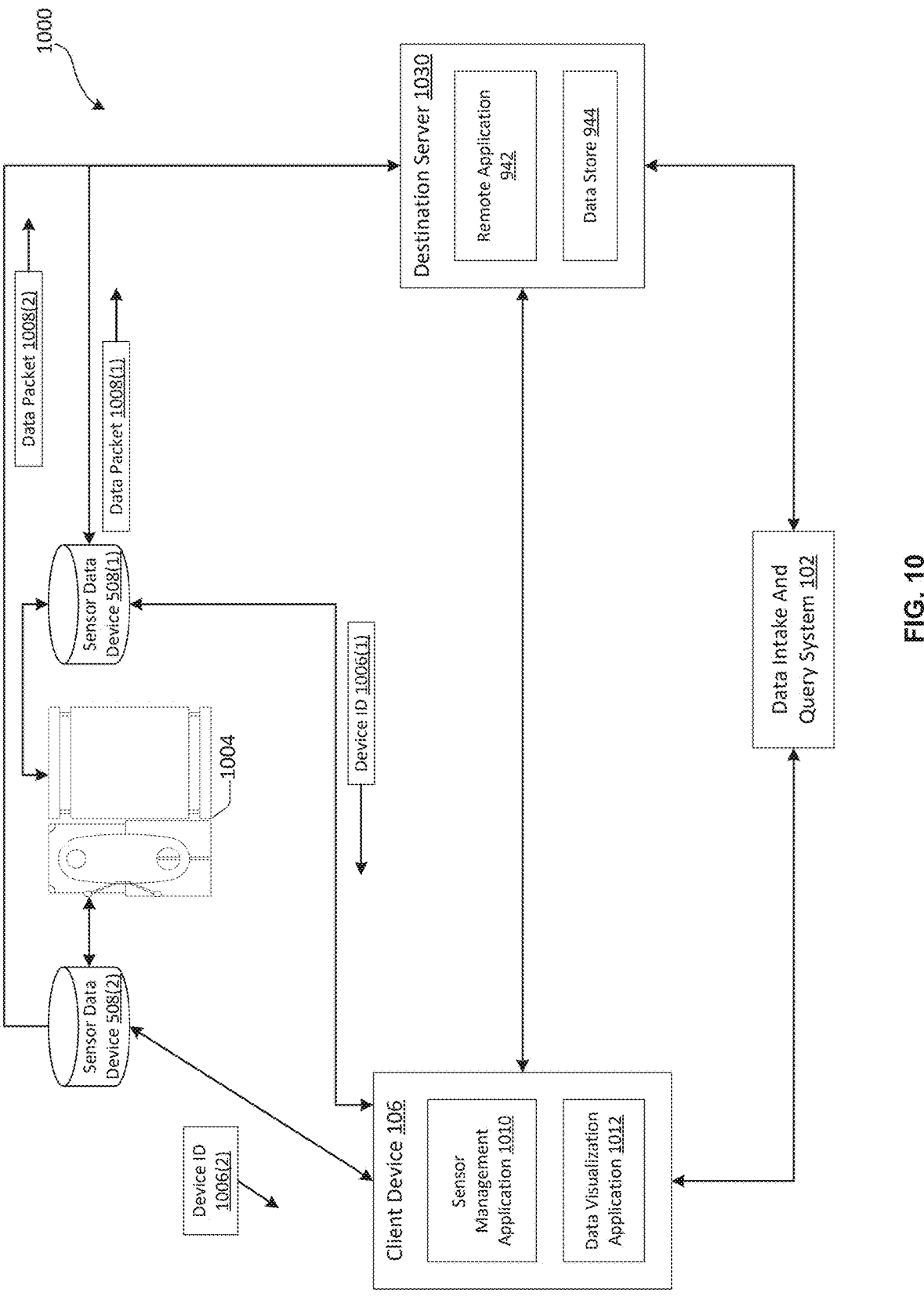
FIG. 10 is another block diagram of an example data processing environment, in accordance with example implementations.

FIG. 10 is another block diagram of an example data processing environment 1000, in accordance with example implementations. As shown, the data processing environment 1000 may include, without limitation, one or more sensor data devices 508 (e.g., 508(1), 508(2), etc.), one or more physical objects 1004, a client device 106 that includes the sensor management application 1010 and data visualization application 1012, the data intake and query system 102, and a destination server 930 that includes the remote application 942 and the data store 944.

The physical object 1004 may be a subject within an environment. The physical object 1004 may have various physical characteristics or properties associated with the presence of the physical object 1004 within the environment and/or the operation of the physical object 1004. In some embodiments, the physical characteristics of the physical object 1004 may include one or more operational parameters associated with the operation of the physical object 1004. For example, the physical object 1004 could be a machine that operates within a particular room of a building. In such instances, the sensor data devices 508(1)-508(2) could acquire sensor data that is associated with one or more operational parameters of the physical object 1004, such as the temperature of the machine, rotational speed(s) of one or more components, ambient noise around the machine, vibrations emitted by the machine, images of the environment and/or the one or more components, and so forth. In some embodiments, multiple sensor data devices 508 may acquire sensor data about the same physical object 1004. For example, when physical object 1004 is a motor vehicle, one sensor data device 508(1) could acquire external sensor data, while another sensor data device 508(2) could acquire sensor data from the interior of the motor vehicle. In such instances, each of the sensor data devices 508 may transmit the respective sensor data independently of one another.

The sensor data devices 508 (e.g., 1801(1), 1801(2), etc.) are devices that includes one or more sensors 820 that perform measurements and/or acquire sensor data related to certain subjects in an environment, such as the physical object 1004. For example, when the physical object 1004 is a motorized object, the sensor data device 508 could be placed in a location proximate to the physical object 1004 and could perform measurements via the one or more sensors 820 included in the sensor data device 508. The acquired sensor data includes information about the operation of physical object 1004 that is not produced by the physical object 1004, or is not readily obtained from the physical object 1004 itself. In such instances, the acquired sensor data could include the speed of the physical object 1004, the ambient temperature within the physical object 1004, the rotation of a component within the physical object 1004, and so forth.

In various embodiments, the sensors 820 included in the sensor data device 508 may include optical sensors, such as RGB cameras, infrared cameras, depth cameras, and/or camera arrays, which include two or more of such cameras. Other optical sensors may include imagers and laser sensors. In some embodiments, the sensors 820 may include physical sensors, such as touch sensors, pressure sensors, position sensors (e.g., an accelerometer and/or an inertial measurement unit (IMU)), motion sensors, and so forth, that register the position and/or movement of the object. In some embodiments, the sensors 820 include radio sensors, thermal sensors, multimeters, contactless sensor systems, and so forth.

In some examples, the sensor data device 508 can be communicatively coupled to the physical object 1004, either physically or wirelessly. In these examples, the sensor data device 508 may be able to obtain data from the physical object 1004 and/or that is produced by the physical object. For example, using a communication channel with the physical object 1004, the sensor data device 508 may be able to communicate with a processor of the physical object 1004, and to request data from the processor, such as operational data. As another example, the sensor data device 508 may have access to a memory of the physical object 1004, from which the sensor data device 508 may be able to read data (e.g., log files, metrics, etc.).

In various embodiments, the sensors 820 may be physically coupled to and/or included within sensor data device 508. For example, a temperature sensor and a gyroscope may be included inside a case of the sensor data device 508, while a microphone connected via a connection port, and a set of cameras wirelessly communication with the sensor data device 508.

Additionally or alternatively, the sensor data device 508 may include one or more connection components to physically attached or couple the sensor data device 508 to the physical object 1004. For example, the sensor data device 508 may include magnetic material that enables the sensor data device 508 to be magnetically attached to the physical object 1004. In various embodiments, other attachment mechanisms to operably couple sensor data device 508 to physical object 1004 may be included with the sensor data device 508. In other implementations, the sensor data device 508 may be operably coupled to the physical object 1004 through a connection that allows the sensor data device 508 to collect data about the physical object 1004. In such instances, the connection may be a wired or cable connection (e.g., Ethernet, cable, or other connection, etc.), a wireless connection (e.g., connection over a network, near-field communication (NFC) connection, etc.), and so forth.

In various embodiments, each of the sensor data devices 508 may transmit one or more data packets 1008 (e.g., 1008(1), 1008(2)) that include the sensor data that was acquired by the one or more sensors 820. In some embodiments, the sensor data device 508 may continually send data packets 1008 in a sensor data stream. In such instances, a receiving device (e.g., the client device 106, the destination server 1030) may receive and/or process the sensor data in real time. For example, the sensor data devices 508 could be publishers in a publish/subscribe network that sends data packets 1008 to specific message buses (e.g., an onboard message bus 816 included in each respective sensor data device 508). In this example, the remote application 942 may be a subscriber to the specific message buses and may receive each of data packets 1008(1), 1008(2) that are published by the sensor data devices 508(1), 508(2) to the message bus.

In some embodiments, the sensor data device 508 may form a data stream with a given receiving device. In such instances, the sensor data device 508 may transmit one or more data packets 1008 that are received by one or more receiving devices connected via the data stream. In such instances, the receiving device may process, aggregate, filter, and/or secure the sensor data published by the sensor data device 508. For example, the sensor data device 508(1) could be registered with remote application 942, which could process data for one or more connected applications (not shown). In such instances, the sensor data device 508(1) could form a data stream with destination server 1030, where the sensor data device 508 could transmit sensor data in one or more data packets 1008 to the remote application 942. The remote application 942 could then process the sensor data to generate a processed data set. The remote application 942 then could transmit the processed data set to the one or more connected applications via data intake and query system 102. In some embodiments, the sensor data device 508 may transmit a processed data set in the one or more data packets 1008. By generating and transmitting a processed data set in lieu of transmitting raw sensor data, the sensor data devices 508 and/or the remote application 942 may reduce the amount of sensor data that needs to be transmitted and accordingly reduce consumption of network bandwidth.

In some embodiments, the sensor data device 508 may include one or more processors (e.g., processor 802) that process sensor data and perform actions based on the processed sensor data. For example, the sensor data device 508 could act as an edge device that analyzes sensor data in order to monitor for alert conditions and/or anomalies. In such instances, the sensor data device 508 could generate alert notifications and/or action commands (e.g., activating a live video feed of physical object 1004) in response to determining that certain physical characteristics of physical object 1004 are outside threshold ranges or meet anomaly criteria.

In some embodiments, the sensor data device 508 processes (e.g., analyzes) the sensor data using one or more rules (e.g., threshold values, if-then statements). The rules may be managed (e.g., created, modified) remotely (e.g., at the data intake and query system 102) and transmitted to the sensor data device 508 (e.g., directly, or via destination server 1030). In some implementations, the sensor data device 508 may be configured to receive, retrieve, and/or activate one or more machine-learning (ML) models (e.g., from the data intake and query system 102, from destination server 1030, etc.) for the purposes of processing data collected by the sensor data device 508. In other implementations, the sensor data device 508 come pre-configured with one or more ML models.

In either of these instances, the ML model included in the sensor data device 508 may dynamically change weights and/or threshold values when determining whether to generate alert notifications. In some embodiments, the sensor data device 508 may process (e.g., analyze) the sensor data using the ML models to monitor for alert conditions and/or anomalies. In some embodiments, the analysis to monitor alert conditions and/or anomalies may be agnostic to model type. In some embodiments, the ML models may be trained locally, at the sensor data device 508, and/or remotely (e.g., at the destination server 1030, at the data intake and query system 102), to further improve the accuracy of the ML model. In some implementations, the sensor data device 508 may detect a type of device about which sensor data device 508 is acquiring sensor data (e.g., by analyzing some of the data collected), and select an ML model, either stored locally or retrieved from a network, to process the data.

For example, the sensor data device 508 could, based on data collected from physical object 1004, detect that the physical object 1004 is an assembly-line welder. In such instances, the sensor data device 508 could then select an ML model. that has been determined to be useful in analyzing data collected from assembly-line welders and/or detecting anomalies associated with the operation of assembly-line welders.

The device identifier (ID) 1006 (e.g., 1006(1), 1006(2)) is an identifier for the sensor data device 508. Each sensor data device 508 includes a distinct device ID 1006 that operates as a unique identifier (UID) for the sensor data device 508. For example, sensor data device 508(1) could include device ID 1006(1), which is distinct from device ID 1006(2) included in the sensor data device 508(2). In various embodiments, one or more devices may use the device ID 1006 to perform various actions associated with the sensor data device 508. For example, the sensor management application 1010 included in the client device 106 could register the sensor data device 508 with one or more remote applications 942 and/or dashboards. In such instances, the sensor management application 1010 could assign the device ID 1006 with the selected remote application(s) (e.g., the remote application 942) and/or the selected dashboard(s). Once registered, one or more devices (e.g., the client device 106) may acquire security credentials to view data associated with the sensor data device 508 by transmitting data requests that include the device ID 1006 to the linked application (e.g., the remote application 942).

In some embodiments, the sensor data device 508 may generate its unique device ID 1006. For example, the sensor data device 508 could generate a unique textual and/or numerical string, such as a Globally Unique Identifier (GUID). Alternatively, the device ID 1006 may be assigned to the sensor data device 508, such as when a manufacturer of the sensor data device 508 assigns the device ID 1006. For example, the sensor data device 508(2) may be assigned a device ID 1006(2), where the device ID 1006(2) is encoded in a QR code or a barcode. In such instances, a printed QR code or barcode may be affixed to the sensor data device 508, and/or the sensor data device 508 may display the QR code or barcode via the display unit 904. As another example, the sensor data device 508 may be assigned a device ID 1006 that is an alphanumeric string. A printed string may be affixed to the sensor data device 508, and/or the sensor data device 508 may display the string via the display unit 904.

In various embodiments, the sensor data device 508 may provide the device ID 1006 to one or more target client devices 106. In some embodiments, the sensor data device 508 may transmit a signal, such as a beacon signal, that includes the device ID 1006. In various embodiments, a beacon signal may be one of a radio-frequency (RF) signal, a near-field communications (NFC) signal, a Bluetooth signal, an optical signal, or a separate signal that is transmitted in a frequency within the electromagnetic spectrum. In such instances, the device ID 1006 may be encoded within the beacon signal. Additionally or alternatively, the sensor data device 508 may provide a tag that includes the device ID 1006 as an image (e.g., a QR code, a barcode) and/or an alphanumerical string. In such instances, a target device (e.g., client device 106) may scan the tag in order to acquire the device ID 1006. Additionally or alternatively, the device ID 1006 (e.g., an alphanumerical string) may be input manually (e.g., keyed, typed, input from a list of device IDs) into the client device 106.

In some embodiments, the client device 106 executes one or more applications that display, compute, or generate data based on data sets received from the remote application 942 and/or the data intake and query system 102. Examples of the client device 106 may include, without limitation, a smartphone, a tablet computer, a handheld computer, a wearable device, a virtual reality (VR) console, an augmented reality (AR) console, a laptop computer, a desktop computer, a server, a portable media player, a gaming device, Apple TV® devices, Roku® devices, and so forth. In some embodiments, the client device 106 may execute an augmented reality or virtual reality (AR/VR) application that displays performance metrics and/or other data provided by the data intake and query system 102 and/or the remote application 942.

In some embodiments, the data intake and query system 102 and/or the remote application 942 may send messages to the client device 106 in accordance with a push notification service (not shown), such as the APPLE® Push Notification service (APN), or GOOGLE® Cloud Messaging (GCM). For example, the client device 106 could receive various schemas, dashboards, playbooks, runbooks, cards, and/or visualizations that include real-time data associated with a particular machine (e.g., the physical object 1004) and/or a particular sensor service (e.g., sensor data published by the sensor data devices 508(1), 508(2)). The schemas, dashboards, cards, and/or visualizations could then be displayed and/or overlaid with the real-world component by an AR/VR application.

The sensor management application 1010 manages the operation of one or more sensor data devices 508. In various embodiments, the sensor management application 1010 executes one or more services provided by the mobile interface 920 (e.g., the registrations service 922, the sensor control service 924, and/or the sensor monitoring service 926) and/or the web interface 930 (e.g., the sensor control service 931, sensor monitoring service 932, the service provisioning service 933, the reporting service 934, and/or the sensor management service 935). The sensor management application 1010 enables a user to perform various actions relating to the sensor data device 508, such as configuring the sensor data device 508 and/or linking the sensor data device 508 to particular the remote applications 942 and/or dashboards. In such instances, the sensor management application 1010 may acquire the device ID 1006 associated with a particular sensor data device 508 and may use the device ID 1006 to gain security credentials associated with the sensor data device 508 in order to manage the sensor data device 508 and/or acquire data associated with the sensor data device 508.

In various embodiments, the sensor management application 1010 may acquire the device ID 1006. For example, the sensor management application 1010 may receive a beacon signal that includes the device ID 1006(1) of the sensor data device 508(1). In another example, the sensor management application 1010 may scan a tag that includes the device ID 1006(2) of the sensor data device 508(2). In some embodiments, the sensor management application 1010 may acquire the device ID 1006 only when certain environmental conditions are met. For example, the sensor management application 1010 may acquire the device ID 1006 when the client device 106 is in a location proximal (e.g., within 100 meters) to the sensor data device 508.

In some implementations, the sensor management application 1010 may, upon establishing communications with the sensor data device 508, authenticate the sensor data device 508 for communicating with the physical object 1004. For example, the sensor management application 1010 can transmit credentials, such as a security token, a user identifier, and/or a password, to the sensor data device 508, which the sensor data device 508 can use to indicate to the physical object 1004 that the sensor data device 508 is authorized to communicate with and/or access the physical object 1004. Such authorization could enable the sensor data device 508 to perform operations, such as accessing data stored on the physical object 1004, or watching network traffic going to or from the physical object 1004, among other examples. In some examples, the sensor management application 1010 can generate a prompt to obtain credential information from a user. Alternatively or additionally, the sensor management application 1010 may be able to obtain credentials from another location, such as the destination server 1030 or the data intake and query system 102.

Upon acquiring the device ID 1006, the sensor management application 1010 may determine whether the sensor data device 508 is configured to transmit data to a specific device, application, and/or dashboard. For example, the sensor management application 1010 could retrieve a dashboard identifier from sensor data device 508. In one example, the sensor management application 1010 could receive a separate a response message from the sensor data device 508 that includes the dashboard identifier. In another example, the sensor data device 508 could include the dashboard identifier in the beacon signal. Upon determining that the sensor data device 508 is configured to transmit data to a specific dashboard, the sensor management application 1010 may then cause the data visualization application 1012 to include the device ID 1006 in messages related to the sensor data device 508, such as when the data visualization application 1012 attempts to retrieve the dashboard by sending an initial data request to the data intake and query system 102. In some embodiments, the sensor management application 1010 may register itself and the data visualization application 1012 to the specific device, application, and/or dashboard based on the above determination.

In some embodiments, when the sensor management application 1010 determines that the sensor data device 508 is not configured to transmit data to a specific remote application and/or dashboard, the sensor management application 1010 may register the sensor data device 508 with at least one of the available remote applications (e.g., remote application 942) and/or dashboards. In an implementation, the sensor management application 1010 may select specific remote applications and/or dashboards that are associated with a particular user account of a system (e.g., the data intake and query system 102). In another implementation, the sensor management application 1010 may display a user interface for configuring the sensor data devices 508 to link to a specific remote application or dashboard. In the interface, a user may link a given sensor data device 508 to a specific remote application 942 or a specific dashboard by dragging a representation of the sensor data device 508 to a representation of remote application or dashboard within the user interface. Additionally, even if the sensor data device 508 is determined to be configured to transmit data to a specific remote application and/or dashboard, the sensor management application 1010 may allow the user to change the specific remote application and/or dashboard in a similar manner. Further, the data stream from the sensor data device 508 to the specific remote application 942 and/or dashboard may be customized. For example, data filtering may be configured for the data stream that limits what data the specific remote application 942 ingests.

For example, when registering the sensor data device 508 with a remote application 942, the sensor management application 1010 could detect a group of remote applications. Alternatively, the sensor management application 1010 could send a registration request to the destination server 1030 and could receive a response that includes a candidate list of candidate remote applications. Sensor management application 1010 could provide an interface to the user of client device 106, where the interface lists the candidate remote applications. Upon receiving a user input selection, sensor management application 1010 may send a message to destination server 1030 that includes the assignment of the sensor data device 508 to the particular remote application selected by the user. Similarly, sensor management application 1010 may receive, from the destination server 1030, a dashboard candidate list of candidate dashboards. Upon receiving a user input selection, the sensor management application 1010 may send a message to the destination server 1030 that includes the assignment of the sensor data device 508 to the particular dashboard selected by the user. Additionally or alternatively, a user may manually input the remote application or dashboard (e.g., the identifier of the remote application 942 or a specific dashboard) to which the sensor data device 508 is to be registered. In some embodiments, via the sensor management application 1010, the sensor data device 508 may be delinked (e.g., deregistered) from a given device, application, or dashboard.

In some embodiments, the sensor data device 508 may be pre-configured to be linked to a specific device, application, and/or dashboard. For example, the sensor data device 508 may be configured at, or prior to, the point of sale as linked to a certain device, application, or dashboard (e.g., a default device, application, or dashboard). The pre-configuration may be modified by the user via the sensor management application 1010 in a manner similar to the registration process described above.

In some embodiments, the sensor management application 1010 enables a user to monitor the health of the sensor data device 508 and/or perform actions on the sensor data device 508, such as turning the sensor data device 508 on or off remotely, and/or configuring settings on the sensor data device 508. Additionally or alternatively, sensor management application 1010 may communicate with the sensor backend system 910 that manages the sensor data devices 910. In such instances, the sensor management application 1010 may provide an interface for a user to manage the sensor data devices 508 via the sensor backend service 910.

The health of the sensor data device 508 may encompass a number of characteristics, properties, and/or statuses, of the sensor data device 508, examples of which include, without limitation, power status (e.g., powered on or off, amount of battery life remaining), network connectivity (e.g., whether the sensor data device 508 is connected, type of connection, signal strength), and status of the sensors 820 (e.g., connected sensors that are not on-board the sensor data device 508, which sensors are on and are collecting data). The sensor management application 1010 may display health information for an individual the sensor data device 508 and/or for multiple sensor data devices 508. Settings that may be configured on the sensor data device 508 may include, without limitation, network connectivity settings (e.g., Wi-Fi settings), data collection limits (e.g., how often sensors 820 capture data), and data transmission limits (e.g., how often data is transmitted in a day).

In some embodiments, the sensor management application 1010 may group multiple sensor data devices 508 together. For example, a user could perform an action that causes the sensor management application 1010 to link multiple device IDs 1006 to form a group. In such instances, the group may form a hub-and-spoke configuration, where a hub sensor device (e.g., the sensor data device 508(1)) receives data directly from one or more spoke sensor devices (e.g., the sensor data device 508(2)) and transmits an aggregated set of sensor data on behalf of the one or more spoke sensor data devices.

The data visualization application 1012 is an application that displays, computes, and/or generates data based on data received from the data intake and query system 102. In various embodiments, the client device 106 may receive and/or determine the device ID 1006 via acquired data from the sensor data device 508 and may then use the device ID 1006 to receive data associated with the sensor data device 508. In some embodiments, the sensor management application 1010 and the data visualization application 1012 are combined into a joint sensor management and data visualization application.

In some embodiments, the data visualization application 1012 may send a data request to the destination server 1030 and may receive security credentials that can be used to access real-time data outputted by the sensor data device 508 and/or the data intake and query system 102. Additional queries transmitted by the data visualization application 1012 may then implement the credentials without requiring the client device 106 to acquire the device ID 1006 and/or receive credentials from the destination server 1030.

In some embodiments, the credentials received by the client device 106 enable the data visualization application 1012 to display data transmitted directly from the sensor data device 508 (e.g., real-time streaming data). In some embodiments, the client device 106 may receive data directly from the sensor data device 508. In some embodiments, the client device 106 may use the device ID 1006 to retrieve field values, extracted from events, which are associated with the sensor data device 508. In various embodiments, the client device 106 and/or the data intake and query system 102 may generate content (e.g., schemas, dashboards, cards, and/or visualizations) based on the extracted field values.

In various embodiments, the data visualization application 1012 retrieves data by querying a field-searchable data store included in the network. For example, the data visualization application 1012 could be an instance of the SPLUNK® ENTERPRISE system, an application within the cloud-based environment, such as SPLUNK CLOUD™, an application for a self-service cloud, or another deployment of an application that implements the Splunk processing language (SPL).

For example, the data visualization application 1012 could implement the data intake and query system 102 in order to extract one or more fields of data from a field-searchable data store. In such instances, the data visualization application 1012 could retrieve the extracted fields as portions of a text string, such as: 2018-07-28 00:07:01,781 INFO [async_client] [async_client] [async_post_request] [16574] POST headers={'Authorization': u'Splunk-M4q2ROpGJCpng81W i8JJsyV1yGIxrIhI_1UsIUxv-Vk3m_I12q6Q83Drf7P68v8H68kvQ7RHgA2eJz50-LS-nw4dO0yw EsTodOD0jdWDNGhj9zFGN-RuCiBWovEy-XnO25X3_aNjSwyO_rE_ik7', Content-Type: app lication/json'}, uri=https://127.0.0.1: 8089/servicesNS/nobody/spacebridge-app/storage/collections/data/alert_recipient_devices, params=None, data={"py/object": "spacebridge app.data.alert_data. RecipientDevice", "timestamp": "153-2736421.201776", "alert_id": "5b5bb3 a580db6133e-603d33f", "device_id": "y+DJALQwOXERwVDBzUe-34Oya1MINAId0IPzRB dtt91U="} host=ip-10-0-240-141 source=/opt/splunk/var/log/splunk/spacebridge-app.log sourcetype=spacebridge-app-too_small.

In some embodiments, the data intake and query system 102 may send messages to the data visualization application 1012 in accordance with a push notification service (not shown), such as the APPLE® Push Notification service (APN), or GOOGLE® Cloud Messaging (GCM). For example, the data visualization application 1012 could receive various schemas, dashboards, playbooks, runbooks, cards, and/or visualizations that include real-time data associated with a particular machine and/or set of field-searchable events.

In various embodiments, the data visualization application 1012 may display raw or processed sensor data, whether received directly from the sensor data device(s) 508, or indirectly (e.g., from the data intake and query system 102), in a variety of visualizations and views. For example, sensor data may be displayed in a real-time view (e.g., a graph of sensor data from an individual sensor data device 508 or in the aggregate over a rolling time period) or a historical view (e.g., a graph of sensor data from an individual sensor data device 508 or in the aggregate over a specified historical time range).

The destination server(s) 1030 (e.g., 1030(1), 1030(2), etc.) are devices that communicate with one or more of the sensor data devices 508, the client device 106, and/or the data intake and query system 102. In various embodiments, multiple destination devices 1030 (e.g., 1030(1), 1030(2), etc.) may execute distinct remote applications 942 (e.g., 942(1), 942(2), etc.) and/or databases (e.g., 1934(1), 1934(2), etc.). For example, the remote application 942 may be included in a different destination server (not shown) than a destination server 1030 that includes the data store 944.

The remote application 942 is an application that receives data from the one or more sensor data devices 508. In some embodiments, the remote application 942 may be a data ingestion application that ingests sensor data transmitted by the one or more sensor data devices 508 in real time. In such instances, the remote application 942 may generate a processed data set and forward the processed data set to the data intake and query system 102 for storage in the one or more data stores 944. For example, the remote application 942 may collect sensor data from multiple sensor data devices 508(1), 508(2), aggregate the collected sensor data into an aggregated data set, then filter the data based on various criteria (e.g., remove temperature reading within a 0.2° C. tolerance) in order to generate a processed data set.

In some embodiments, the remote application 942 may employ one or more of the ML models 718, 818 that are used to monitor the sensor data and identify alert conditions, abnormal behavior, and/or anomalies. In such instances, the remote application 942 may respond to certain alert conditions or behavior by generating and transmitting alerts and/or action commands to client devices 106 that have security credentials associated with the sensor data device 508.

An example of an action command is a command to activate and display a live video feed of the physical object 1004 on the client device 106. Further, in some embodiments, the remote application 942 may employ the one or more ML models 718, 818 to generate a processed data set. For example, the remote application 942 may use one or more of the ML models 718, 818 in order to filter out redundant, noisy, and/or insignificant sensor data when generating the processed data set.

In some embodiments, a sensor data device 508 may process sensor data generated by sensors 820 of the sensor data device 508 in order to generate a processed data set, and/or identify alert conditions and/or anomalies. For example, the sensor data device 508 could process sensor data generated by its sensors 820 in order to filter the data based on various criteria when generating a processed data set. Further, the sensor data device 508 may employ one or more ML models to generate a processed data set. For example, the sensor data device 508 could use the ML models 718, 818 to filter out redundant, noisy, and/or insignificant sensor data within the sensor data to generate a processed data set. The sensor data device 508 may transmit the processed data set in one or more data packets 1008 to the destination server 1030 and/or the data intake and query system 102. Alternatively, the sensor data device 508 may transmit raw (unprocessed and/or unfiltered) sensor data in the data packets 1008 to the destination server 1030 and/or the data intake and query system 102. Additionally or alternatively, the sensor data device 508 may employ one or more ML models to analyze the sensor data from the sensors 820 to identify alert conditions and/or anomalies, and to generate alert notifications and/or action commands in response to identified alert conditions and/or anomalies.

Additionally or alternatively, the sensor data device 508 may employ the one or more ML models 818 in order to analyze the collection and transmission of sensor data at the sensor data device 508. The sensor data device 508 may, based on the analysis, suggest and/or set optimal amounts and/or thresholds of sensor data collection and/or transmission to the user (e.g., present the suggestions via the sensor management application 1010). For example, the sensor data device 508 may set a daily threshold data transmission amount based on the analysis using the ML models 818.

In some embodiments, the remote application 942 may determine a particular connected application and/or dashboard that acts as an endpoint that is to receive the processed data set. In such instances, the remote application 942 may refer to the index included in the data store 944 to determine the particular endpoint, and then forward the processed data set to the endpoint.

The data store 944 stores data associated with the sensor data devices 508 and other data associated with the operator of the sensor data devices 508. In various embodiments, the data store 944 may include an index that links the sensor data device 508 to specific remote applications, connected applications, and/or dashboards that are accessible via the data intake and query system 102. In some embodiments, the data store 944 may also include security credentials that authorize a device or application to access data and/or load particular dashboards linked to the sensor data device 508.

In various embodiments, an index entry for a sensor data device 508 may include the device ID 1006 of the sensor data device 508, security credentials (e.g., an authorization token, digital certificate, etc.), and identifications of linked remote applications and/or endpoints (e.g., one or more particular connected applications and/or dashboards). In some embodiments, the index entry may include a deep link to the particular endpoint. In such instances, the destination server 1030 may provide the client device 106 with the deep link in order for the data visualization application 1012 to perform a deep link action to directly connect to, and request data from, the particular endpoint identified in the index entry.

In various embodiments, the security credentials enable the data intake and query system 102 to authorize and authenticate the client device 106 to receive data associated with the sensor data device 508. In various embodiments, the destination server 1030 may respond to a request transmitted by the client device 106 by determining whether the device ID 1006 is included in the request. Upon determining that the device ID 1006 is included in the request, the destination server 1030 may transmit a response that includes the security credentials.

In some embodiments, the security credentials enable the client device 106 to receive data associated with the sensor data device 508 for a limited period of time. For example, the data store 944 may store an authentication token that has a specified time-to-live (TTL) value of one month. In such instances, the client device 106 could receive the authentication token and may be authorized to receive data associated with the sensor data device 508 for up to one month, at which time, the client device 106 needs to reacquire the device ID 1006 and send a subsequent request to the destination server 1030.

In various embodiments, data transmitted within data processing environment 1000 is encrypted in transit. For example, the data packets 1008 could be encrypted by the sensor data device 508 prior to transmission to the destination server 1030, and the remote application 942 may decrypt the data packets 1008. In some embodiments, sensor data stored at the sensor data device 508 may be encrypted in storage.

As described above, the sensor data device 508 may process sensor data to generate a processed data set for transmission. Accordingly, the sensor data device 508 may reduce the amount of data transmitted (e.g., to conserve bandwidth). In some embodiments, the sensor data device 508 may be configured to limit the amount of data being collected, stored, and/or transmitted. For example, a user may configure one or more of the sensor data devices 508 to set a data collection threshold (e.g., capture sensor data every minute rather than every second). As another example, the user may configure the sensor data devices 508 to process raw sensor data in order to generate processed data sets for storage and/or transmission.

In some embodiments, one or more of the above-described features may be performed via a cloud-based gateway. For example, the sensor management application 1010 could acquire the device ID 1006 of the sensor data device 508, and via the cloud-based gateway, determine the specific device, application, and/or dashboard to which the sensor data device 508 is registered. The sensor management application 1010 could then proceed to register itself and the data visualization application 1012 to that specific device, application, and/or dashboard. As another example, the sensor data device 508 could transmit raw and/or processed sensor data to the cloud-based gateway, which in turn could transmit the sensor data to the data intake and query system 102. The sensor data device 508 could generate and transmit alerts via the cloud-based gateway. Further, the ML models 718, 818 may be synchronized and/or transferred between the sensor data devices 508, the hub devices 504, and the data intake and query system 102 via the cloud-based gateway and/or via the destination server 1030. For example, an ML model 818 trained at the sensor data device 508 could be synchronized to the data intake and query system 102, and vice versa.

In some embodiments, the sensor data devices 508 may be configured in bulk. For example, multiple device IDs 1006 (e.g., a range of device IDs) may be input into the sensor management application 1010 and registered, or deregistered, as a group to/from a device, application, or dashboard in a manner similar to the techniques described above. In some embodiments, the sensor data device 508 may be linked (e.g., registered) to multiple remote applications and/or dashboards.

6.2. Real-Time Processing of Data Streams

Figure 11:
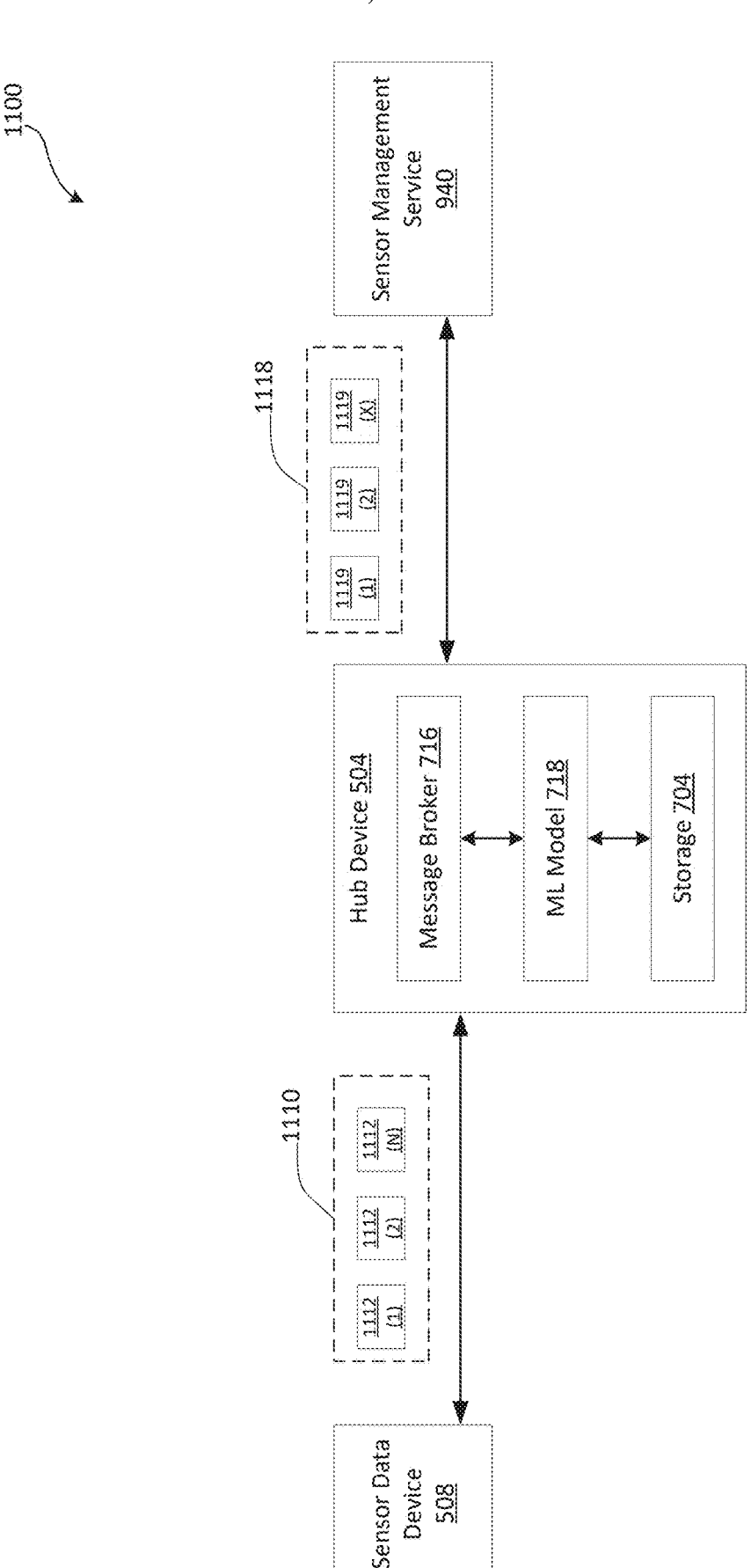
FIG. 11 illustrates a block diagram showing interactions between various components of the example data processing environment when processing a data stream, in accordance with example implementations.

FIG. 11 illustrates a block diagram showing interactions between various components of the example data processing environment 1100 when processing a data stream, in accordance with example implementations. As shown, the data processing environment 1100 includes the sensor data device 508, a data stream 1110, the hub device 504, an output data stream 1118, and the sensor management service 940. One or more components of data processing environment 1100 may perform various operations, including streaming sensor data, performing edge processing of incoming sensor data, and streaming output data to a remote service.

In operation, the sensor data device 508 transmits sensor data as the data stream 1110 by continually publishing separate discrete data sets 1112 (e.g., 1112(1), 1112(2), . . . 1112 (N), etc.) to a message bus. The message broker 616 included in the hub device 504 may subscribe to the message bus and ingest the data stream 1110 by receiving the data sets 1112 and inputting the data set into a selected ML model 718. The ML model 718 processes the data sets 1112 and generates a processed data set 1119(1). The message broker 616 then transmits the output data stream 1118 to the data intake and query system 102, where the output data stream 1118 includes separate discrete output data sets 1119 (e.g., 1119(1), 1119(2), . . . 1112(X), etc.).

In various implementations, the volume of data included in the output data stream 1118 is significantly smaller than the data included in the input data stream 1110. For example, the ML model 718 could execute a filtering technique on an input data set 1112(1) such that the output data set 1119(1) only include a small portion (less than 10%) of the input data set 1112(1).

In various implementations, the sensor data device 508 transmits one or more data sets 1112 in the data stream 1110, where the one or more data sets 1112 includes the sensor data that was acquired by the one or more sensors 820. In some implementations, the sensor data device 508 may continually send the data sets 1112 via the data stream 1110 to the hub device 504. Additionally or alternatively, the sensor data device 508 may input sensor data into a ML model 818 to process the sensor data and publish the processed sensor data into data stream 1110. In such instances, the hub device 504 may aggregate data from one or more data streams 1110 when generating output data stream 1118.

The hub device 504 processes, aggregates, and/or filters, the sensor data received from the sensor data device 508. For example, the sensor data device 508 could publish a specific subset of data sets 1112 to a specific message bus, and the message broker 616 could subscribe to the specific message bus. In such instances, the hub device 504 could ingest and analyze data included in the data stream 1110 in real time. The hub device 504 could perform various actions on the data, such as aggregating multiple data sets to generate an aggregated data set that includes data from the multiple data sets, filtering the data sets to produce a filtered data set containing only certain values, and so forth.

In various implementations, the message broker 616 may input one or more data sets 1112 into the ML model 718. The ML model 718 may be associated with an existing library of functions and/or other techniques to process data. In some implementations, such as when hub device 504 is a low-power device and/or operating with limited processing or memory resources, the ML model 718 may be a streaming ML model that performs lightweight computations and/or may be trained with incoming streaming data.

In various examples, the ML model 718 may perform various forms of filtering, estimation for frequency of an event or occurrence, anomaly detection, quantile classification, and so forth. For example, the message broker 616 could input data into the ML model 818, and the ML model 818 could use a threshold to classify incoming values in the one or more data sets 1112. In some implementations, the hub device 504 may train the ML model 718 based on data values included in the data stream 1110. In such instances, the ML model 718 may adjust specific values associated with the ML model 718 (e.g., adjusting the value of the threshold based on the values included in the data stream 1110) in real-time as the data stream 1110 is ingested. In various embodiments, the sensor data device 508 may store the one or more ML models 818 that operate in a similar manner to the ML models 718.

In some implementations, the ML model 718 may be stateless. In such instances, the ML model 718 may generate processed data values based only on the currently-inputted data value. For example, the ML model 718 may generate a score based on a current value received via the message broker 616. In some implementations, the ML model 718 may be stateful and store a subset of data values when generating processed data values. In such instances, the ML model 718 could perform functions based on an aggregation of data values over time. For example, the ML model 718 could estimate the frequency of certain values occurring, estimate an average value, etc. Similarly, the ML model 718 may maintain a window of values (e.g., values received within a one-day range). In such instances, the ML model 718 may perform various estimations, analysis (e.g., probabilistic analysis, approximation, classification, etc.), based on a subset of data values that fit within the window.

Upon generating one or more processed data values, the ML model 718 sends the processed data values to the message broker 616. In some implementations, the message broker 616 stores the processed data values in storage 704. In such instances, the processed data values use fewer storage resources than would otherwise be required to store the data values 1112 included in the input data stream 1110. In some implementations, the ML model 718 may be updated based on the processed data values.

The message broker 616 transmits the output data stream 1118 to sensor management service 940. The output data values 1119 included in the output data stream 1118 include the processed data values produced by the ML model 718. In various implementations, the sensor management service 617 may cause the output data values 1119 to be stored in data store 944 within the destination server 1030.

6.3. Sensor Data Device Characteristics

Figure 12:
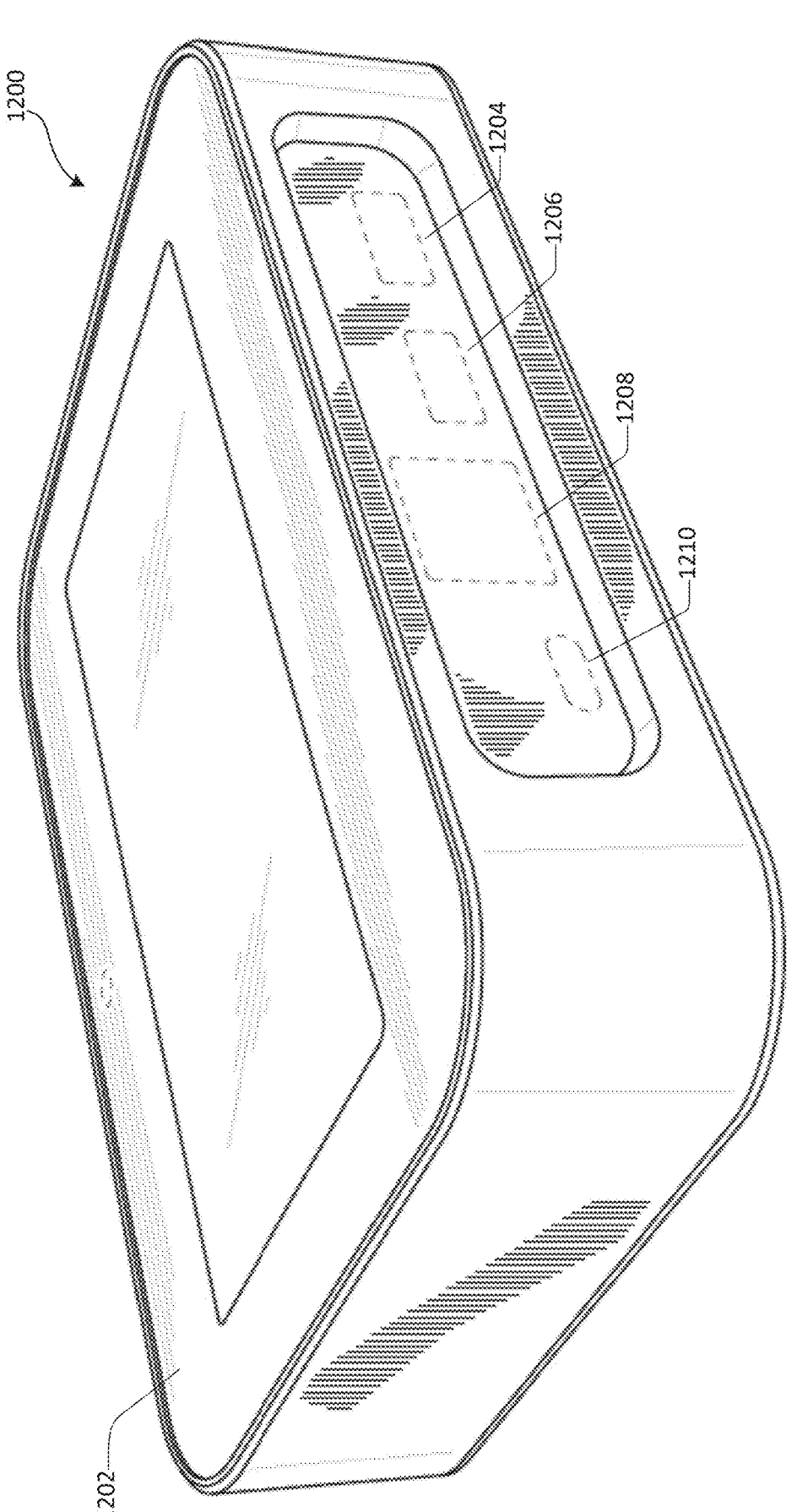
FIG. 12 illustrates a perspective view of an example sensor data device, in accordance with example implementations.

FIG. 12 illustrates a perspective view of an example sensor data device 1200, in accordance with example implementations. The sensor data device 1200 (e.g., a sensor data device 508) includes a housing 1202 that encases one or more components (e.g., processor 802, storage 804, system memory 812, one or more sensors 820, etc.) of the sensor data device 1200. The sensor data device 1200 may include connection port(s) 1204, USB port(s) 2106, networking port(s) 2108, and a power connector 1210 along one or more sides of housing 1202.

The connection ports 1204 may include one or more I/O ports that are configured to couple plugged-in devices (e.g., a sensor 820, an input device 822, an output device 824, etc.) to I/O devices interface 806. The USB ports 1206 include one or more USB ports that are configured to couple plugged-in devices and/or power sources to sensor data device 1200 (e.g., to I/O devices interface 806) via the USB protocol. The power connector 1210 is configured to couple a power source (e.g., a wall power socket, an external battery) to the sensor data device 1200 via a wire or cable.

The networking port(s) 2108 are configured to couple the network interface 808 to one or more network(s) 502 via a wire or cable, and any technically feasible protocol (e.g., Ethernet, Wi-Fi adapter, etc.). In various embodiments, the sensor data device 1200 may use the networking port 2108 to attach to other networking ports, such as a switched port analyzer (SPAN) port of another network device, where the SPAN port takes a mirrored copy of network traffic and transmits the copy to a specific destination. In such instances, the sensor data device 1200 may measure specific network traffic metrics in order to monitor network characteristics associated with the data processing environment 900. Additionally or alternatively, the sensor data device 1200 may implement the Message Queue Telemetry Transport (MQTT) protocol, Simple Network Management Protocol (SNMP), and/or other protocols to subscribe to specific message buses and/or collect data about specific managed devices within a given data processing environment 900.

Figure 13:
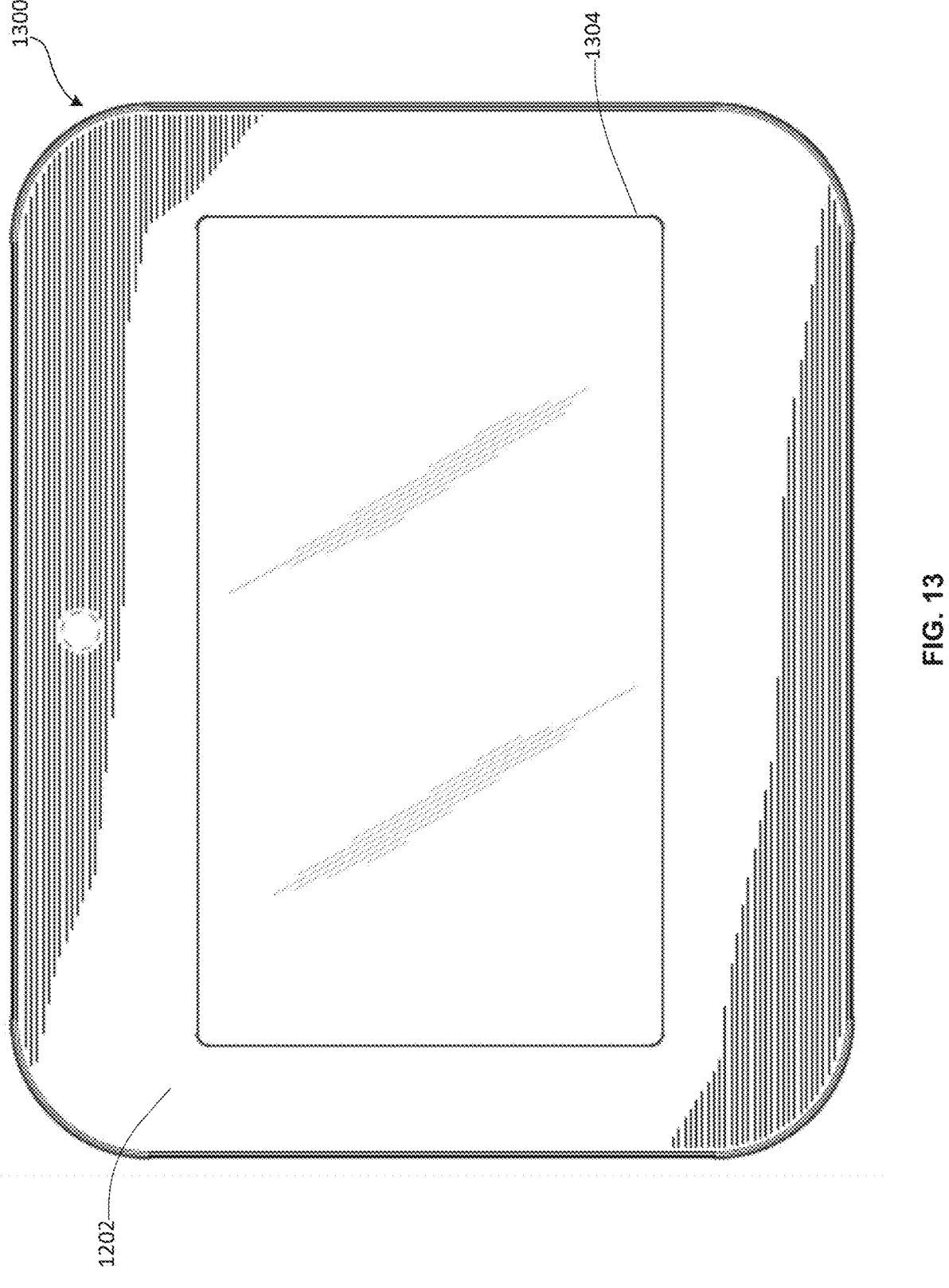
FIG. 13 illustrates a top view of an example sensor data device, in accordance with example implementations.

FIG. 13 illustrates a top view of an example sensor data device 1300, in accordance with example implementations. The sensor data device 1300 (e.g., a sensor data device 508) includes a display device 1304 (e.g., display unit 904) among its output devices 824. The display device 1302 is included in housing 1202 and may be coupled to I/O devices interface 806 of the sensor data device 1300. During operation, the sensor data device 508 may display various information (e.g., via UI 902) on the display device 1302. For example, the sensor monitoring service 906 of the sensor data device 1300 could cause the display device 1302 to display, via UI 902, a battery remaining percentage (e.g., if the sensor data device 1300 is powered by a battery), as well as status indicators of various sensors 820 (corresponding to sensor data acquired by the sensors 820).

Figure 14:
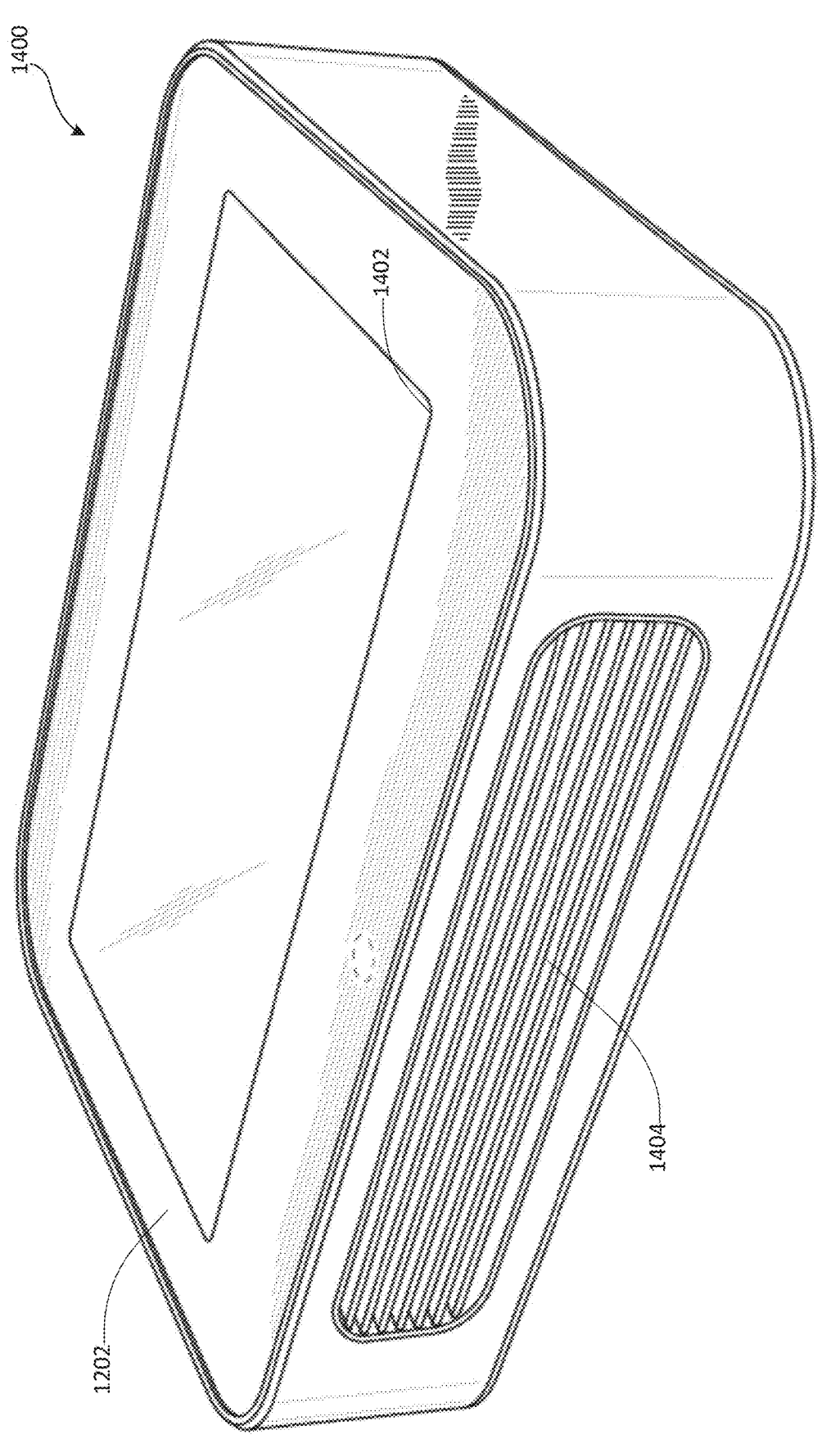
FIG. 14 illustrates a three-dimensional model of a sensor data device 1400, in accordance with example implementations.

FIG. 14 illustrates a three-dimensional model of a sensor data device 1400, in accordance with example implementations. The sensor data device 1400 includes housing 1202 and openings 1402, 1404. The housing 1202 may house the components of the sensor data device 1400 (e.g., a sensor data device 508). The housing 1202 includes an opening 1402 that is configured to receive a display device (e.g., display device 1304) and expose the display device 1304 to the exterior of the housing 1202. In various embodiments, the housing 1202 may also include one or more ventilation openings 1404 that are configured to facilitate airflow between an interior and an exterior of the housing 1202, openings to ports 1204-1210, plugs, and the like for the sensor data device 1400.

Figure 15:
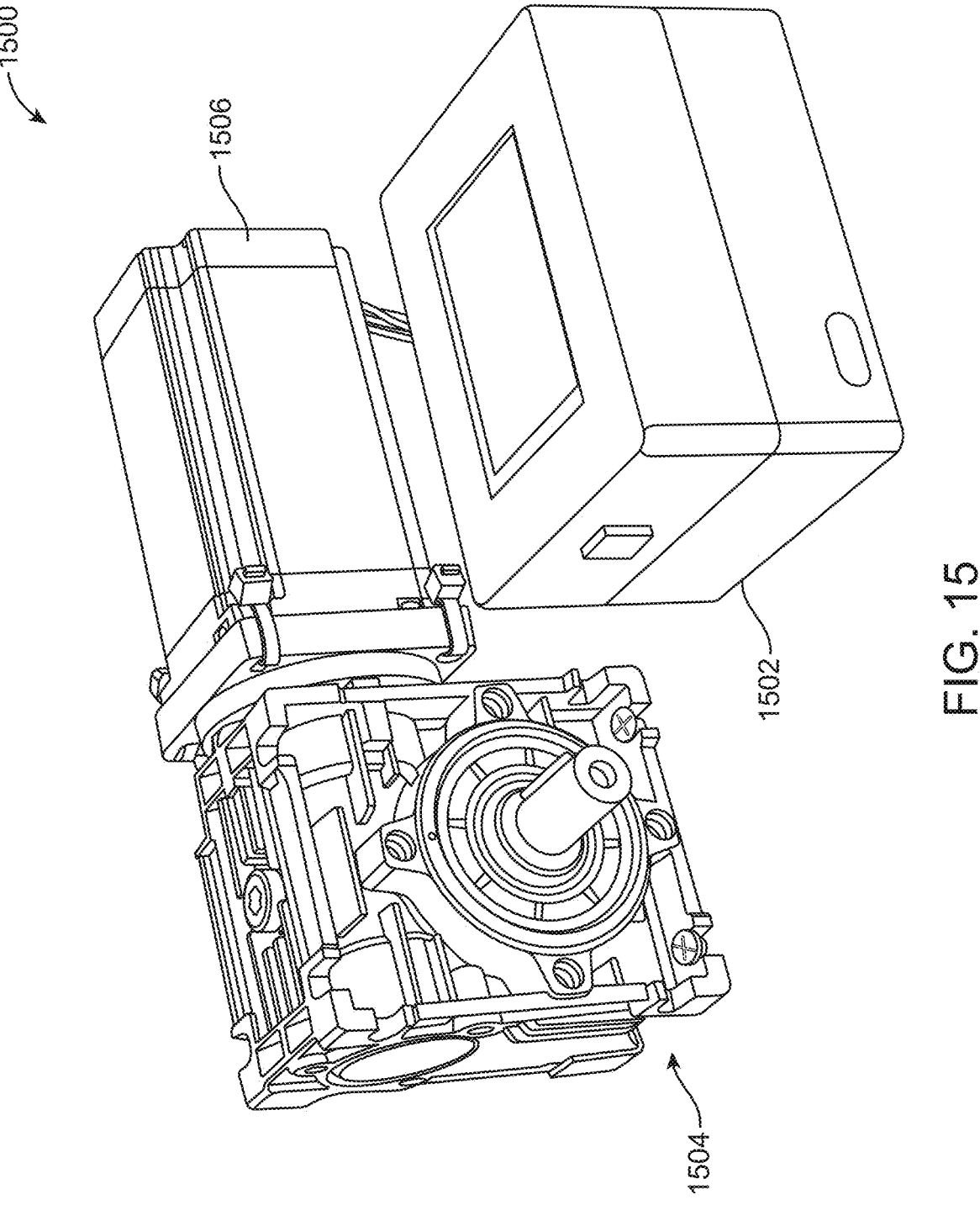
FIG. 15 illustrates an example data processing environment in which a sensor data device is positioned in physical proximity of a physical object, in accordance with example implementations.

FIG. 15 illustrates an example data processing environment 1500 in which a sensor data device 1502 is positioned in physical proximity of a physical object 1504, in accordance with example implementations. As shown, the sensor data device 1502 (e.g., a sensor data device 508) is physically positioned near the physical object 1504 that includes a motor 1506.

In this example, one or more sensors 820 of the sensor data device 1502 could measure or monitor one or more characteristics and properties of the physical object 1504 and/or the data processing environment 1500. In such instances, the sensors 820 of sensor data device 1502 could include a temperature sensor that measures temperature at the surface of the motor 1506, a sound sensor that measures the ambient noise level surrounding physical object 1504, and so on. In various embodiments, sensor data is that acquired by the sensor data device 1502 and is associated with the physical object 1504 may be processed, transmitted, and/or stored according to the techniques described above.

6.4. Registration of Sensor Data Device

FIG. 16 illustrates a call flow diagram 1600 showing interactions between various components of the example data processing environment 1000 of FIG. 10 when registering a sensor data device 508, in accordance with example implementations. One or more components of the data processing environment may perform various operations, including a registration of a sensor data device 508 with specific remote applications 942 and/or specific dashboards via the data intake and query system 102, and retrieval of data associated with the sensor data device 508.

When registering the sensor data device 508, the client device 106 acquires a device ID 1605 from the sensor data device 508. In some embodiments, the sensor data device 508 may transmit a signal, such as a beacon signal, that includes the device ID 1605. In some embodiments, the client device 106 acquires the device ID 1605 by scanning an image (e.g., alphanumerical text string, barcode, QR code, etc.) in which the device ID 1605 is encoded. In some embodiments, the client device 106 may acquire multiple distinct device IDs 1605 (e.g., 1605(1), 1605(2), etc.) from multiple sensor data devices 508. In various embodiments, the client device 106 may be restricted to acquiring the device ID 1605 when in a location proximal to the sensor data device 508.

The client device 106 sends request 1610 to the destination server 1030. Upon acquiring the device ID 2005, the client device 106 may determine whether the sensor data device 508 is configured to transmit data to a specific device and/or dashboard by sending the request 1610 to the destination server 1030. The request 1610 includes the device ID 1605 of the sensor data device 508.

The destination server 1030 sends a response 1615 to the client device 106. In various embodiments, the destination server 1030 may use the device ID 1605 as a key when scanning an index that is included in data store 944. In such instances, the destination server 1030 may scan the index in order to determine whether an entry exists that links the device ID 1605 to a specific device (e.g., a client device 106) and/or dashboard. In some embodiments, when the destination server 1030 determines that the sensor data device 508 is linked to a specific device, the destination server 1030 generates the response 1615 that includes an indication of the remote application 942 to which the device ID 1605 is linked. In some embodiments, the destination server 1030 may determine that the sensor data device 508 is linked to a specific device and may include an identifier of the device (e.g., a dashboard identifier in response 1615). In some embodiments, the destination server 1030 may include additional data, such as security credentials that are associated with the sensor data device 508.

Alternatively, when the destination server 1030 determines that the sensor data device 508 is not linked to a specific remote application 942 and/or dashboard, the destination server 1030 may send, in the response 1615, an indication that the sensor data device 508 is not registered. In such instances, the destination server 1030 may include candidate lists of remote applications (e.g., remote applications 942(1), 942(2), etc.) and/or dashboards that can be linked to the sensor data device 508.

The client device 106 performs actions 1620 to receive selections of specific remote applications and/or dashboards. In various embodiments, the client device 106 may execute registration service 922 in order to provide an interface to the user, where the interface includes candidate lists of remote applications and/or dashboards. In such instances, the client device 106 may receive a user input (e.g., a selection of remote application 942) and, based on the user input, may select a specific remote application 942 and/or dashboard to assign to the sensor data device 508.

The client device 106 sends assignment 1625 to the destination server 1030. Upon receiving a selection of the specific remote application 942 and/or dashboard, the client device 106 sends assignment 1625 to the destination server 1030. In various embodiments, the assignment 1625 may include an indication of the selected remote application 942 and/or dashboard, as well as the device ID 1605.

The destination server 1030 performs actions 1630 to create an index entry for the assignment 1625. The index entry includes the device ID 1605 as an identifier for the sensor data device 508, as well as identifiers for the specific remote application 942 and/or dashboard to which the sensor data device 508 is linked. In various embodiments, the index entry may also include security credentials (e.g., an authorization token), and deep links to the specific remote application 942 and/or dashboard. The destination server 1030 then sends a dashboard assignment 1635 to the data intake and query system 102, where the dashboard assignment 1635 includes an indication (e.g., a dashboard identifier) of the specific dashboard that is linked to the sensor data device 508.

After registration, the destination server 1030 receives sensor data 1640 (e.g., data sets 1112 transmitted via a data stream 1110) transmitted from the sensor data device 508. In various embodiments, the sensor data device 508 may be linked to the remote application 942 included in the destination server 1030. In such instances, when the sensor data device 508 publishes sensor data 1640, a given data set 1112 is transmitted via one or more data packets 1008 to subscribers. The destination server 1030 may receive the one or more data packets 1008 and may extract the sensor data 1640. In some embodiments, the destination server 1030 may form a data stream with the sensor data device 508. In such instances, the destination server 1030 may receive a continual stream of the data packets 1008 that each contain a portion of the sensor data 1640.

The destination server 1030 performs actions 1645 to process the sensor data 1640. In some embodiments, the remote application 942 may process the data set 1112 in real time, where the data set 1112 includes sensor data 1640 transmitted over varying periods. In such instances, remote application 942 may generate an output data set 1119, comprising processed sensor data 1650, and forward the processed sensor data 1650 to the data intake and query system 102 for storage in one or more data stores 944.

Figure 17:
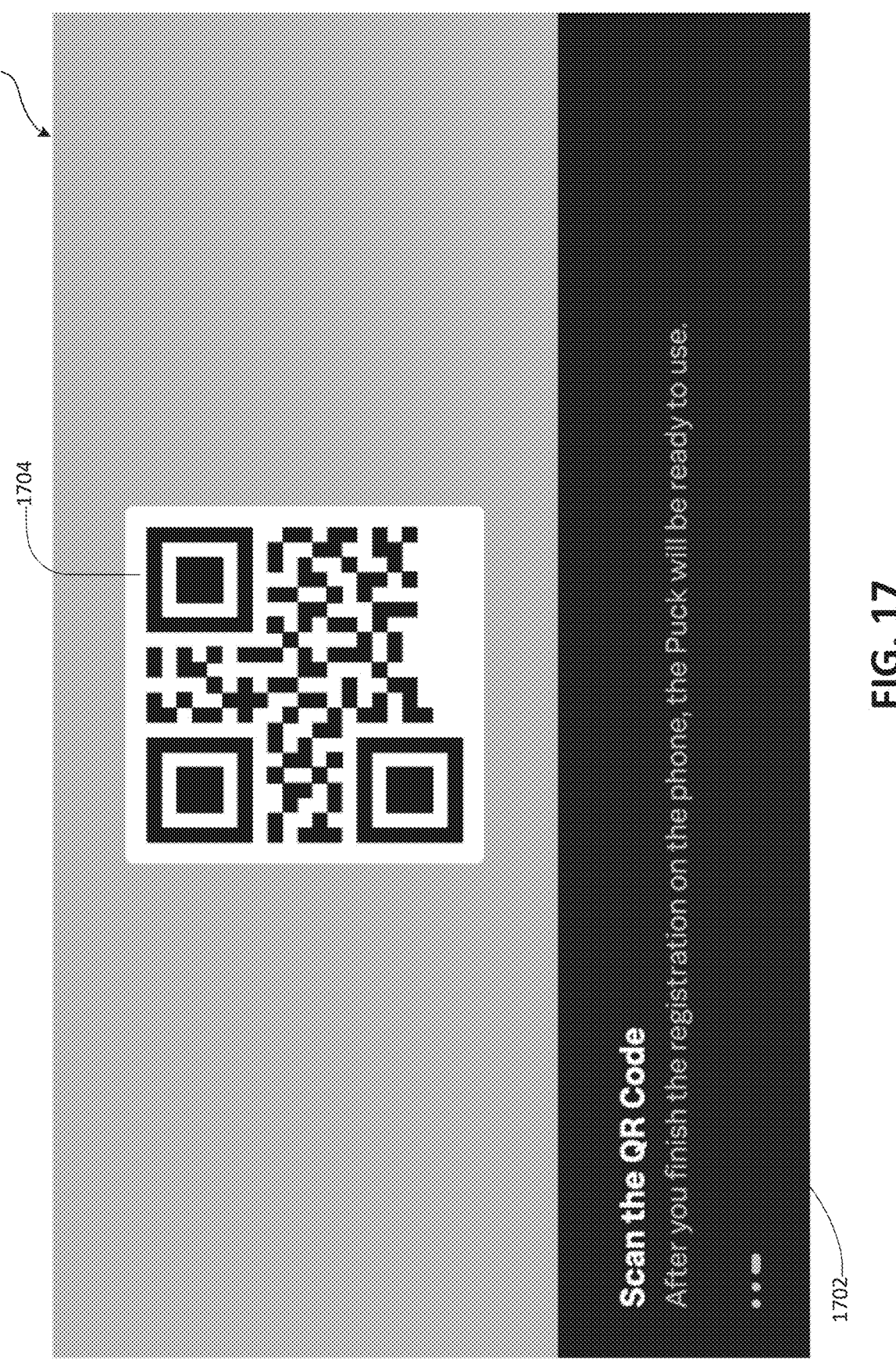
FIG. 17 is an example user interface provided by the sensor data device in data processing environment of FIG. 9, in accordance with example implementations.

FIG. 17 is an example user interface provided by the sensor data device 508 in data processing environment 900 of FIG. 9, in accordance with example implementations. In general, the sensor data device 508 may include a device ID 1006 that uniquely identifies the sensor data device 508 within the data processing environment 900. The sensor data device 508 may present the QR screen 1700 that includes a QR code 1704 that contains the device ID 1006. In various embodiments, the sensor data device 508 may provide the QR screen 1700 in order to enable a user to acquire the device ID 1006 by scanning the QR code 1704. For example, the sensor data device 508 could present the QR code screen 1700 with a prompt 1702 that instructs the user to scan the QR code 1704 to initiate registration of the sensor data device 508. In various embodiments, the sensor data device 508 may present the QR code screen 1700 in order to enable the client device 106 to scan the QR code 1704 and acquire the device ID 1006 to retrieve a linked dashboard.

FIGS. 18A-18K are example user interfaces for a user registering a sensor data device via a client device 106, in accordance with example implementations. In general, the client device 106 scans the QR code 1704 that is provided by the sensor data device 508. The sensor management application 1010 in the client device 106 runs the registration service 922 to register the sensor data device 508 and link the sensor data device 508 with specific devices, dashboards, and/or users. During registration of the sensor data device 508, the sensor management application generates various views 1800, 1805, 1810, 1815, 1820, 1825, 1830, 1840, 1845, 1850, 1855 on the client device 106.

Figure 18A:
FIG. 18A illustrates a welcome screen for a sensor management application implemented on a device within the data processing environment of FIG. 9, in accordance with example implementations.
Figure 18B:
FIG. 18B illustrates an authentication screen for the sensor management application of FIG. 9, in accordance with example implementations.

As shown in FIG. 18A, view 1800 presents a welcome page for the sensor management application 1010. The view 1800 includes an introductory prompt 1802 and a selectable icon 1804 to initiate the sensor management application 1010. Upon receiving a user input corresponding to a user selection of the selectable icon 1804, the sensor management application may respond by presenting view 1805. As shown in FIG. 18B, the view 1805 illustrates an authentication screen to authenticate the user with a remote sensor management service 940. The authentication screen includes a username input field 1806, a password input fieldF 1807, and selectable icons 1808 to initiate authentication.

Figure 18C:
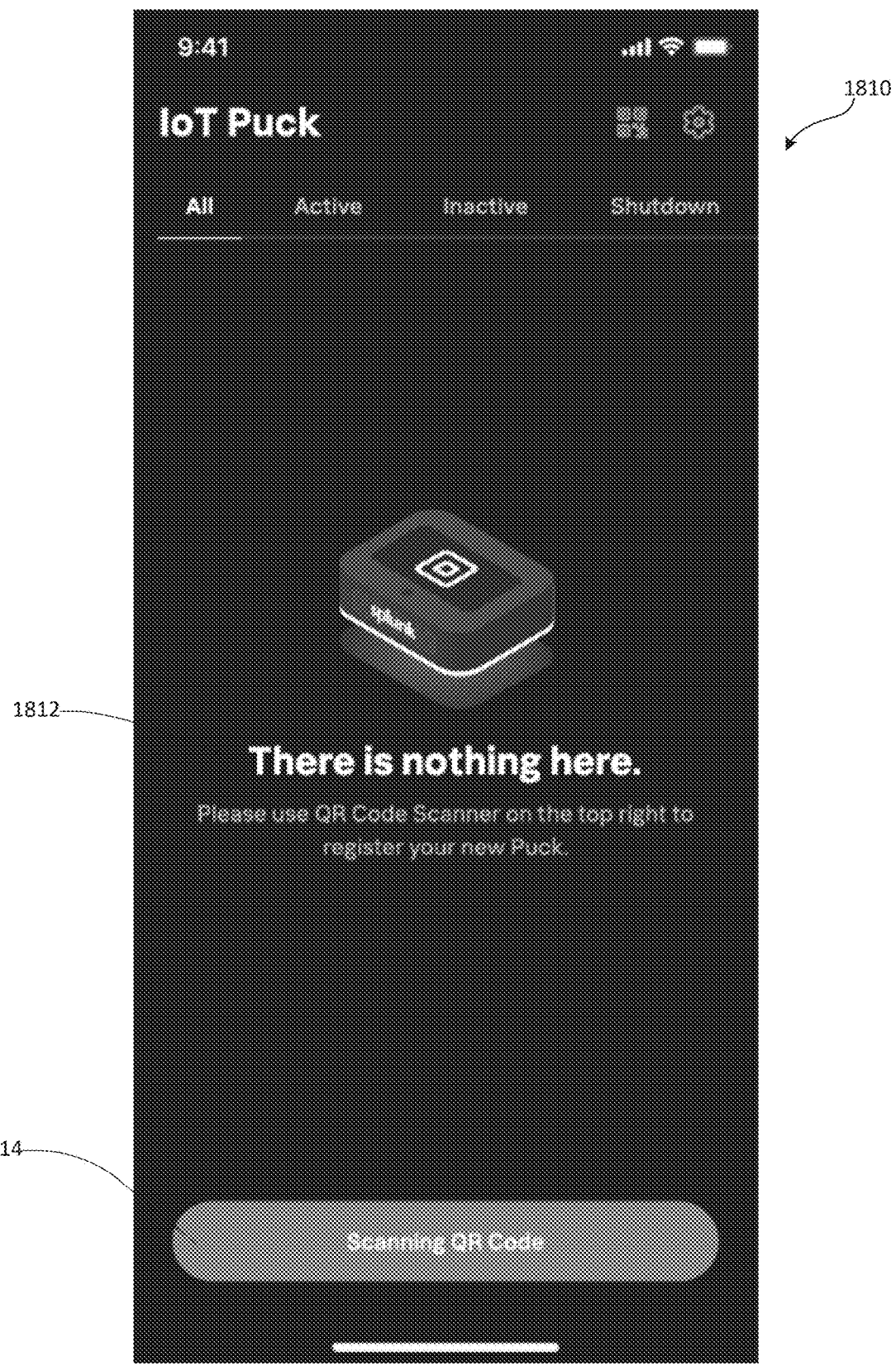
FIG. 18C illustrates a notification of available sensor data devices available in the data processing environment of FIG. 9, in accordance with example implementations.

As shown in FIG. 18C, the view 1810 includes a notification 1812 and a selectable icon 1814. In various embodiments, the sensor management application 1010 may present the view 1810 when no registered sensor data devices 508 are proximate to the client device 106. The view 1810 provides the notification 1812 that no registered sensor data devices 508 were found. The view 1810 also provides a contextual selectable icon 1814 that prompts the user to scan a QR code (e.g., the QR code 1704) that the sensor data device 508 provides. In some embodiments, upon receiving a user input corresponding to a user selection of the selectable icon 1814, the sensor management application may respond by presenting view 1815.

Figure 18D:
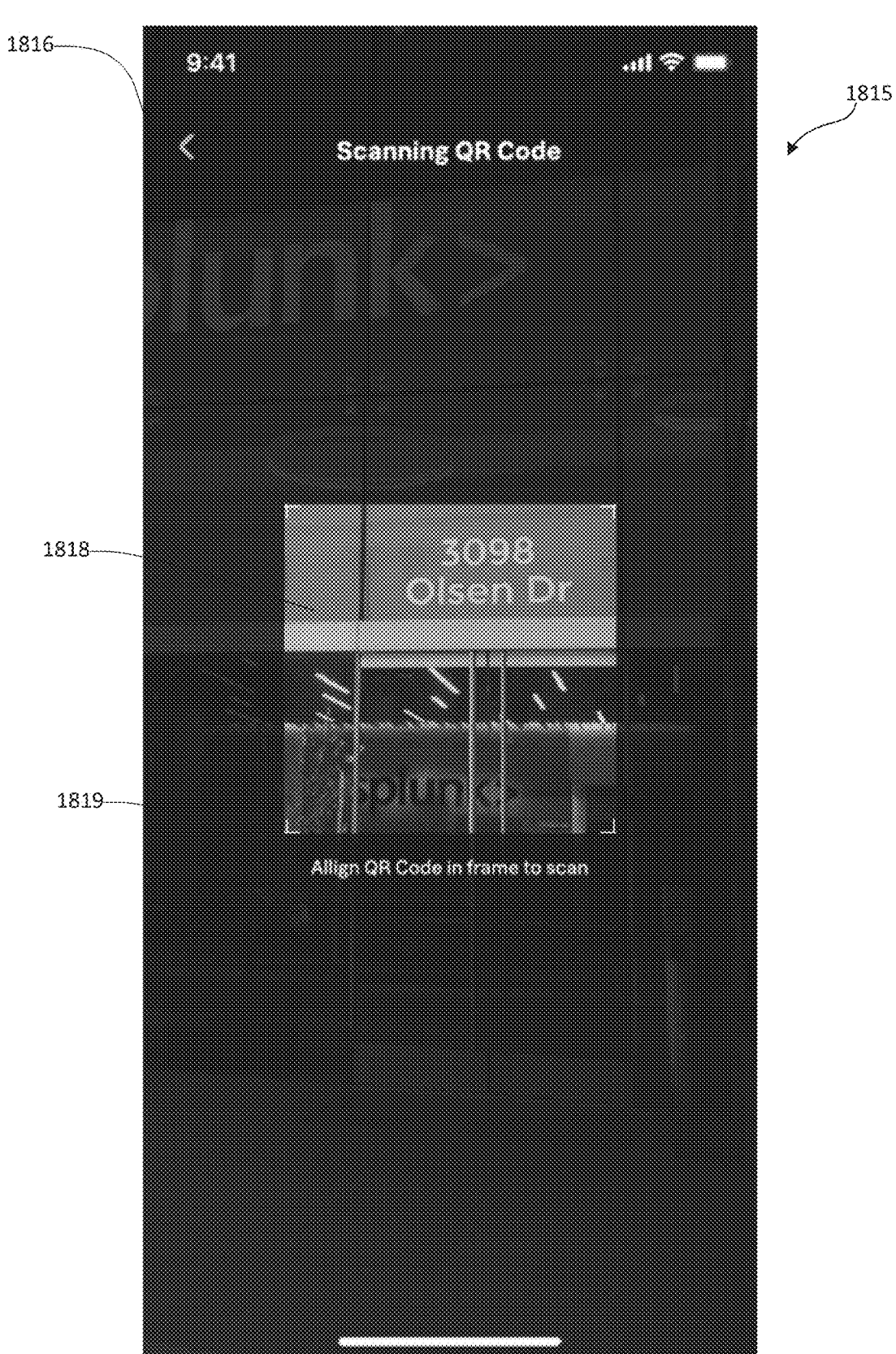
FIG. 18D illustrates a screen for scanning an image within the environment of FIG. 9, in accordance with example implementations.
Figure 18E:
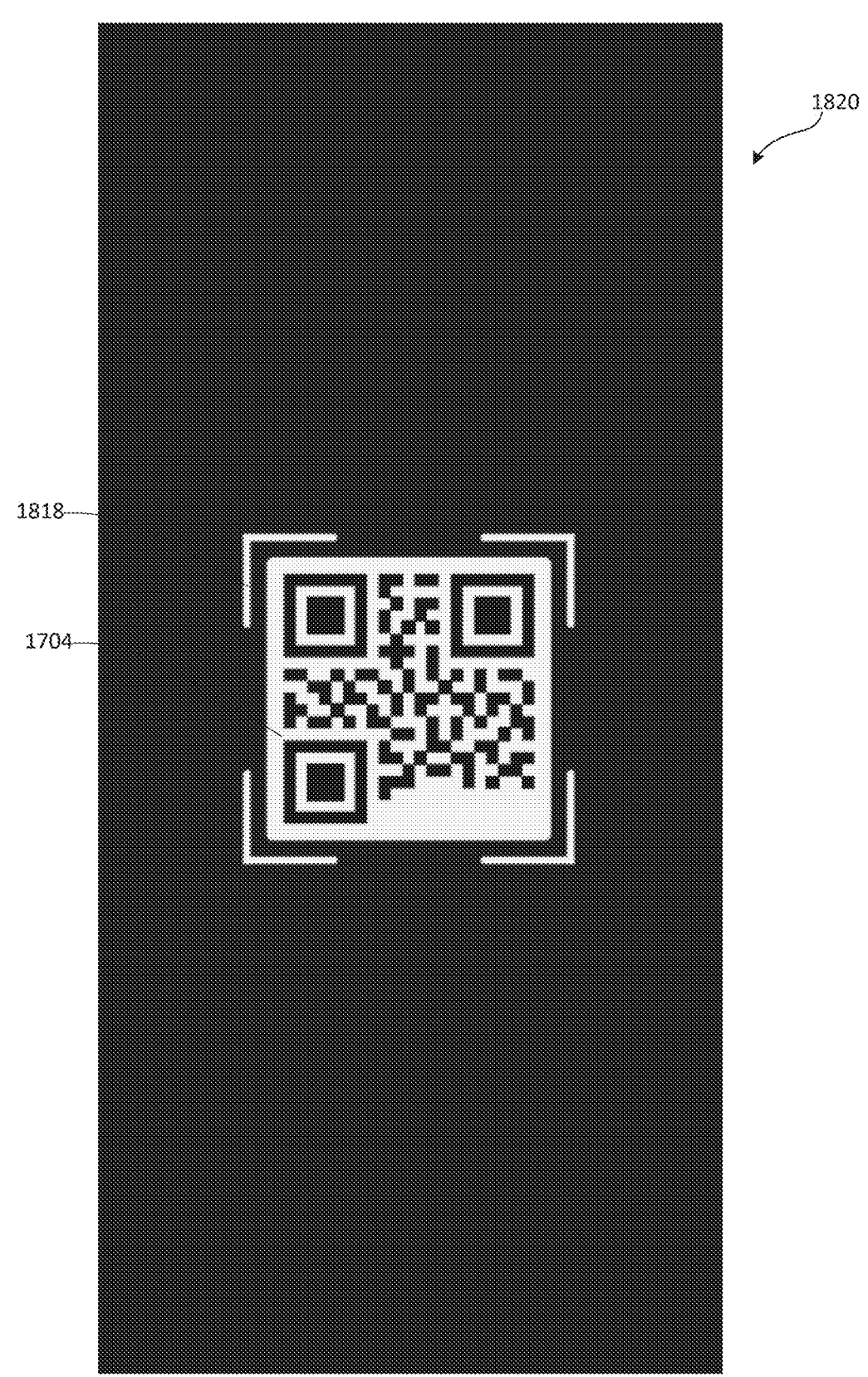
FIG. 18E illustrates a scan of a two-dimensional code within the environment of FIG. 9, in accordance with example implementations.

As shown in FIG. 18D, the view 1815 includes notification text 1816, image scanning region 1818, and prompt 1819. The sensor management application 1010 provides the view 1815 in order to enable the client device 106 to scan a QR code associated with the sensor data device 508. The view provides notification text 1816 and a prompt 1819 that instructs the user to align an applicable QR code within the scanning region 1818. As shown in FIG. 18E, the view 1820 occurs when the QR code provided by the sensor data device 508 (e.g., the QR code 1704) is aligned within the scanning region 1818. The view 1820 includes the QR code 1704 within the scanning region 1822.

Figure 18F:
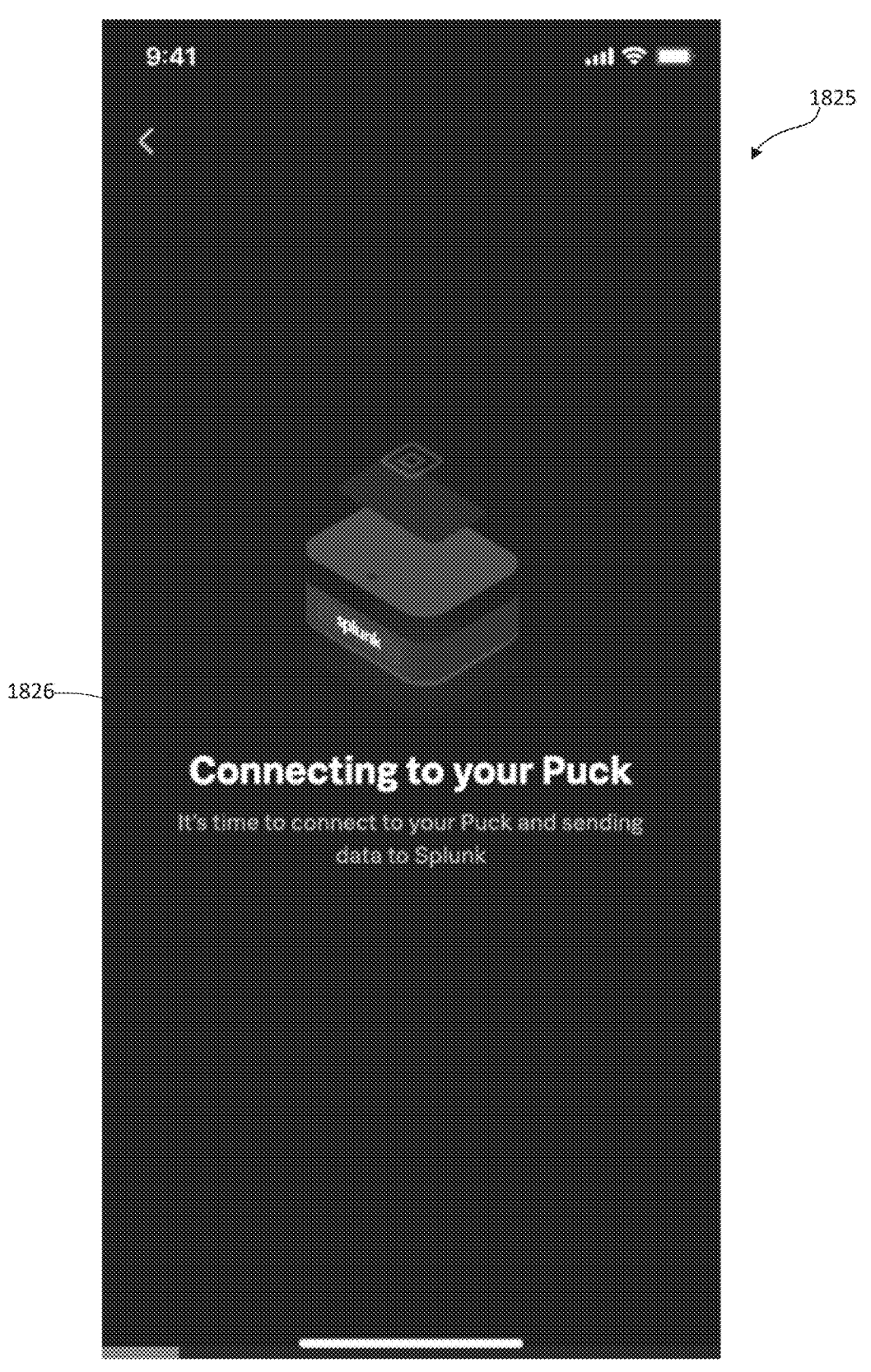
FIG. 18F illustrates a notification screen of a client device attempting to connect to a sensor data device within the data processing environment of FIG. 9, in accordance with example implementations.
Figure 18G:
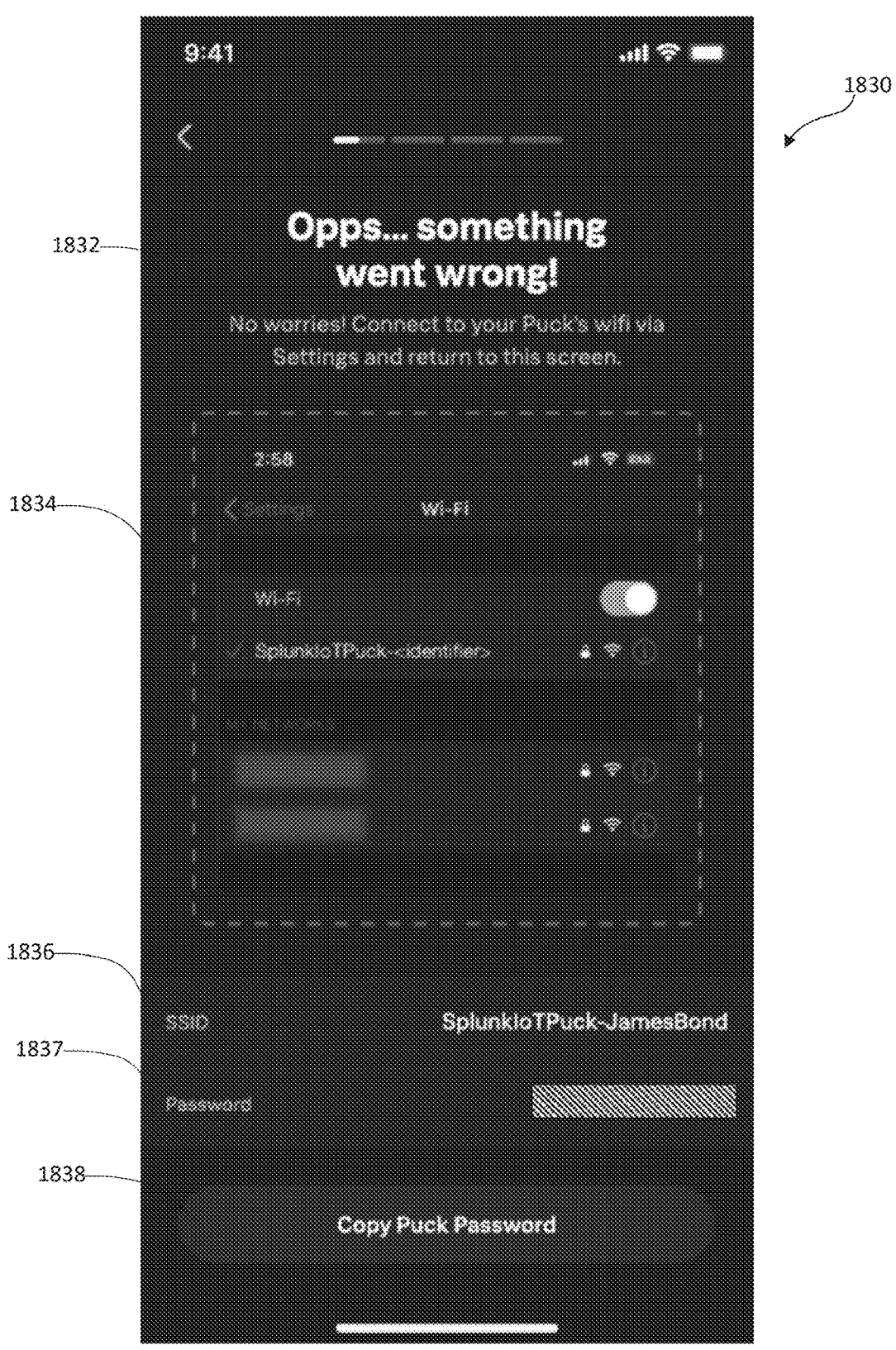
FIG. 18G illustrates a notification screen for connecting a device and a sensor data device to a common network, in accordance with example implementations.

As shown in FIG. 18F, the view 1825 shows notification text 1826 that the client device 106 is attempting connection to the sensor data device 508. In various embodiments, the sensor management application 1010 may present the view 1825 acquiring the device ID 1006 contained in the QR code 1704. When successfully connected to the sensor data device 508, the sensor management application 1010 may present the view 1850; otherwise, the sensor management application may present the view 1830. As shown in FIG. 18G, the view 1830 displays an error screen that includes notification text 1832, example image 1834, network name 1836, sensor data device password 1837, and selection icon 1838 to copy the sensor data device password 1837. In various embodiments, the sensor management application 1010 may present the view 1830 in order to prompt a user to connect to a specific wireless network that includes the sensor data device 508.

Figure 18H:
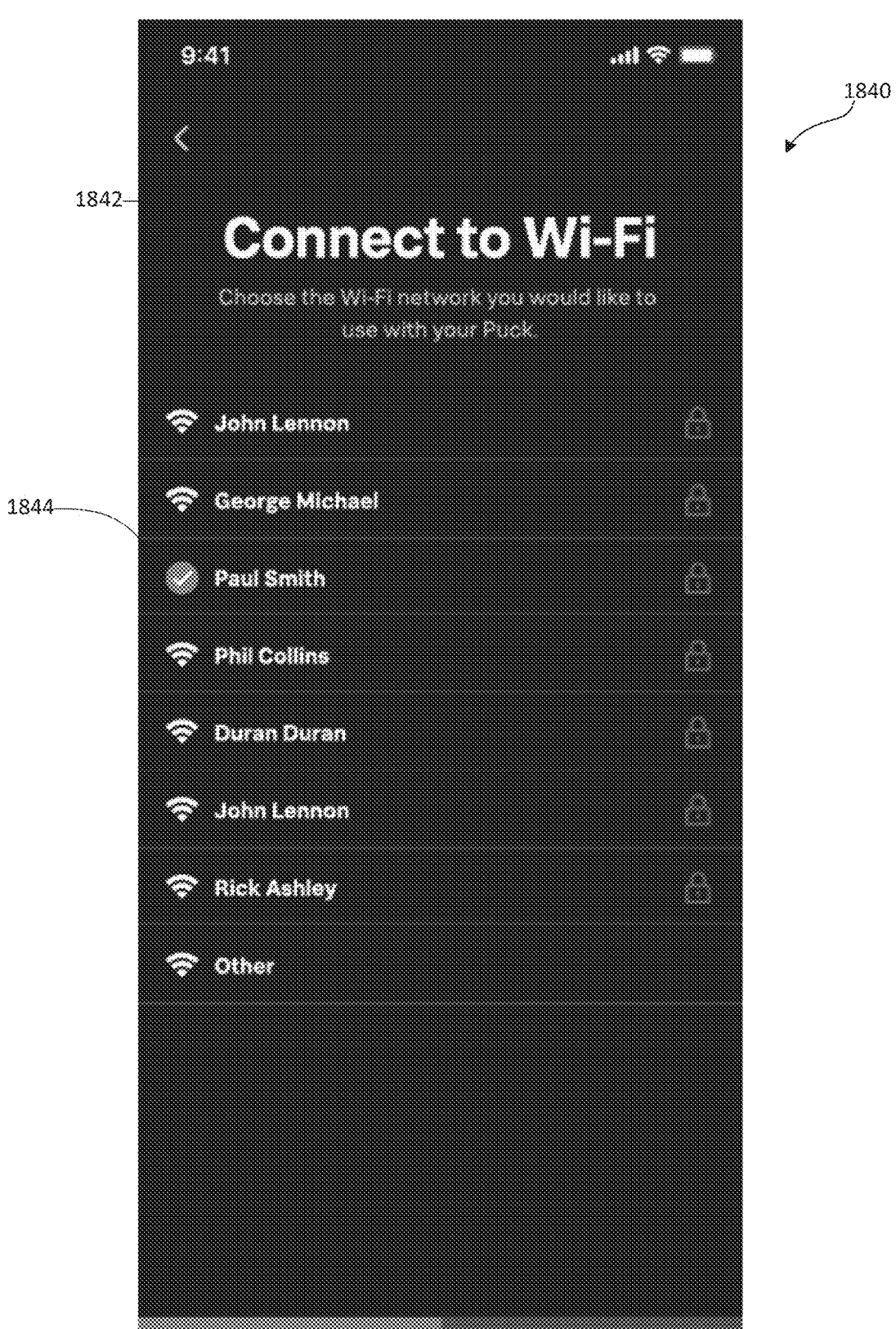
FIG. 18H illustrates a menu to select network for connection with the sensor data device within the data processing environment of FIG. 9, in accordance with example implementations.
Figure 18I:
FIG. 18I illustrates a menu to enter authentication credentials for connection to a wireless network, in accordance with example implementations.
Figure 18J:
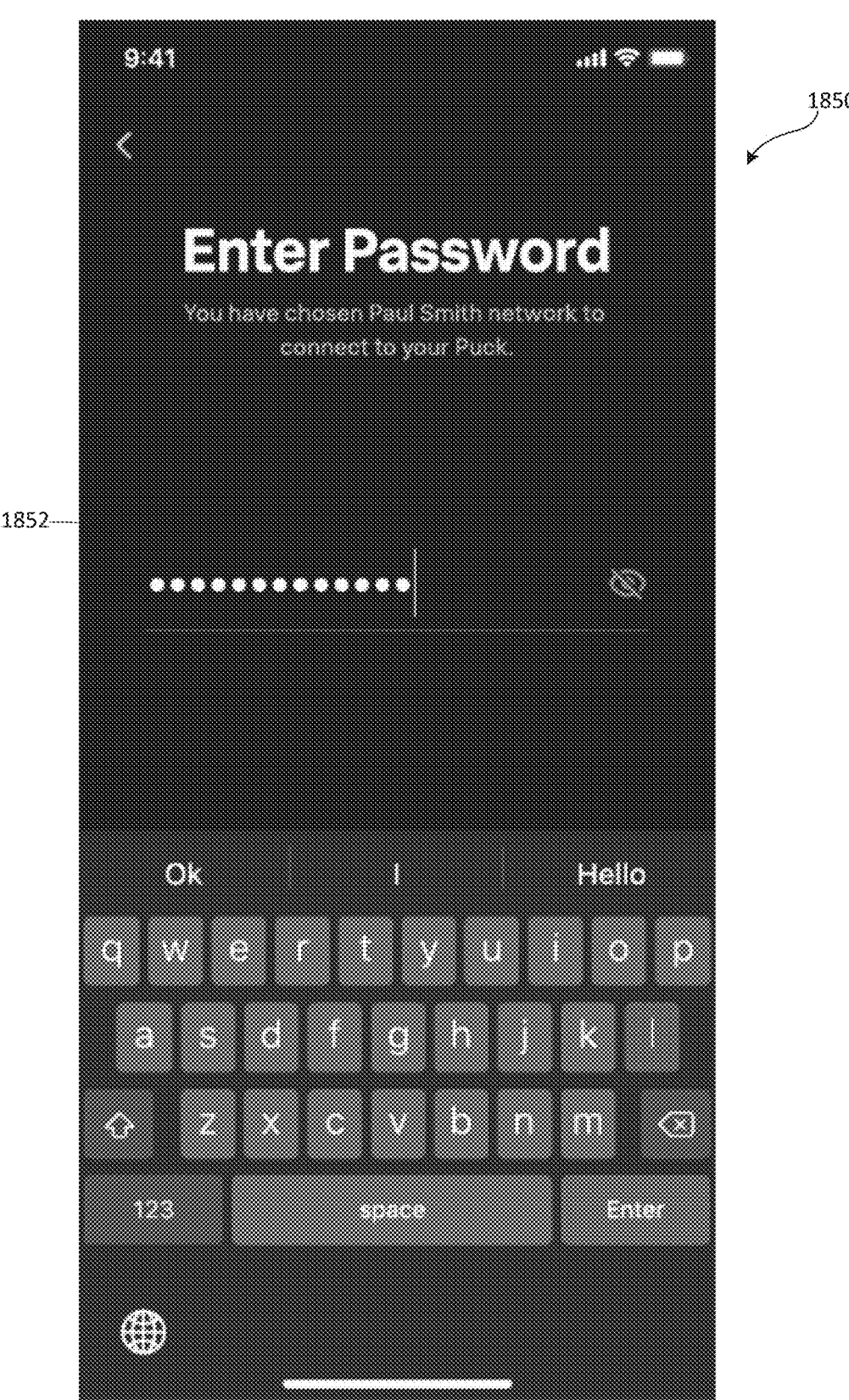
FIG. 18J illustrates an example entry of authentication credentials for connection to a wireless network, in accordance with example implementations.

As shown in FIG. 18H, the view 1840 shows instructional text 1842 and a list 1844 of available wireless networks. In various embodiments, once the client device 106 is connected to the sensor data device 508, the sensor management application 1010 may present view 1835 to select a wireless network (e.g., network 502(1)) through which the sensor data device 508 connects to the remote sensor management service 940. As shown in FIG. 18I, the view 1845 shows authentication fields 1846 and an input keyboard 1848. Upon selection of a specific wireless network, the sensor management application 1010 provides the view 1840 for a user to enter authentication information for the selected wireless network. As shown in FIG. 18J, the view 1850 shows a completed password field 1852 for the selected wireless network.

Figure 18K:
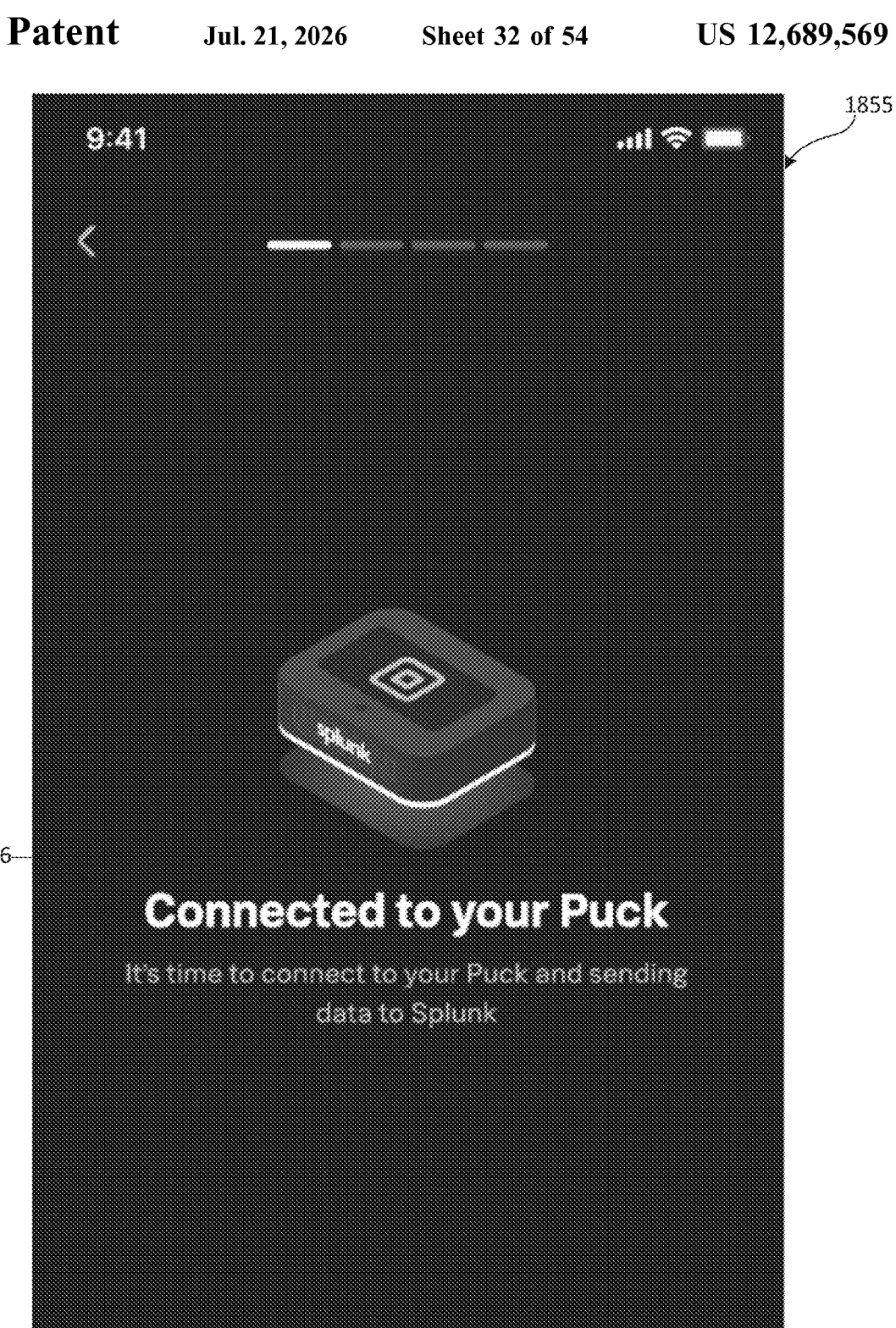
FIG. 18K illustrates a notification screen indicating a connection between a sensor data device and a wireless network, in accordance with example implementations.

As shown in FIG. 18K, the view 1855 shows that the sensor data device 508 is connected to the client device 106. In various embodiments, the sensor management application 1010 may present the view 1855 upon the client device 106 directly connecting to the sensor data device 508. Additionally or alternatively, the sensor management application 1010 may present the view 1855 upon the sensor data device 508 connecting to the selected wireless network.

6.5. Configuration of Sensor Data Device

FIGS. 19A-19D are example user interfaces for configuring a sensor data device 508 via a client device 106. In general, the sensor management device 934 included in the client device 106 configures the operation and/or other characteristics of the sensor data device 508 by sending commands that cause modifications to one or more services operating on the sensor data device 508. The sensor management application 1010 presents the views 1900, 1910, 1920, 1930 in order to enable a user to remotely modify characteristics of the sensor data device 508.

Figure 19A:
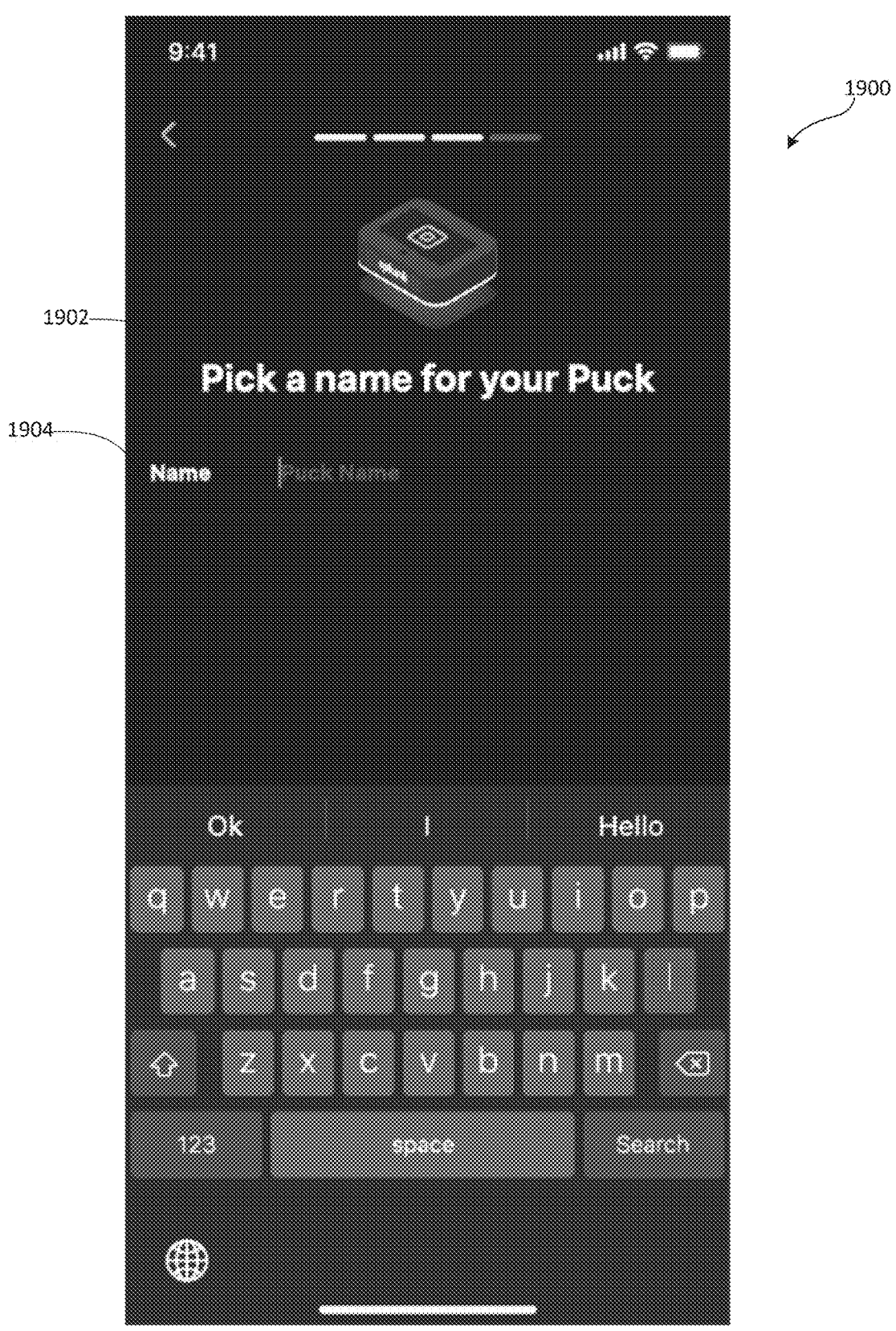
FIG. 19A illustrates a menu for configuring a name for a sensor data device within the data processing environment of FIG. 9, in accordance with example implementations.
Figure 19B:
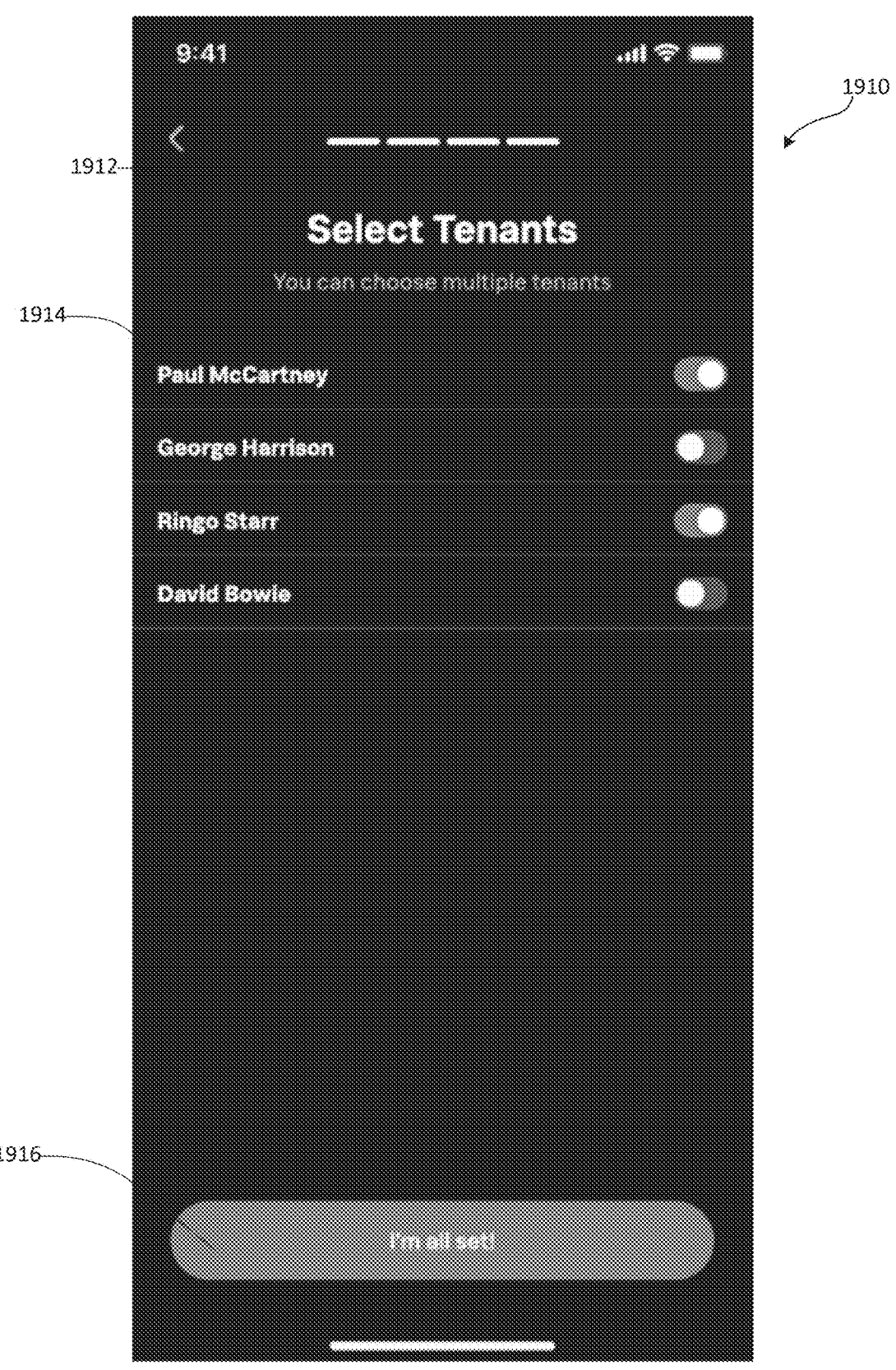
FIG. 19B illustrates a menu for selecting subscribers to the sensor data device within the data processing environment of FIG. 9, in accordance with example implementations.

As shown in FIG. 19A, the view 1900 shows a prompt 1902 and a name input field 1904. In various embodiments, the sensor management application 1010 shows the view 1900 in order to enable a user to name or rename the sensor data device 508. As shown in FIG. 19B, the view 1910 shows notification text 1912, a list 1914 of users ("tenants") that subscribe to the sensor data device 508, and a selectable icon 1916 to confirm the settings. In some embodiments a given user may subscribe one or more other users to the receive data published by the sensor data device 508. In such instances, the sensor management device 934 may send a message to the remote sensor management 940 that includes a set of subscribed users.

Figure 19C:
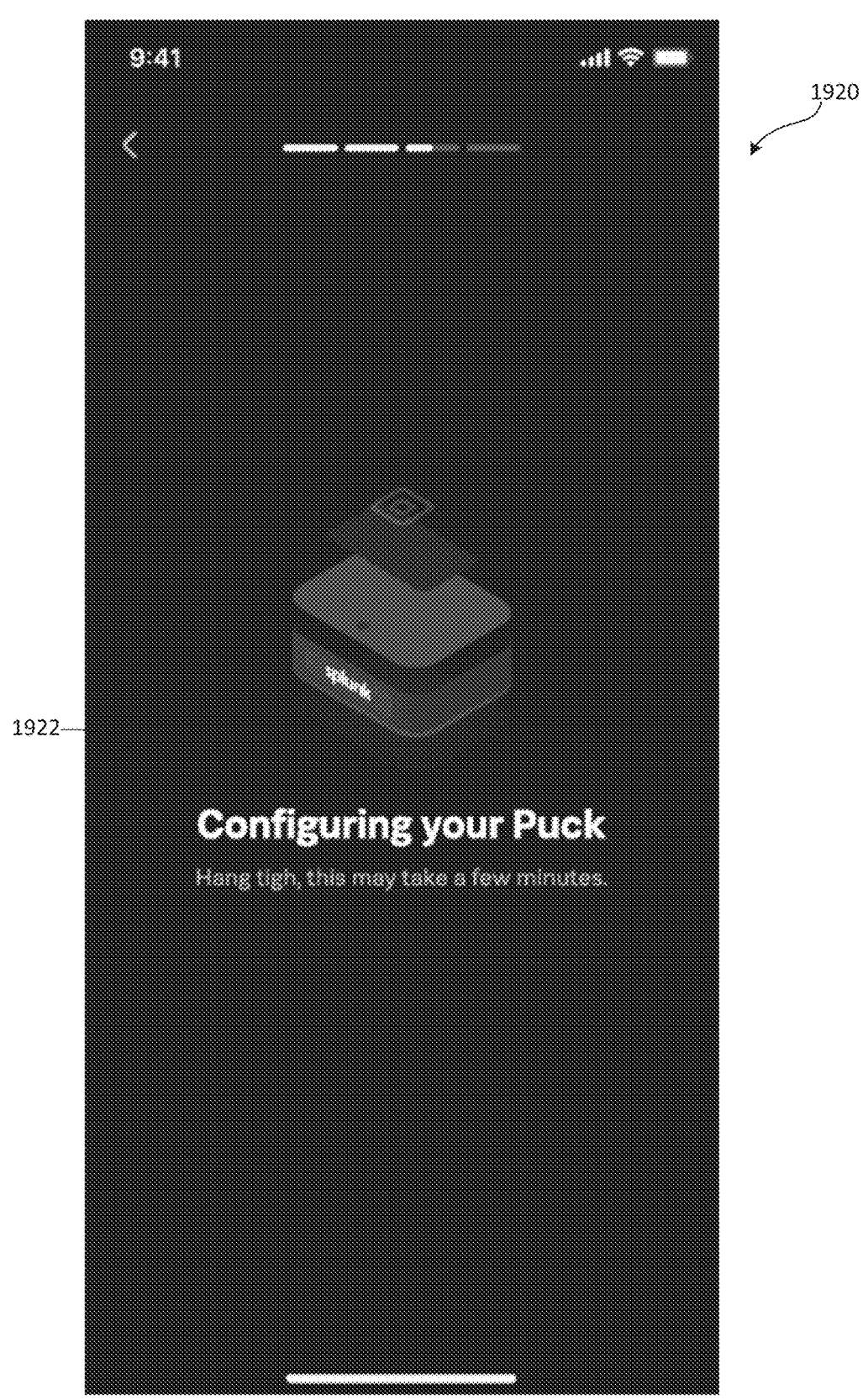
FIG. 19C illustrates a notification screen for configuring the sensor data device within the data processing environment of FIG. 9, in accordance with example implementations.
Figure 19D:
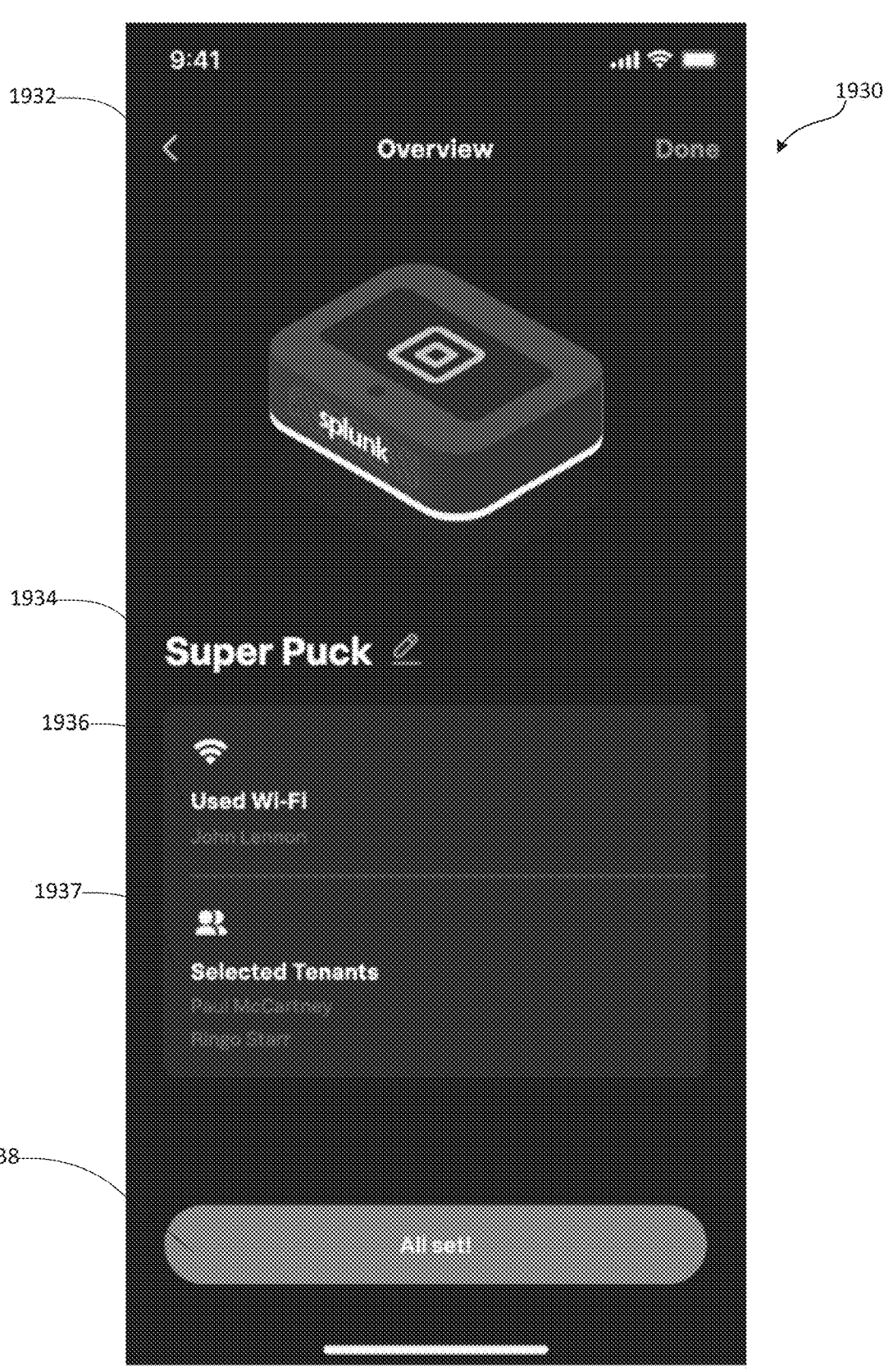
FIG. 19D illustrates a menu of characteristics for the sensor data device within the data processing environment of FIG. 9, in accordance with example implementations.

As shown in FIG. 19C, the view 1920 shows a notification text 1922 indicating that the sensor data device 508 is modifying one or more characteristics based on the settings provided by the user. As shown in FIG. 19D, the view 1930 shows an overview screen that includes a notification text 1932, the device name 1934, the selected wireless network 1936, the selected tenant list 1937, and a selectable icon 1938 to confirm the characteristics of the sensor data device 508. In some embodiments, the user may select one or more of the device name 1934, selected wireless network 1936, and/or the selected tenant list 1937 in order to make modifications before confirming the settings.

6.6. Visualization of Sensor Data

Figure 20A:
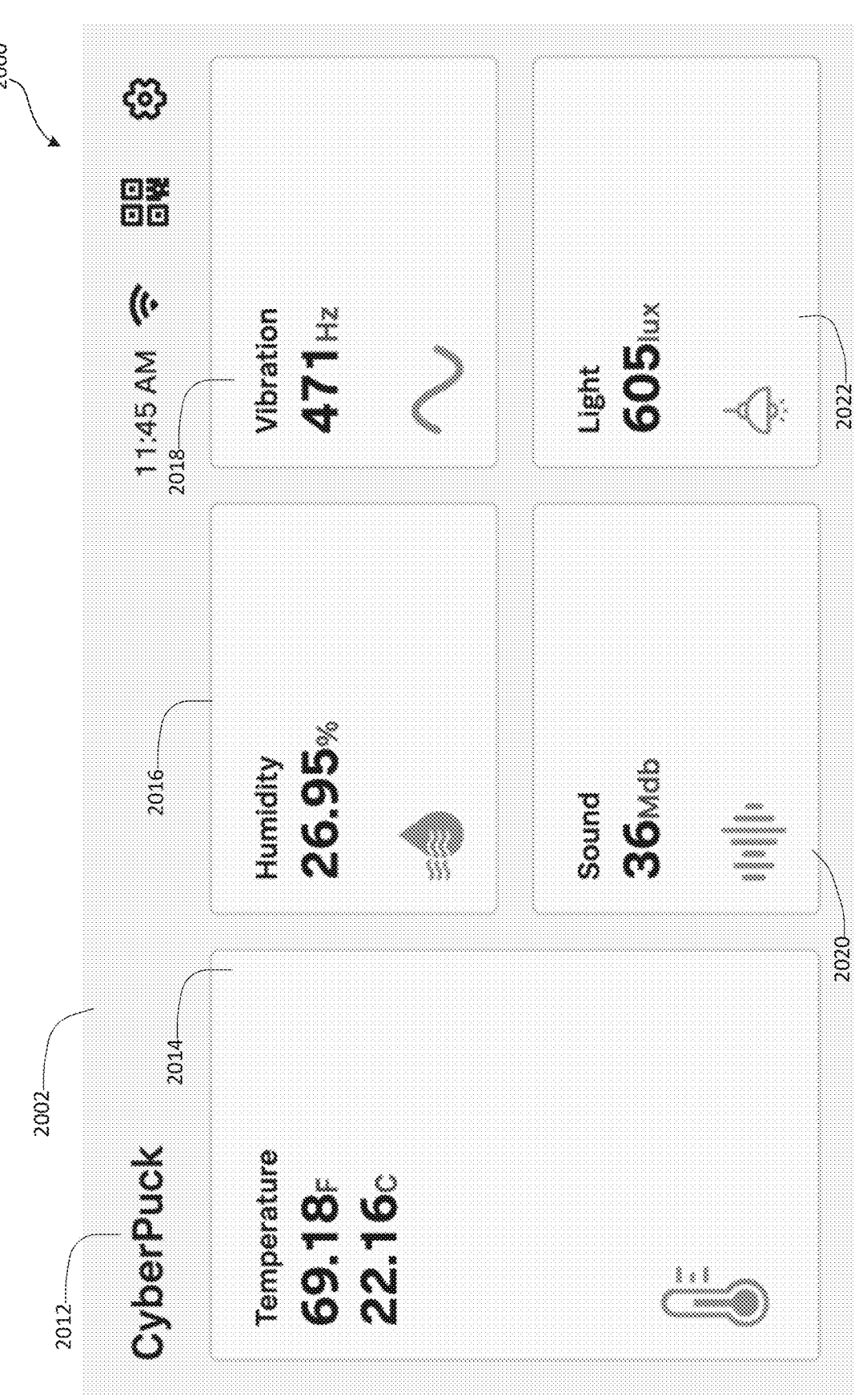
FIG. 20A illustrates an example dashboard provided by the sensor data device within the data processing environment of FIG. 9, in accordance with example implementations.
Figure 20B:
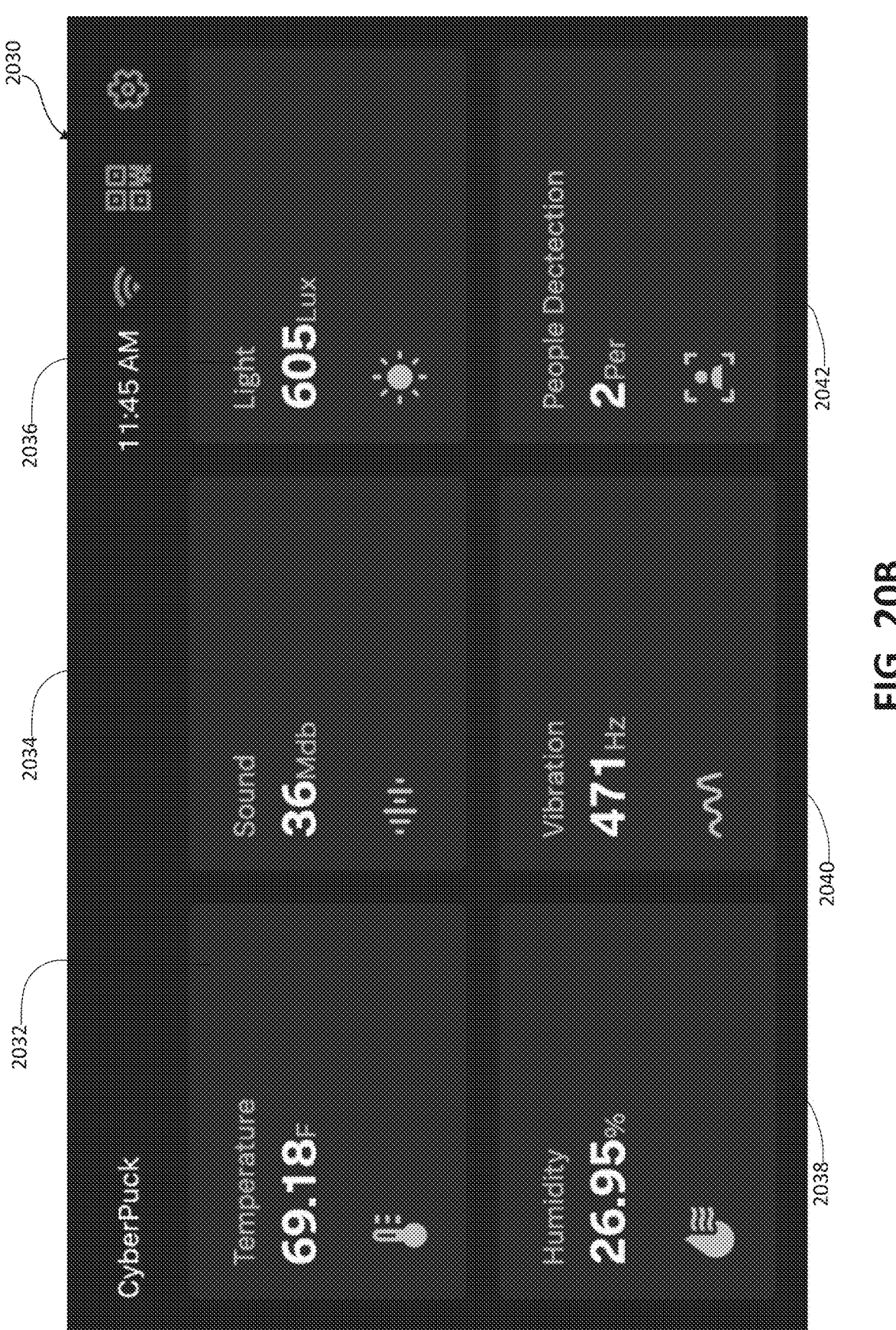
FIG. 20B illustrates another example dashboard provided by the sensor data device within the data processing environment of FIG. 9, in accordance with example implementations.
Figure 20C:
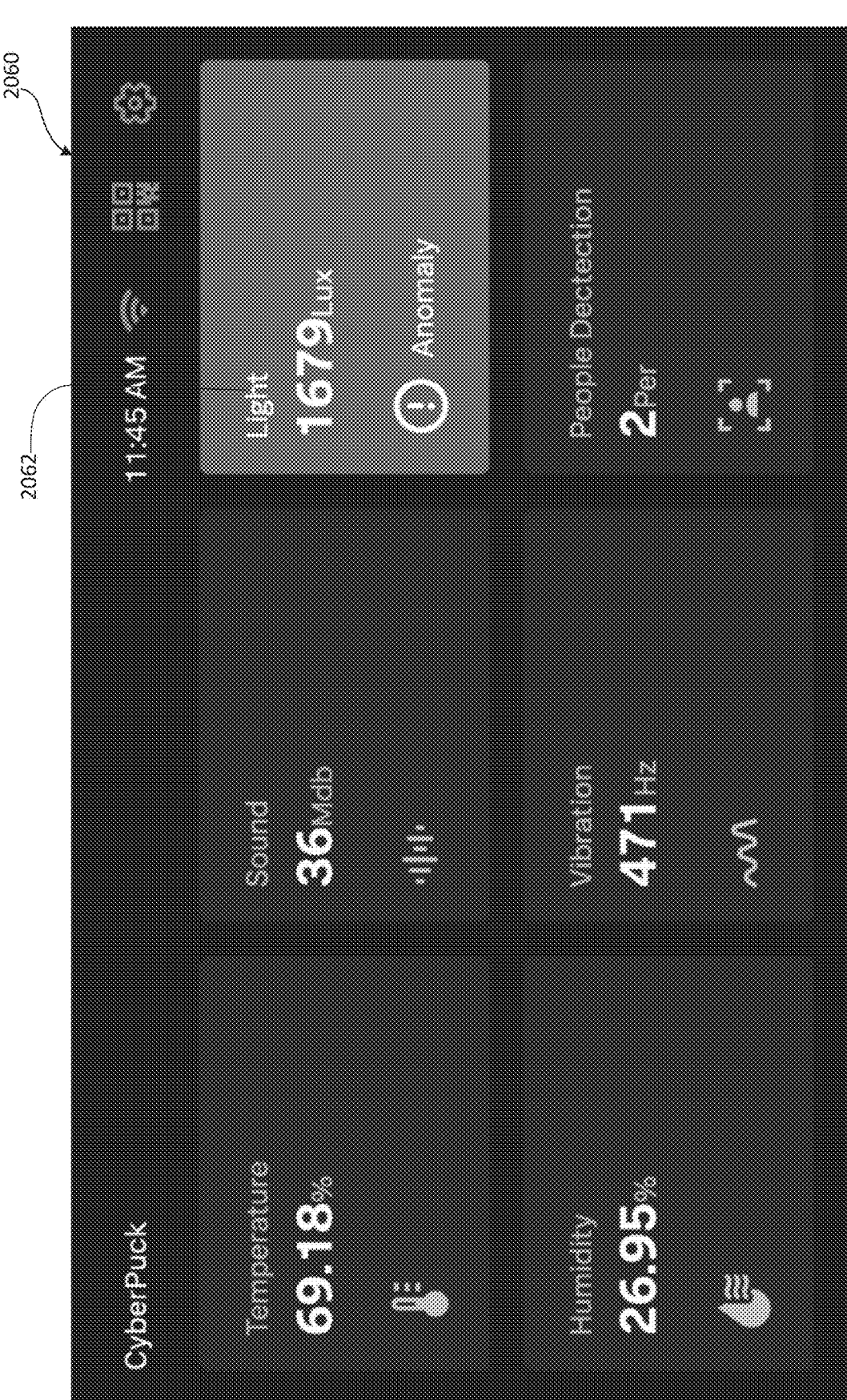
FIG. 20C illustrates the example sensor data device providing another example dashboard displaying a detected anomaly within the data processing environment of FIG. 9, in accordance with example implementations.

FIGS. 20A-20C are example user interfaces provided by the sensor data device 508. In general, a user may directly interact with the sensor data device 508 via the UI 902 displayed by the on-board display unit 904. In various embodiments, the sensor service 905 included in the sensor data device 508 may display one or more dashboards associated with the operation of one or more sensors 820. In various embodiments, a user may select specific sensors 820 that are in operation and characteristics of the sensors (e.g., frequency of measurements, frequency of reports, etc., target measurement ranges, etc.). The sensor service 905 presents the views 2000, 2030, 2060, in order to present the user with acquired sensor data, detected anomalies, alert notifications, and so forth.

As shown in FIG. 20A, the view 2000 includes a current status dashboard 2002 that includes a sensor data device name 2012, and sensor visualizations 2014, 2016, 2018, 2020, 2022. The sensor visualizations include a temperature visualization 2014, a humidity visualization 2016, a vibration visualization 2018, a sound visualization 2020, and a light visualization 2022. In various embodiments, a user may turn on or off specific sensors 820 (e.g., a temperature sensor, humidity sensor, microphone, etc.) in order to acquire sensor data associated with a physical device operating within a given environment. In such instances, the sensor service may display information relating to the acquired sensor data via one or more dashboards 2002.

As shown in FIG. 20B, the view 2030 includes a different status dashboard that includes a different set of sensor visualizations 2032, 2034, 2036, 2038, 2042. The sensor visualizations include a temperature visualization 2032, a sound visualization 2034, a light visualization 2036, a humidity visualization 2038, a vibration visualization 2040, and a person detection visualization 2042. In various embodiments, the sensor service 922 may employ one or more ML models 818 in order to process sensor data and provide information related to the processed sensor data. For example, the sensor service 902 could input image data, video data, sound data, etc., into a ML detection model 818 that identifies people within an environment within a proximity of the sensor data device 508. In such instances, the sensor service may present the output of the ML detection model 818 (e.g., people detected) as a value in the person detection visualization 2042.

As shown in FIG. 20C, the view 2060 modifies the status dashboard to display an anomaly notification visualization 2062. In various embodiments, the sensor service 922 may modify the display of a given visualization upon detecting an anomaly. In some embodiments, the sensor service 922 may employ simple if-then logic (e.g., outside of a specific threshold value or threshold range) in order to detect an anomaly. Additionally or alternatively, the sensor service 922 may input sensor data into one or more ML models (e.g., an ML model 818) included in the sensor data device 508 or included in another device in order to detect anomalies. In instances where other devices detect an anomaly (e.g., a hub device 504), the sensor data device 508 may receive a message indicating the anomaly and may update the corresponding visualization (e.g., visualization 2036) to display the anomaly visualization 2062.

Figure 21:
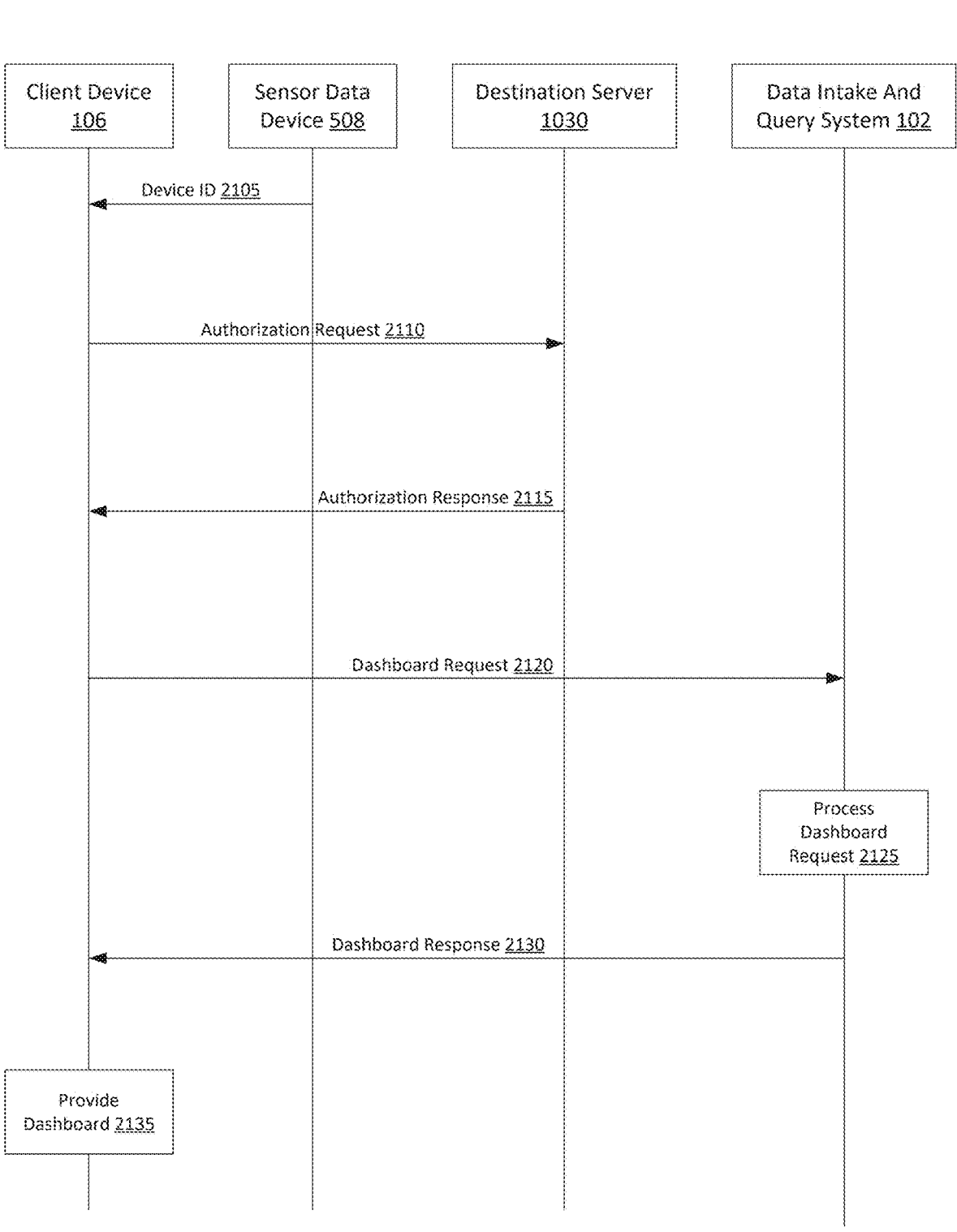
FIG. 21 illustrates a call flow diagram showing interactions between various components of the example data processing environment of FIG. 9 when a client device receives data associated with a sensor data device, in accordance with example implementations.

FIG. 21 illustrates a call flow diagram 2100 showing interactions between various components of the example data processing environment 900 of FIG. 9 when a client device 106 receives data associated with a sensor data device 508, in accordance with example implementations. One or more components of data processing environment 900 may perform various operations, including registration of a sensor data devices 508 with specific remote applications 942 and/or specific dashboards via the data intake and query system 102, and retrieval of data associated with the sensor data device 508.

The client device 106 acquires a device ID 2105 from the sensor data device 508. In some embodiments, the sensor data device 508 may transmit a signal, such as a beacon signal, that includes the device ID 2105. In some embodiments, the client device 106 acquires the device ID 2015 by scanning an image (e.g., an alphanumerical text string, a barcode, a QR code, etc.) in which the device ID 2105 is encoded. In some embodiments, the client device 106 may acquire multiple distinct device IDs 2105 from multiple sensor data devices 508. In various embodiments, the client device 106 may be restricted to acquiring the device ID 2105 when in a location proximal to the sensor data device 508.

Upon the client device 106 acquiring the device ID 2105 from the sensor data device 508, the client device 106 sends an authorization request 2110 to the destination server 1030. In various embodiments, the client device 106 acquires the device ID 2105 and may send the authorization request 2110 to the destination server 1030, where the authorization request 2110 includes the device ID 2105. In some embodiments, the client device 106 may send an aggregated authorization request 2110. In such instances, the aggregated authorization request 2110 may include multiple device IDs 2105 (e.g., 2105(1), 2105(2), etc.) that are associated with distinct sensor data devices 508.

The destination server 1030 sends, to the client device 106, an authorization response message 2130 that includes security credentials linked to the sensor data device 508. In some embodiments, the destination server 1030 may send a message that includes security credentials, as well as a deep link that enables the client device 106 to directly connect to the endpoint (e.g., dashboard and/or connected application) that is linked to the sensor data device 508. In some embodiments, the security credentials have a specific TTL value that limits the duration that the security credentials are valid. In such instances, the client device 106 may access data associated with the sensor data device 508 only when possessing security credentials with valid TTL values.

The client device 106 sends a dashboard request 2120 to the data intake and query system 102. In some embodiments, the client device 106 may send the dashboard request 2120 to retrieve the dashboard linked to the sensor data device 508. In some embodiments, the client device 106 generates the dashboard request 2120 by performing a deep link action on the deep link provided in the authorization response 2115. Additionally or alternatively, the dashboard request 2120 may include the dashboard identifier of the dashboard linked to the sensor data device 508.

The data intake and query system 102 performs actions 2125 to process the dashboard request 2120. In some embodiments, the data intake and query system 102 responds to a dashboard request 2120 by identifying the applicable dashboard and generating a dashboard that includes the visualizations, and data sets that include data extracted from a field-searchable data store (e.g., the data store 944).

Upon processing dashboard request, the data intake and query system 102 sends a dashboard response 2130 to the client device 106. In various embodiments, the dashboard response 2130 includes the dashboard linked to the sensor data device 508. In some embodiments, the dashboard included in the dashboard response 2130 includes a data set associated with the sensor data device 508, where the data set was retrieved by extracting field values from a data store. In some embodiments, the client device 106 may receive the sensor data 2140 directly from the sensor data device 508.

The client device 106 performs actions 2135 to provide the dashboard. In various embodiments, the data visualization application 1012 may generate a visualization that includes data values received in dashboard response. In various embodiments, the client device 106 may receive updated data values associated with the dashboard. In some embodiments, the client device 106 may receive additional sensor data 2140 directly from the sensor data device 508. In some embodiments, the client device 106 may send subsequent requests (where each request includes valid security credentials) to the data intake and query system 102 in order to receive a data set that includes field values for the dashboard. In such instances, the data intake and query system 102 may respond by transmitting a data response that includes the new data values that are applicable to the subsequent requests. Upon receiving new the additional data values, the client device 106 may update the dashboard.

FIGS. 22A-22H are example user interfaces for reconfiguring a sensor data device 508 via a client device 106. In general, the sensor management device 934 included in the client device 106 configures the operation and/or other characteristics of the sensor data device 508 by sending commands that cause modifications to one or more services operating on the sensor data device 508. The sensor management application 1010 presents the views 2200, 2210, 2220, 2230, 2240, 2250, 2260, 2280, in order to enable a user to remotely modify characteristics of the sensor data device 508.

Figure 22A:
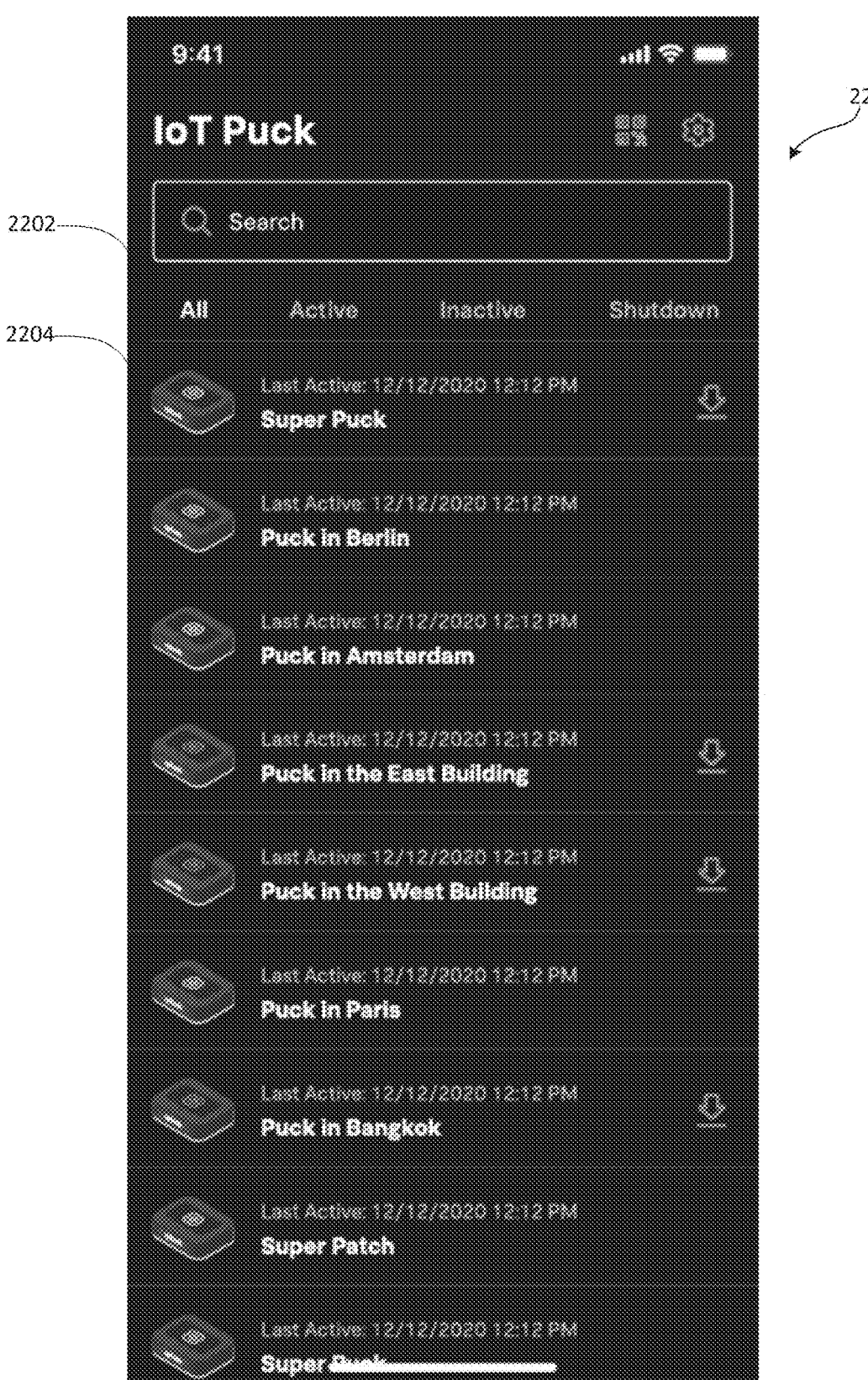
FIG. 22A illustrates a menu of available sensor data devices within the data processing environment of FIG. 9, in accordance with example implementations.

As shown in FIG. 22A, the view 2200 shows a list of available sensor data devices 508. In various embodiments, the sensor management application may present the view 2200 that includes a list of available sensor data devices 508 to which the client device 106 can connect. The view 2200 includes a menu 2202 of device lists (e.g., all devices, active devices, inactive devices), and a contextual list 2206 of the applicable sensor data devices 508. For example, a user may select the "all devices" list in order to view the contextual list of all available sensor data devices 508. In various embodiments, a user may select an icon of a specific sensor data device 508 in order to view characteristics of the specific sensor data device 508 and reconfigure one or more characteristics. Upon detecting a user selection of a specific sensor data device 508, the sensor management application 1010 may present the view 2210.

Figure 22B:
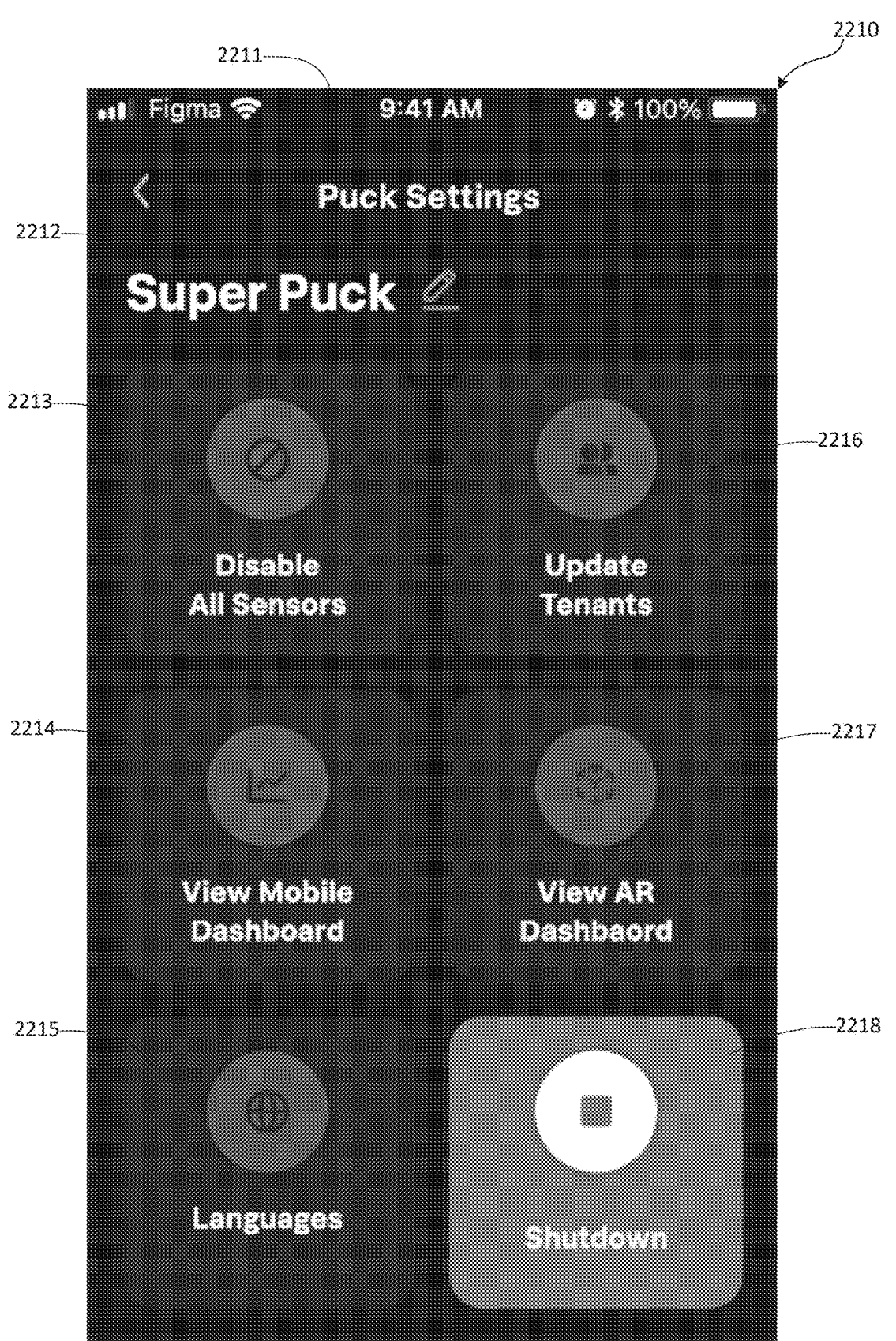
FIG. 22B illustrates a menu of configurable settings for a sensor data device within the data processing environment of FIG. 9, in accordance with example implementations.

As shown in FIG. 22B, the view 2210 shows a set of configurable setting associated with the selected sensor data device 508. The settings 2211 includes selectable icons, including a sensor data device name icon 2212, a disable all sensors icon 2213, view dashboard icon 2214, language selection icon 2215, update tenants icon 2216, view AR dashboards icon 2217, and shutdown icon 2218. In various embodiments, detection of one of icons 2211-2218 may cause the sensor management application 1010 to present a contextual menu.

Figure 22C:
FIG. 22C illustrates a menu for configuring a name for the sensor data device within the data processing environment of FIG. 9, in accordance with example implementations.
Figure 22D:
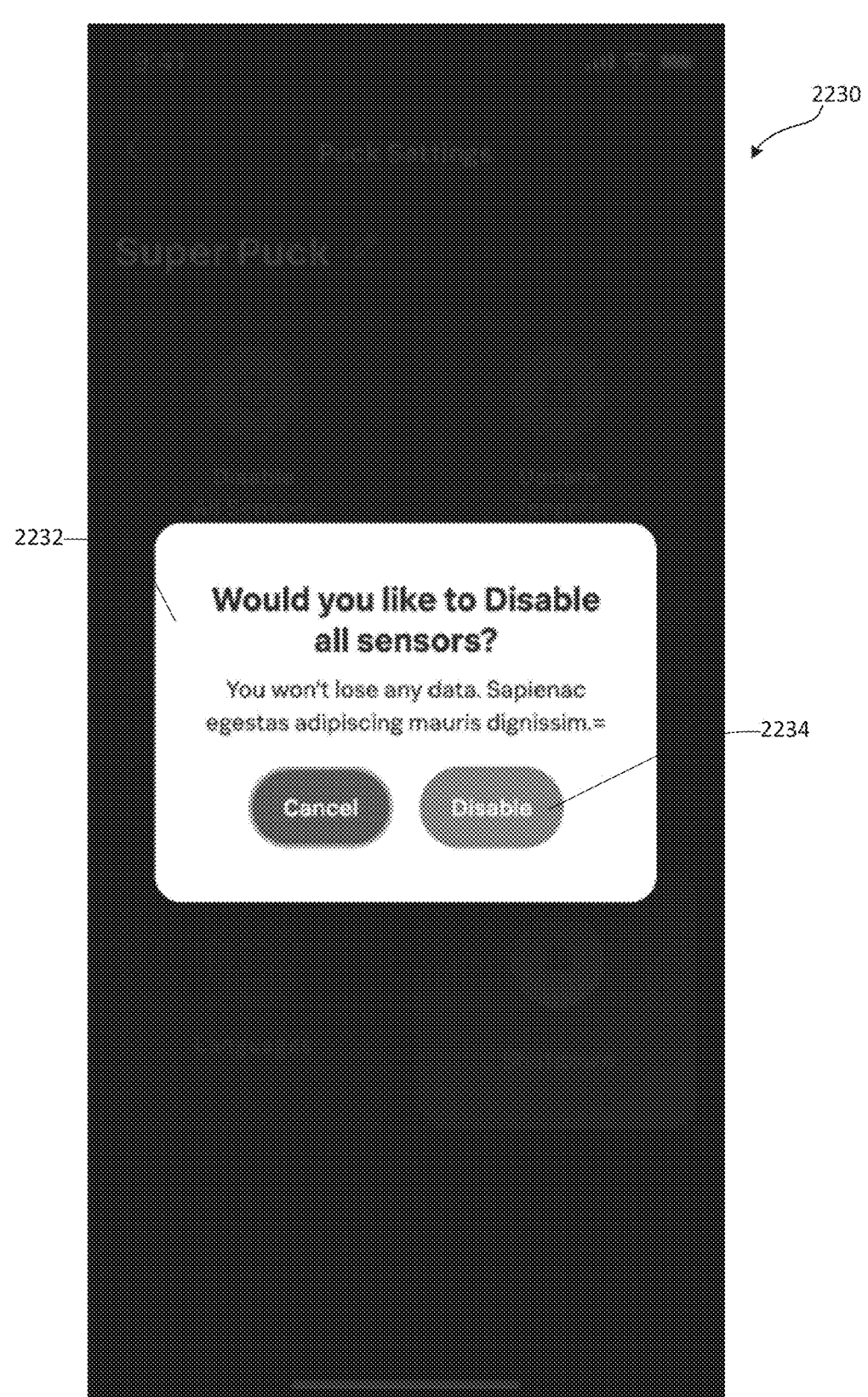
FIG. 22D illustrates a menu for disabling sensors associated with the sensor data device within the data processing environment of FIG. 9, in accordance with example implementations.
Figure 22E:
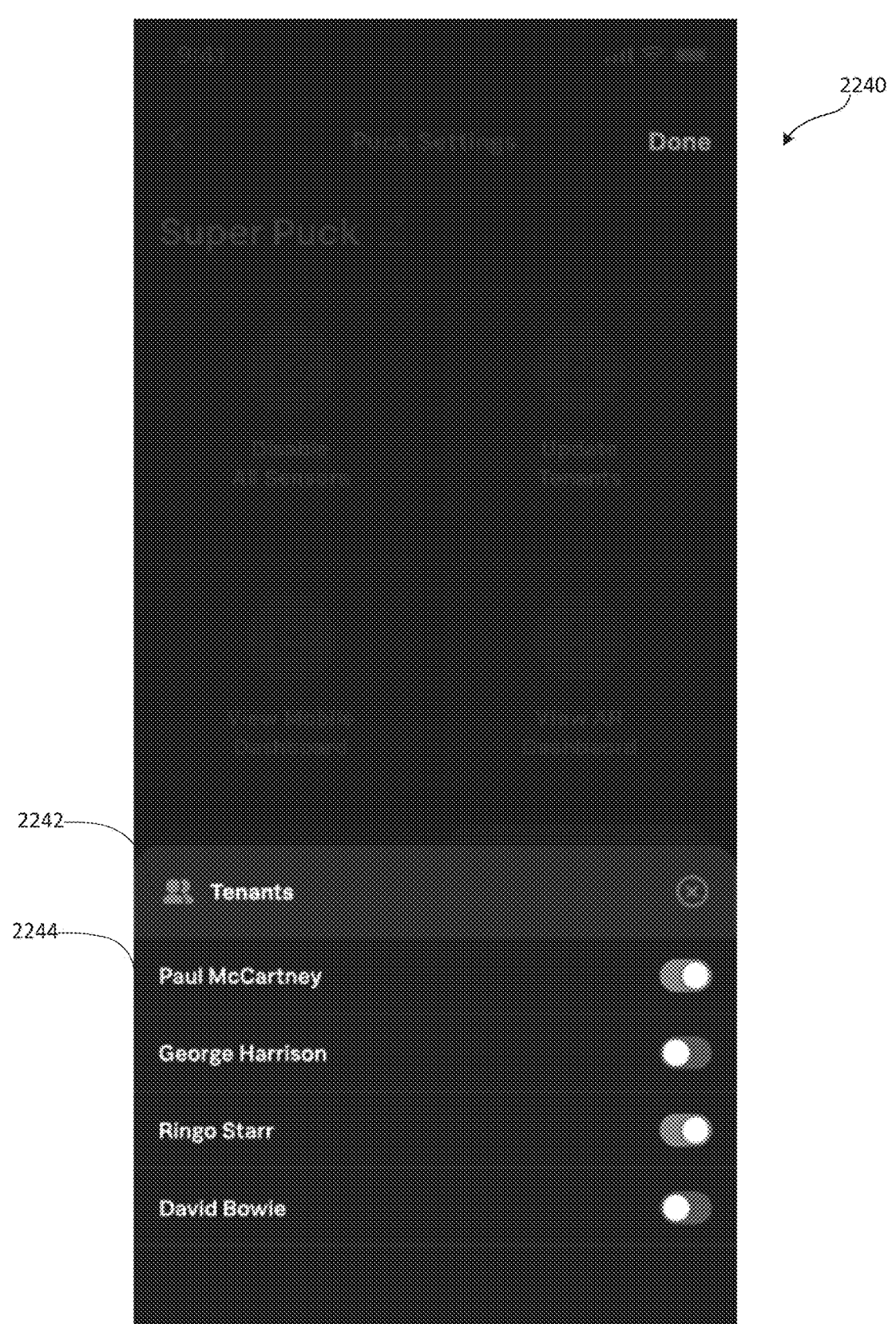
FIG. 22E illustrates a menu for configuring subscribers to the sensor data device within the data processing environment of FIG. 9, in accordance with example implementations.
Figure 22F:
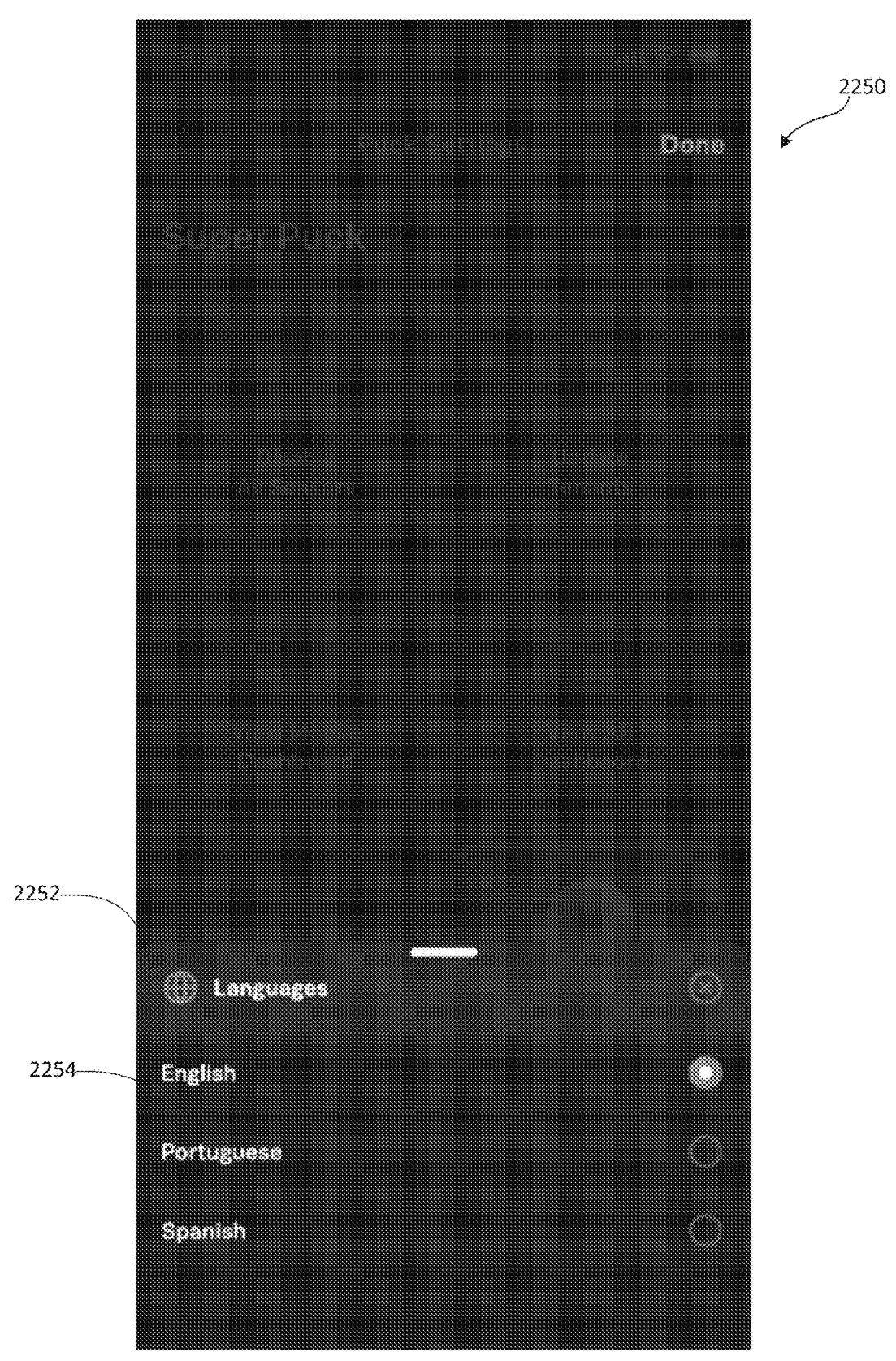
FIG. 22F illustrates a menu for selecting a language to be displayed by the sensor data device within the data processing environment of FIG. 9, in accordance with example implementations.

As shown in FIG. 22C, the view 2220 displays a sensor name contextual menu that includes a field 2222 that modifies the name of the specific sensor data device 508. As shown in FIG. 22D, the view 2230 displays a disable all sensors notification screen 2232 that includes a selectable icon 2234 that enables the user to disable all sensors 820 included and/or connected to the sensor data device 508. As shown in FIG. 22E, the view 2240 displays a selected tenants contextual menu 2242 that includes separate fields 2244 for each tenant available for selection. In such instances, the user may select one or more tenants that subscribe to sensor data published by the specific sensor data device 508. As shown in FIG. 22F, the view 2250 displays a language contextual menu 2252 that includes fields 2254 that enable the user to select a specific language that the specific sensor data device 508 uses when displaying information.

Figure 22G:
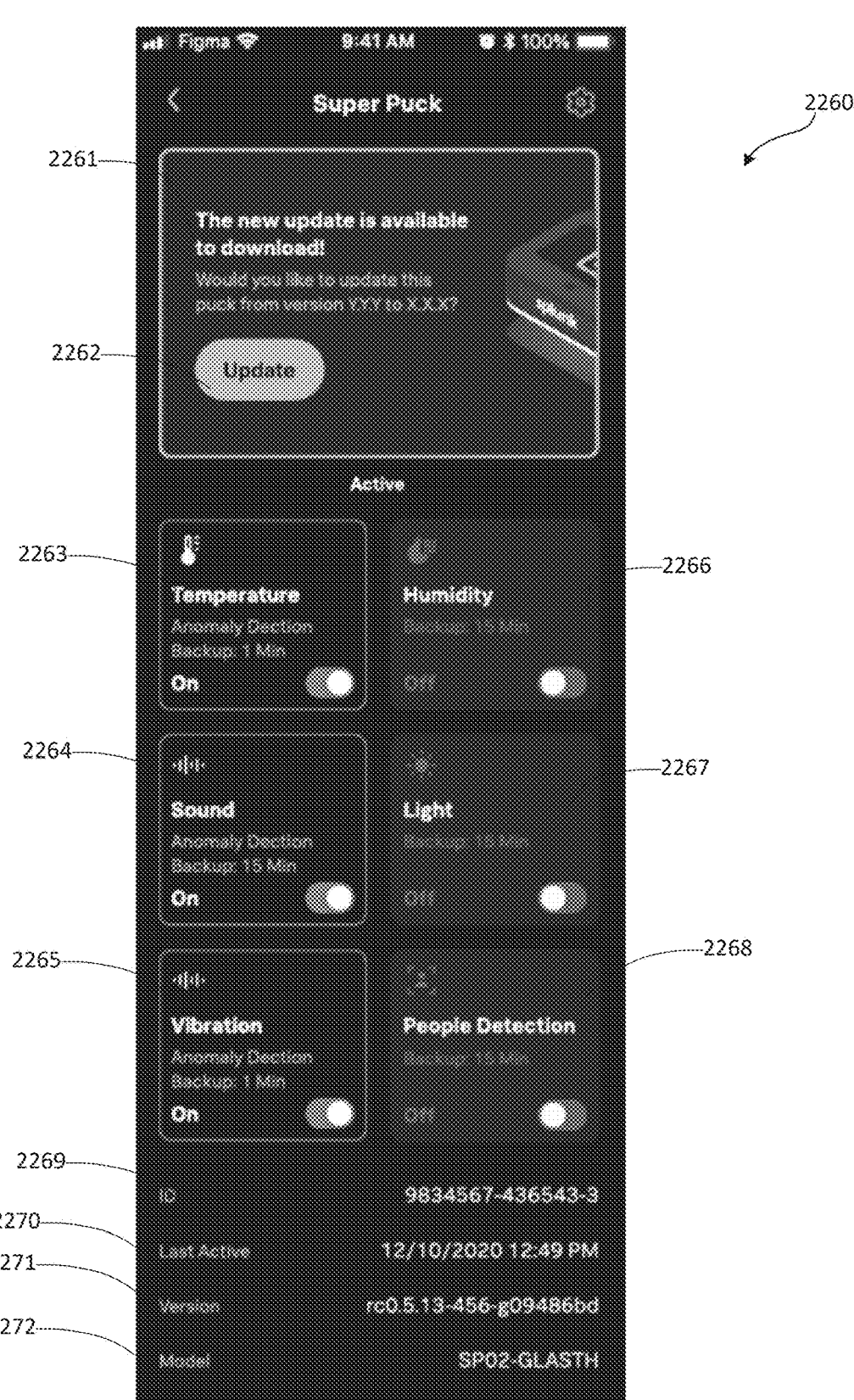
FIG. 22G illustrates another example menu of configurable settings for the sensor data device within the data processing environment of FIG. 9, in accordance with example implementations.

As shown in FIG. 22G, the view 2260 shows a different dashboard that includes specific controls for updating the sensor data device 508, controls for individual sensors 820, and information about the sensor data device 508. The view 2260 includes an update notification visualization 2261 that includes a selectable icon 2262 that causes the sensor data device 508 to receive a software update. The view 2260 also includes a set of controls 2263-2268 to turn on or off specific sensors 820, including a temperate sensor control 2263, a sound sensor control 2264, a vibration sensor control 2265, a humidity sensor control 2266, a light sensor control 2267, and a person detection control 2268.

The view further includes other information about the sensor data device 508, including an identification field 2269 that includes the device ID 1106, a last active field 2270 that indicates the most recent time that the sensor data device 508 was active, a version field 2271 that indicates the software version installed on the sensor data device 508, and a model field 2272 that identifies the model number of the sensor data device 508.

Figure 22H:
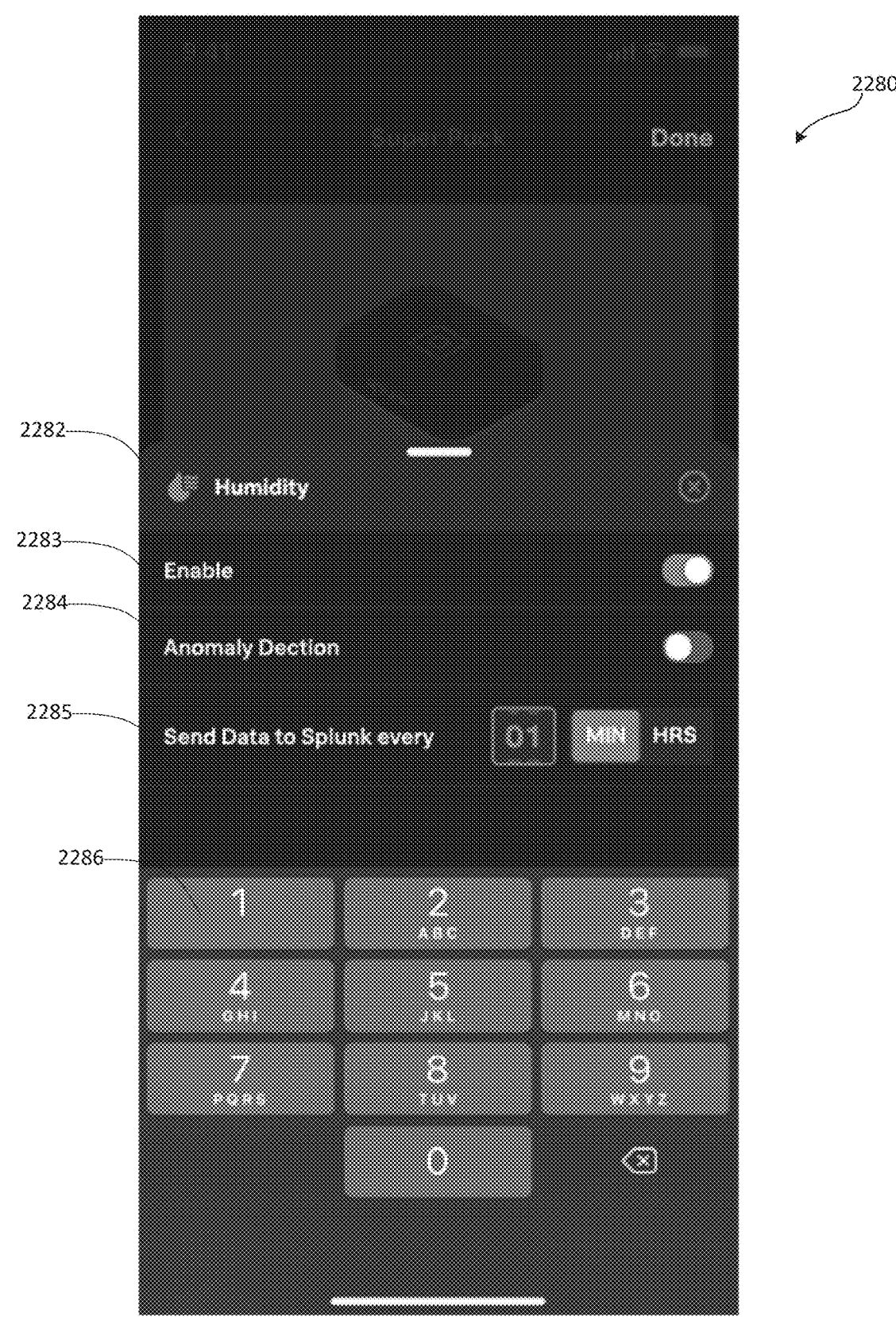
FIG. 22H illustrates an example menu for configuring settings for a sensor associated with the sensor data device within the data processing environment of FIG. 9, in accordance with example implementations.

As shown in FIG. 22H, the view 2280 displays a contextual menu for a specific sensor 820. In various embodiments, one or more of the set of controls 2263-2268 may trigger the sensor management application 1010 to display a contextual menu that provides configurable settings for a specific sensor 820 that is included in, or is attached to, the sensor data device 508. For example, the view 2280 displays a contextual menu 2282 for a humidity sensor that includes separate controls 2283-2285. The enable control 2283 specifies whether the humidity sensor should be on and operational. The anomaly detection control 2284 specifies whether the sensor data device 508 is to track anomalies associated with specific humidity measurements. The publishing control 2285 specifies the frequency of occurrences that the sensor data device 508 publishes sensor data that is received by subscribing devices (e.g., remote application 942). In various embodiments, the sensor management application 1010 provides a contextual input 2286 to specify a numerical value for the publishing control 2285.

FIGS. 23A-23E are example user interfaces provided by the sensor data device 508. In general, a user may directly interact with the sensor data device 508 via the UI 902 displayed by the on-board display unit 904. In various embodiments, the sensor monitoring service 906 included in the sensor data device 508 may display one or more dashboards associated with the characteristics and settings of the sensor data device 508. In various embodiments, a user may provide inputs that modify the operation and characteristics of the sensor data device 508. The sensor monitoring service 906 presents the views 2300, 2320, 2340, 2360, 2380 in order to present the user with characteristics and controls for the sensor data device 508.

Figure 23A:
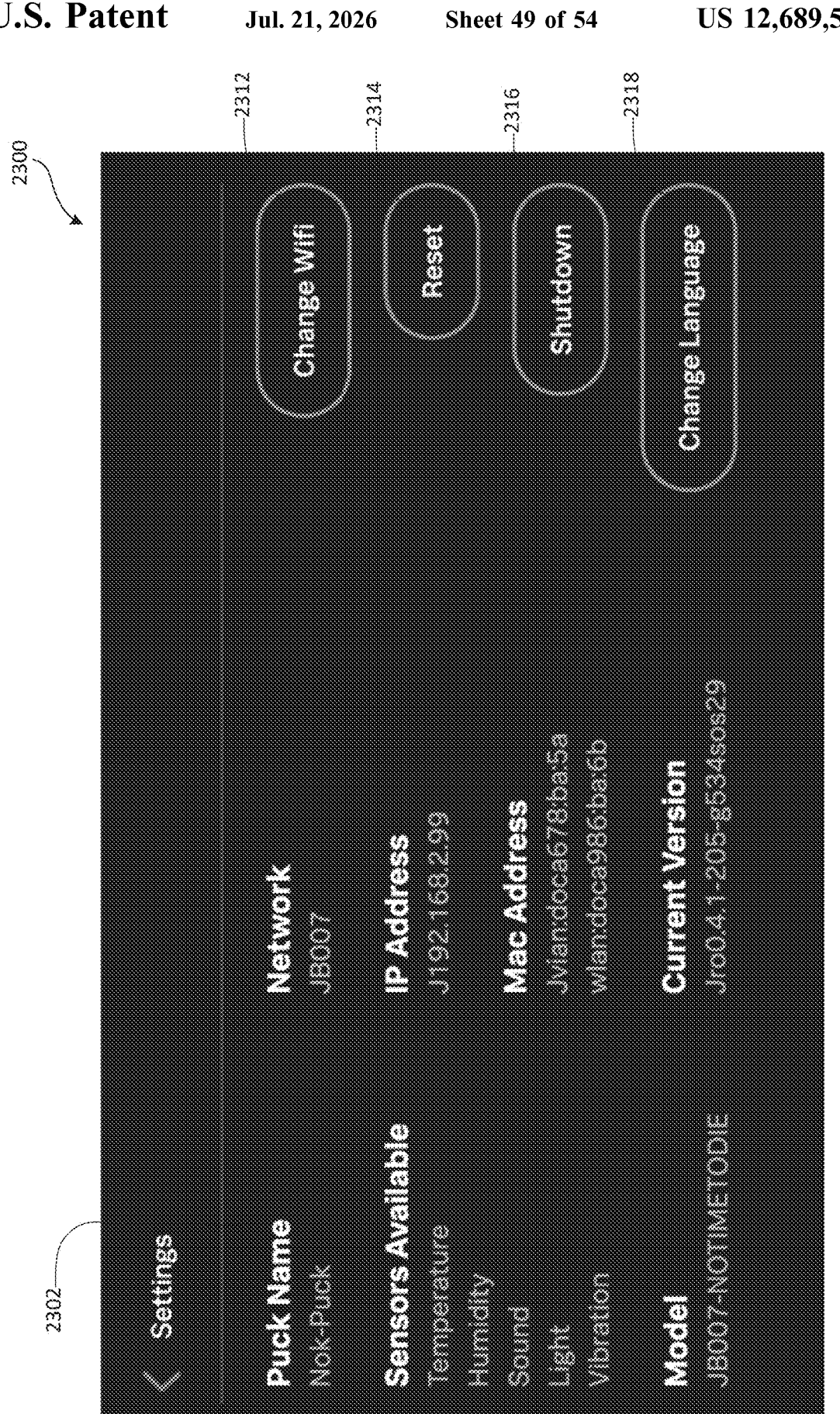
FIG. 23A illustrates an example menu of configurable settings associated with a sensor data device within the data processing environment of FIG. 9, in accordance with example implementations.

As shown in FIG. 23A, the view 2300 displays a set of settings for the sensor data device 508. In various embodiments, the settings screen may display the name of the sensor data device 508, a list of available sensor types, a model name, addresses, and software version. In various embodiments, the settings screen may include a set of selectable icons 2312-2318 that enable the user to modify specific characteristics of the sensor data device 508. For example, the selectable icons could include a change network icon 2312, a reset device icon 2314, a shutdown icon 2316, and a change language icon 2318.

Figure 23B:
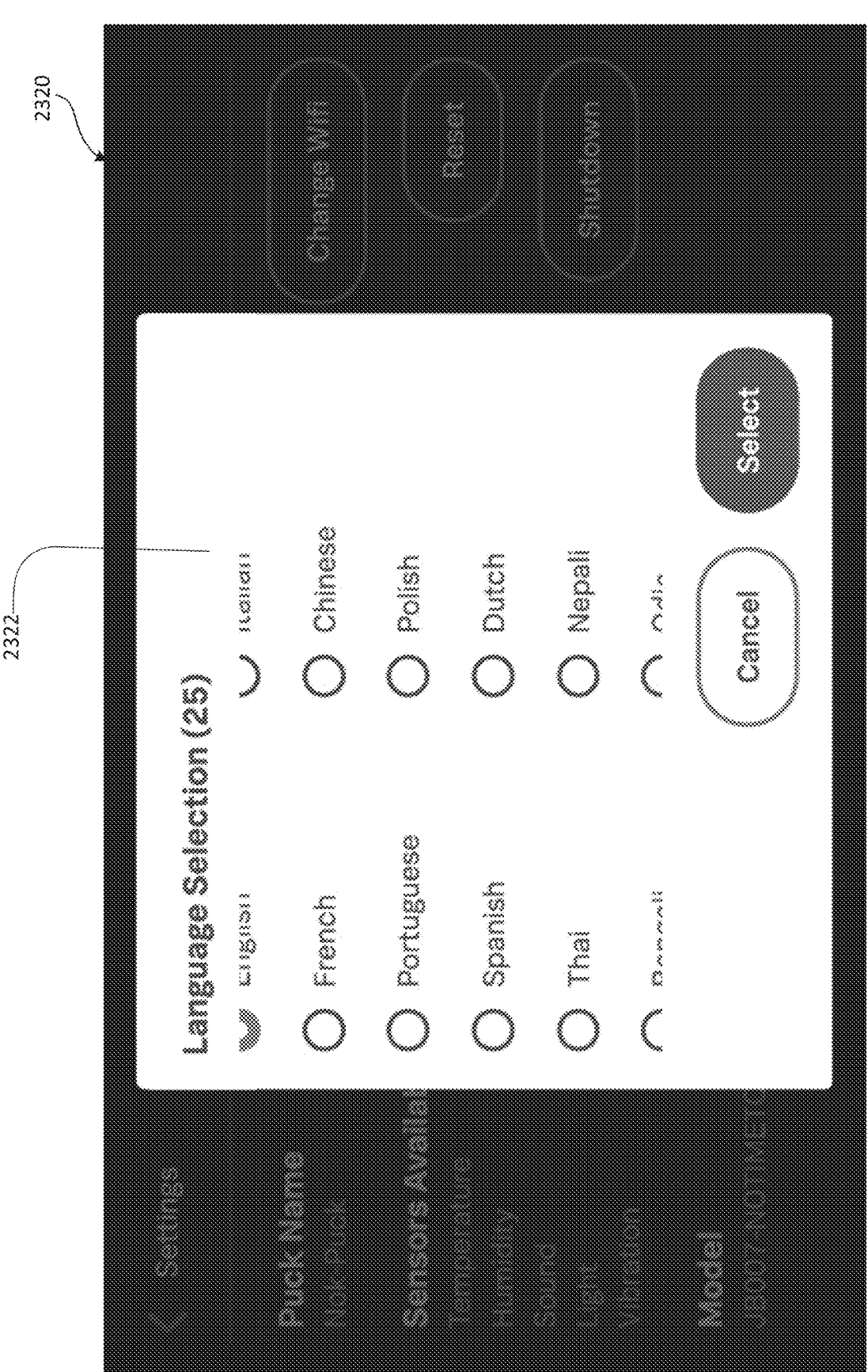
FIG. 23B illustrates an example menu for selecting a language to be displayed by the sensor data device within the data processing environment of FIG. 9, in accordance with example implementations.
Figure 23C:
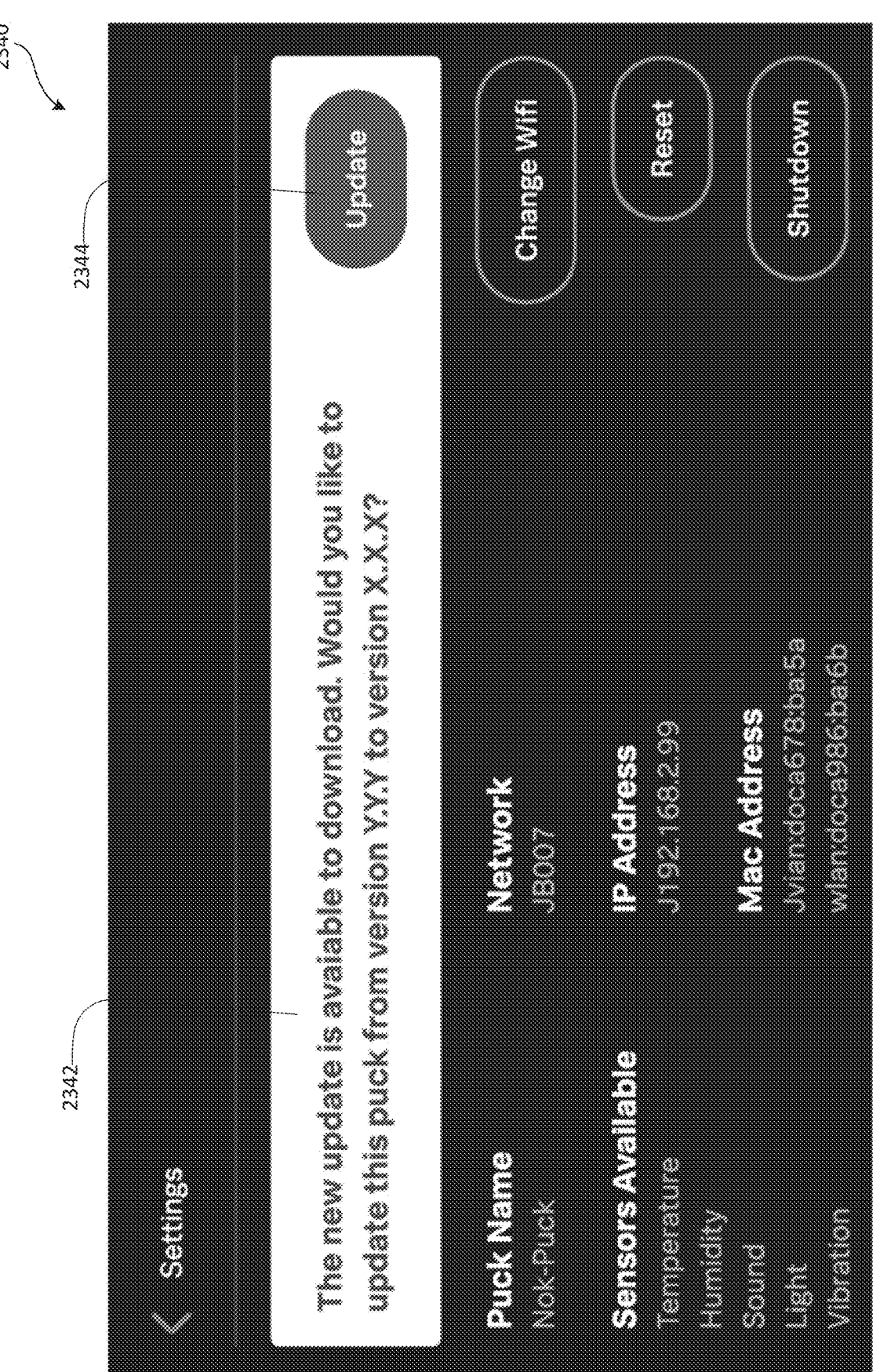
FIG. 23C illustrates another example menu of configurable settings associated with the sensor data device within the data processing environment of FIG. 9, in accordance with example implementations.
Figure 23D:
FIG. 23D illustrates a notification screen indicating progress of an update to the sensor data device within the data processing environment of FIG. 9, in accordance with example implementations.
Figure 23E:
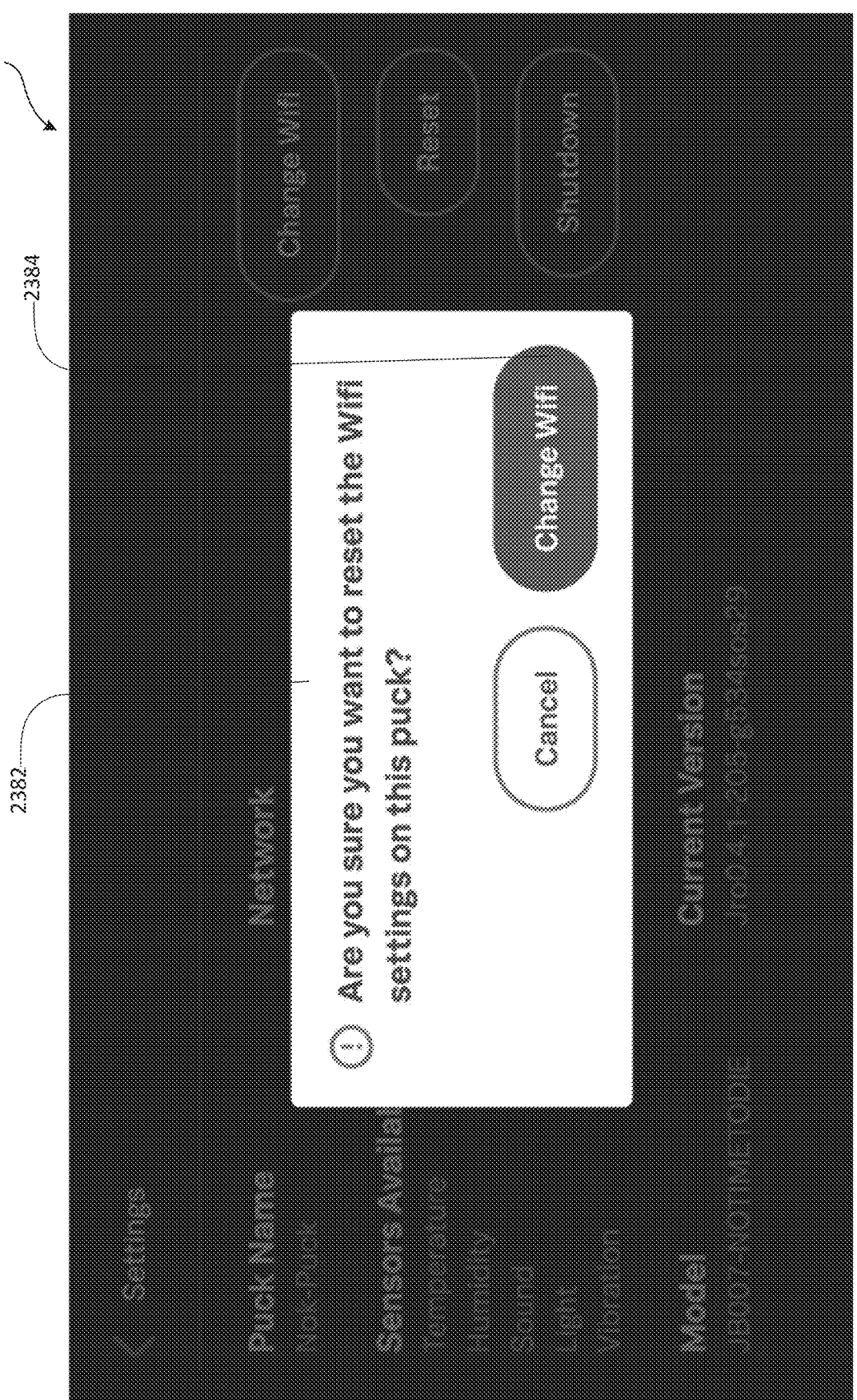
FIG. 23E illustrates a menu for resetting settings for the sensor data device within the data processing environment of FIG. 9, in accordance with example implementation.

As shown in FIG. 23B, the view 2320 displays a language contextual menu 2322 that includes controls that enable the user to select a specific language that the sensor data device 508 uses when displaying information. As shown in FIG. 23C, the view 2340 displays an update notification visualization 2342 that includes a selectable icon 2344 that causes the sensor data device 508 to receive a software update. As shown in FIG. 23D, the view 2360 displays an update screen that displays a progress bar indicating the status of applying a software update. As shown in FIG. 23E, the view 2380 displays a reset device icon 2314 that displays a contextual menu 2382 prompting the user to confirm a reset to the network settings via selectable icon 2384.

Figure 24:
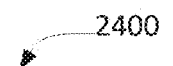
FIG. 24 sets forth a flow diagram of method steps for publishing acquired sensor data via an onboard message bus, in accordance with example implementations.
Figure 24:
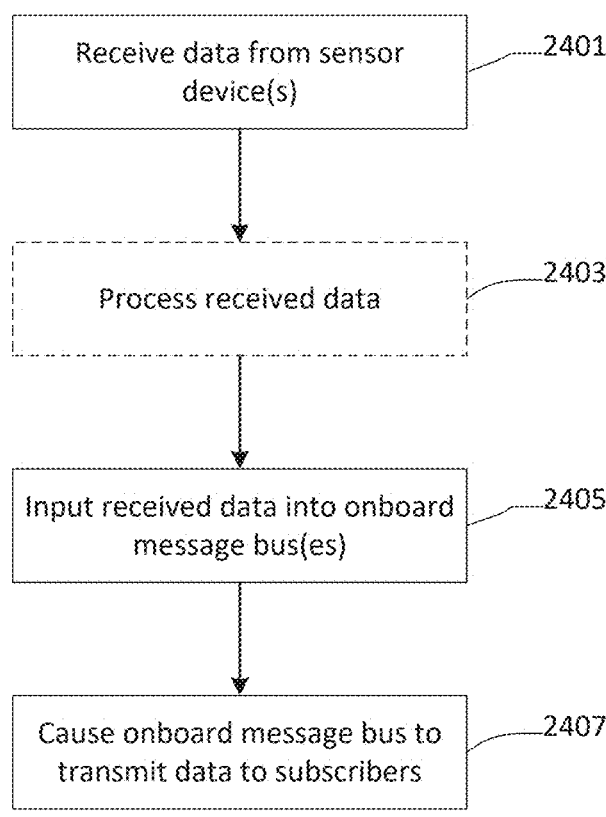

FIG. 24 sets forth a flow diagram of method steps for publishing acquired sensor data via an onboard message bus, in accordance with example implementations. Although the method steps are described in conjunction with FIGS. 1-23E, persons of ordinary skill in the art will understand that any system configured to perform this method and/or other methods described herein, in any order, and in any combination not logically contradicted, is within the scope of the present invention.

As shown by method 2400, at step 2401, the sensor data device 508 receives data from one or more sensor devices 820. In various embodiments, the sensor service 905 included in the sensor data device 508 manages one or more internal sensors and/or connected external sensors that acquire sensor data associated with a physical device 1004 operating within an environment. In some embodiments, the sensor data device 508 receives sensor data from each of the respective sensors at different rates (e.g., receiving temperature sensor data every 10 minutes, receiving humidity sensor data every 30 minutes, etc.).

At step 2403, the sensor data device 508 optionally processes the received data. In some embodiments, the sensor service 905 may process the incoming sensor data that was transmitted by the one or more sensors 820. In some embodiments, the sensor service 902 may process the sensor data by performing simple operations (e.g., threshold comparison, if-then conditionals, etc.). In some embodiments, the sensor service 902 may process sensor data by inputting the sensor data into one or more ML models 818 that perform various forms of filtering, estimation for frequency of an event or occurrence, anomaly detection, quantile classification, and so forth.

At step 2405, the sensor data device 508 inputs the received data into an onboard message bus 816. In various embodiments the sensor service 902 may publish the received data by inputting the received data into an onboard message bus 816. In some embodiments, when the sensor service 902 processes the received data, the sensor service 902 may publish the output data by transmitting the output data into the onboard message bus 816. In some embodiments, the sensor service 905 may manage when data is sent to subscribers. In such instances, the sensor service 905 may schedule when the sensor data device 508 inputs the data into the onboard message bus 816. Additionally or alternatively, the sensor service 902 may publish data to multiple onboard message buses (e.g., 816(1), 816(2) my inputting copies of a given data set, corresponding to the received data, into each of the respective onboard message buses 816(1), 816(2).

At step 2407, the sensor data device 508 causes the onboard message bus 816 to transmit the data to subscribers. In various embodiments, the sensor data device 508 causes the onboard message bus 816 to transmit the data to one or more subscribers to the onboard message bus 508. In some embodiments, the onboard message bus 816 may form a data stream with the one or more subscribers and may continually transmit separate data sets from the sensor data device 508 to the one or more subscribers. For example, a client device 106 and a remote sensor management service 940 may be registered as subscribers to a given onboard message bus 816. In such instances, the sensor data device 508 could cause the onboard message bus 508 to transmit copies of the data, included in the onboard message bus 816, to each subscriber via different data streams. In some embodiments, the data includes sensor data from two or more sensors 820 (e.g., a data set 1110 that includes temperature sensor data and humidity sensor data). In such instances, a subscriber receives sensor data that is associated with multiple sensors 820 within a given data set.

In sum, a sensor data device includes one or more sensors. The sensor data device is configured to be positioned proximate to a physical device, and the one or more sensors acquire sensor data associated with the physical device operating within a physical environment. The sensor data device receives the sensor data from the one or more sensors and input the sensor data into an onboard message bus. The onboard message bus continually transmits the sensor data from the onboard message bus to a set of subscribers via a network. In various embodiments, one or more remote devices, such as a destination server and/or a client device, are subscribers to the onboard message bus and receive data sets that the sensor data device publishes to the onboard message bus. In such instances, the remote device may ingest and/or process the sensor data and present the sensor data via one or more dashboards to a user.

At least one technological advantage of the disclosed techniques relative to prior techniques is that sensor data for different characteristics may be transmitted, processed, and stored according to a common protocol and at a common system. Another technological advantage is that publishing sensor data associated with multiple sensors enables a data processing system to efficiently monitor a complex set of measurements via a device that is proximate to the physical object that is under operation.

1. In various embodiments, a computer-implemented method comprises acquiring, using an edge sensor device, first sensor data associated with a physical device operating within a physical environment, where the edge sensor device includes a first set of sensors of a first sensor type for obtaining the first sensor data, and the edge sensor device is located proximal to the physical device, inputting, by the edge sensor device, the first sensor data into an onboard message bus to publish the first sensor data, where a processing device of the edge sensor device maintains the onboard message bus, and upon receipt of the first sensor data, transmitting, by the onboard message bus, the first sensor data onto a network, where the first sensor data is addressed to a first set of one or more subscribers of the onboard message bus, and the one or more subscribers includes a remote server computing system.

2. The computer-implemented method of clause 1, where the remote server computer system associates the first sensor data with the physical device.

3. The computer-implemented method of clause 1 or 2, further comprising associating the first sensor data to one or more attributes of a dashboard that is associated with the physical device operating within the physical environment.

4. The computer-implemented method of any of clauses 1, further comprising acquiring, using the edge sensor device, second sensor data associated with the physical device operating within the physical environment, where the edge sensor device includes a second set of sensors of a second sensor type for obtaining the second sensor data, and inputting, by the edge sensor device, the second sensor data into the onboard message bus to publish the second sensor data.

5. The computer-implemented method of any of clauses 1-4, where the first set of sensors acquire data at a first acquisition rate, the second set of sensors acquire data at a second acquisition rate, and the first acquisition rate is higher than the second acquisition rate.

6. The computer-implemented method of any of clauses 1-5, further comprising obtaining, by the edge sensor device, information about the first sensor data, where the edge sensor device inputs the first sensor data into a data model to obtain the information about the first sensor data.

7. The computer-implemented method of any of clauses 1-6, further comprising inputting, by the edge sensor device, the first sensor data into a data model to obtain enriched sensor data, inputting the enriched sensor data into a second onboard message bus, and upon receipt of the enriched sensor data, transmitting, by the second onboard message bus, the enriched sensor data onto the network, where the enriched sensor data is addressed to a second set of one or more subscribers of the second onboard message bus, and the second set of one or more subscribers includes the remote server computing system.

8. The method of any of clauses 1-7, where the onboard message bus transmits data in a data stream, and each message in the data stream includes a discrete amount of data.

9. In various embodiments, an edge sensor device, comprises a memory storing one or more instructions, and a processor for executing the one or more instructions to acquire first sensor data associated with a physical device operating within a physical environment, where the edge sensor device includes a first set of sensors of a first sensor type for obtaining the first sensor data, and where the edge sensor device is located proximal to the physical device, input the first sensor data into an onboard message bus to publish the first sensor data, where the processor maintains the onboard message bus, and upon receipt of the first sensor data, transmitting, by the onboard message bus, the first sensor data onto a network, where the first sensor data is addressed to a first set of one or more subscribers of the onboard message bus, and where the one or more subscribers includes a remote server computing system.

10. The edge sensor device of clause 9, where the remote server computer system associates the first sensor data with the physical device.

11. The edge sensor device of clause 9 or 10, where the processor further executes the one or more instructions to associate the first sensor data to one or more attributes of a dashboard that is associated with the physical device operating within the physical environment.

12. The edge sensor device of any of clauses 9-11, where the processor further executes the one or more instructions to acquire second sensor data associated with the physical device operating within the physical environment, where the edge sensor device includes a second set of sensors of a second sensor type for obtaining the second sensor data, and inputs the second sensor data into the onboard message bus to publish the second sensor data.

13. The edge sensor device of any of clauses 9-12, where the first set of sensors acquire data at a first acquisition rate, the second set of sensors acquire data at a second acquisition rate, and the first acquisition rate is higher than the second acquisition rate.

14. The edge sensor device of any of clauses 9-13, where the processor further executes the one or more instructions to obtain information about the first sensor data, where the edge sensor device inputs the first sensor data into a data model to obtain the information about the first sensor data.

15. The edge sensor device of any of clauses 9-14, where the processor further executes the one or more instructions to input the first sensor data into a data model to obtain enriched sensor data, input the enriched sensor data into a second onboard message bus, and upon receipt of the enriched sensor data, transmit, by the second onboard message bus, the enriched sensor data onto the network, where the enriched sensor data is addressed to a second set of one or more subscribers of the second onboard message bus, and where the second set of one or more subscribers includes the remote server computing system.

16. In various embodiments, an edge sensor device comprises a first set of sensors of a first sensor type that acquire first sensor data associated with a physical device operating within a physical environment, one or more connectors for positioning the edge sensor device proximal to the physical device, a network interface, a memory that stores a sensor service, and a processor coupled to the memory that executes the sensor service to receive the first sensor data, maintain a message bus for receiving the first sensor data, and transmit, using the network interface, sensor data from the message bus onto a network for receipt by one or more subscribers of the message bus, the one or more subscribers including a remote server computer system.

17. The edge sensor device of clause 16, where the remote server computer system associates the first sensor data and second sensor data with the physical device.

18. The edge sensor device of clause 16 or 17, further comprising a display device that displays an onboard dashboard that includes a first visualization that displays data values associated with the first sensor data.

19. The edge sensor device of any of clauses 16-18, where the one or more connectors magnetically couple a portion of the edge sensor device to the physical device.

20. The edge sensor device of any of clauses 16-19, where the first sensor type comprises at least one of: a vibration sensor, a visual sensor, a temperature sensor, a humidity sensor, a sound sensor, a gyroscope, a pressure sensor, or an accelerometer.

21. The edge sensor device of any of clauses 16-20, further comprising a second set of sensors of a second sensor type that acquire second sensor data associated with the physical device operating within the physical environment, where the processor further executes the sensor service to inputs the second sensor data into the message bus to publish the second sensor data.

22. The edge sensor device of any of claims 16-20, wherein the network interface further receives a set of network data from the physical device over a network connection, and the process further executes the sensor service to input the network data into the message bus.

7.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method comprising:
   receiving, by a server, a device identifier associated with a sensor data device, the device identifier being received from a client device that acquires the device identifier from the sensor data device;

in response to determining that the sensor data device is not linked to a respective dashboard, transmitting, by the server to the client device, an indication that the sensor data device is unregistered;
receiving, by the server from the client device, an indication of a dashboard to which to assign the sensor data device; and
causing, by the server, the sensor data device to be linked to the dashboard so that sensor data received from the sensor data device is presented in a user interface corresponding to the dashboard.

2. The computer-implemented method of claim 1, wherein the client device acquires the device identifier by scanning an image of the sensor data device, wherein the device identifier is embedded in the image.

3. The computer-implemented method of claim 1, wherein receiving the device identifier comprises receiving a beacon signal from the client device in which the device identifier is embedded.

4. The computer-implemented method of claim 2, further comprising transmitting, by the server, at least one authentication credential to the sensor data device, the at least one authentication credential authenticating the sensor data device with another device in proximity to the sensor data device.

5. The computer-implemented method of claim 4, further comprising receiving, by the server, the at least one authentication credential from the another device in proximity to the sensor data device.

6. The computer-implemented method of claim 1, further comprising:
   receiving, by the server, the sensor data from the sensor data device; and
   forwarding, by the server, the sensor data to the dashboard via a message broker.

7. The computer-implemented method of claim 6, further comprising identifying, by the server, the dashboard based on the device identifier being embedded in the sensor data from the sensor data device.

8. The computer-implemented method of claim 1, wherein the sensor data comprises network traffic exchanged between a device in proximity to the sensor data device and a remote device.

9. The computer-implemented method of claim 1, further comprising:
   receiving, by the server, health data from the sensor data device, the health data comprising at least one of a power status, a network connectivity, or a status of one or more sensors in the sensor data device; and
   generating, by the server, a user interface displaying the health data.

10. The computer-implemented method of claim 1, further comprising:
   receiving, by the server, a management command to manage the sensor data device, the management command comprising a command to power cycle the sensor data device, power off the sensor data device, power on the sensor data device, or change a configuration setting in the sensor data device; and
   causing, by the server, the sensor data device to execute the management command.

11. One or more non-transitory computer-readable storage media including instructions that, when executed by one or more processors, cause the one or more processors to perform steps of:

receiving a device identifier associated with a sensor data device, the device identifier being received from a client device that acquires the device identifier from the sensor data device;

in response to determining that the sensor data device is not linked to a respective dashboard, transmitting, to the client device, an indication that the sensor data device is unregistered;

receiving, from the client device, an indication of a dashboard to which to assign the sensor data device; and causing the sensor data device to be linked to the dashboard so that sensor data received from the sensor data device is presented in a user interface corresponding to the dashboard.

12. The one or more non-transitory computer-readable storage media of claim 11, wherein the client device acquires the device identifier by scanning an image of the sensor data device, wherein the device identifier is embedded in the image.

13. The one or more non-transitory computer-readable storage media of claim 11, wherein receiving the device identifier comprises receiving a beacon signal from the client device in which the device identifier is embedded.

14. The one or more non-transitory computer-readable storage media of claim 11, wherein the steps further comprise transmitting at least one authentication credential to the sensor data device, the at least one authentication credential authenticating the sensor data device with another device in proximity to the sensor data device.

15. The one or more non-transitory computer-readable storage media of claim 14, wherein the steps further comprise receiving the at least one authentication credential from the another device in proximity to the sensor data device.

16. The one or more non-transitory computer-readable storage media of claim 11 wherein the steps further comprise:

receiving the sensor data from the sensor data device; and forwarding the sensor data to the dashboard via a message broker.

17. The one or more non-transitory computer-readable storage media of claim 16, wherein the steps further comprise identifying the dashboard based on the device identifier being embedded in the sensor data from the sensor data device.

18. The one or more non-transitory computer-readable storage media of claim 11, wherein the sensor data comprises network traffic exchanged between a device in proximity to the sensor data device and a remote device.

19. The one or more non-transitory computer-readable storage media of claim 11, wherein the steps further comprise:

receiving health data from the sensor data device, the health data comprising at least one of a power status, a network connectivity, or a status of one or more sensors in the sensor data device; and generating a user interface displaying the health data.

20. A system, comprising:

a memory that includes instructions; and a processor that is coupled to the memory and, when executing the instructions, is configured to:

receive a device identifier associated with a sensor data device, the device identifier being received from a client device that acquires the device identifier from the sensor data device;

in response to determining that the sensor data device is not linked to a respective dashboard, transmit, to the client device, an indication that the sensor data device is unregistered;

receive, from the client device, an indication of a dashboard to which to assign the sensor data device; and cause the sensor data device to be linked to the dashboard so that sensor data received from the sensor data device is presented in a user interface corresponding to the dashboard.

* * * * *